(12) United States Patent
Uscinski et al.

(10) Patent No.: US 11,379,036 B2
(45) Date of Patent: *Jul. 5, 2022

(54) EYE TRACKING CALIBRATION TECHNIQUES

(71) Applicant: Magic Leap, Inc., Plantation, FL (US)

(72) Inventors: Benjamin Joseph Uscinski, Ft. Lauderdale, FL (US); Yan Xu, San Jose, CA (US); Bradley Vincent Stuart, Ft. Lauderdale, FL (US)

(73) Assignee: Magic Leap, Inc., Plantation, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/351,660

(22) Filed: Jun. 18, 2021

(65) Prior Publication Data
US 2022/0011859 A1 Jan. 13, 2022

Related U.S. Application Data

(63) Continuation of application No. 16/855,270, filed on Apr. 22, 2020, now Pat. No. 11,068,055, which is a
(Continued)

(51) Int. Cl.
| | | |
|---|---|---|
| *G06F 3/01* | (2006.01) | |
| *G06T 19/00* | (2011.01) | |
| *G06T 7/70* | (2017.01) | |
| *G06F 1/16* | (2006.01) | |
| *G06T 15/06* | (2011.01) | |

(Continued)

(52) U.S. Cl.
CPC ............ *G06F 3/013* (2013.01); *A63F 13/211* (2014.09); *A63F 13/212* (2014.09); *A63F 13/213* (2014.09); *A63F 13/22* (2014.09); *G06F 1/163* (2013.01); *G06F 3/011* (2013.01); *G06F 3/012* (2013.01); *G06F 3/016* (2013.01); *G06K 9/00* (2013.01); *G06T 7/70* (2017.01); *G06T 15/06* (2013.01); *G06T 19/006* (2013.01);
(Continued)

(58) Field of Classification Search
CPC .. G06F 3/011–013; G06F 3/016; G06F 1/163; G02B 2027/0198; G06T 7/70; G06T 19/006
USPC .................................. 345/7–8; 351/208–209
See application file for complete search history.

(56) References Cited

U.S. PATENT DOCUMENTS

| | | |
|---|---|---|
| 6,850,221 B1 | 2/2005 | Tickle |
| D514,570 S | 2/2006 | Ohta |

(Continued)

FOREIGN PATENT DOCUMENTS

| | | |
|---|---|---|
| WO | WO 2018/222753 | 12/2018 |

OTHER PUBLICATIONS

US 9,343,143 B2, 05/2016, Gao et al. (withdrawn)
(Continued)

*Primary Examiner* — Michael Pervan
(74) *Attorney, Agent, or Firm* — Knobbe, Martens, Olson & Bear, LLP

(57) ABSTRACT

Systems and methods for eye tracking calibration in a wearable system are described. The wearable system can present three-dimensional (3D) virtual content and allow a user to interact with the 3D virtual content using eye gaze. During an eye tracking calibration, the wearable system can validate that a user is indeed looking at a calibration target while the eye tracking data is acquired. The validation may be performed based on data associated with the user's head pose and vestibulo-ocular reflex.

20 Claims, 24 Drawing Sheets

Related U.S. Application Data continuation of application No. 15/993,371, filed on May 30, 2018, now Pat. No. 10,671,160.

(60) Provisional application No. 62/512,954, filed on May 31, 2017.

(51) Int. Cl.

| | | |
|---|---|---|
| *A63F 13/213* | (2014.01) | |
| *A63F 13/211* | (2014.01) | |
| *A63F 13/22* | (2014.01) | |
| *A63F 13/212* | (2014.01) | |
| *G06K 9/00* | (2022.01) | |
| *G06V 20/20* | (2022.01) | |
| *G06V 40/19* | (2022.01) | |

(52) U.S. Cl.
CPC .............. *G06V 20/20* (2022.01); *G06V 40/19* (2022.01); *A63F 2300/8082* (2013.01)

(56) References Cited

U.S. PATENT DOCUMENTS

| | | | |
|---|---|---|---|
| 7,646,394 | B1 | 1/2010 | Neely, III et al. |
| 8,248,458 | B2 | 8/2012 | Schowengerdt et al. |
| 8,950,867 | B2 | 2/2015 | Macnamara |
| 9,081,426 | B2 | 7/2015 | Armstrong |
| 9,215,293 | B2 | 12/2015 | Miller |
| D752,529 | S | 3/2016 | Loretan et al. |
| 9,310,559 | B2 | 4/2016 | Macnamara |
| D758,367 | S | 6/2016 | Natsume |
| D759,657 | S | 7/2016 | Kujawski et al. |
| 9,417,452 | B2 | 8/2016 | Schowengerdt et al. |
| 9,470,906 | B2 | 10/2016 | Kaji et al. |
| 9,547,174 | B2 | 1/2017 | Gao et al. |
| 9,671,566 | B2 | 6/2017 | Abovitz et al. |
| D794,288 | S | 8/2017 | Beers et al. |
| 9,740,006 | B2 | 8/2017 | Gao |
| 9,791,700 | B2 | 10/2017 | Schowengerdt et al. |
| D805,734 | S | 12/2017 | Fisher et al. |
| 9,851,563 | B2 | 12/2017 | Gao et al. |
| 9,857,591 | B2 | 1/2018 | Welch et al. |
| 9,874,749 | B2 | 1/2018 | Bradski |
| 10,671,160 | B2 | 6/2020 | Uscinski et al. |
| 2005/0280603 | A1 | 12/2005 | Aughey et al. |
| 2006/0028436 | A1 | 2/2006 | Armstrong |
| 2007/0081123 | A1 | 4/2007 | Lewis |
| 2010/0128222 | A1 | 5/2010 | Donaldson |
| 2012/0127062 | A1 | 5/2012 | Bar-Zeev et al. |
| 2012/0162549 | A1 | 6/2012 | Gao et al. |
| 2013/0082922 | A1 | 4/2013 | Miller |
| 2013/0117377 | A1 | 5/2013 | Miller |
| 2013/0125027 | A1 | 5/2013 | Abovitz |
| 2013/0208234 | A1 | 8/2013 | Lewis |
| 2013/0242262 | A1 | 9/2013 | Lewis |
| 2014/0071539 | A1 | 3/2014 | Gao |
| 2014/0177023 | A1 | 6/2014 | Gao et al. |
| 2014/0218281 | A1 | 8/2014 | Amayeh et al. |
| 2014/0218468 | A1 | 8/2014 | Gao et al. |
| 2014/0267420 | A1 | 9/2014 | Schowengerdt |
| 2014/0306866 | A1 | 10/2014 | Miller et al. |
| 2014/0333665 | A1 | 11/2014 | Sylvan et al. |
| 2015/0016777 | A1 | 1/2015 | Abovitz et al. |
| 2015/0049012 | A1 | 2/2015 | Liu et al. |
| 2015/0049013 | A1 | 2/2015 | Rahman et al. |
| 2015/0049112 | A1 | 2/2015 | Liu et al. |
| 2015/0103306 | A1 | 4/2015 | Kaji et al. |
| 2015/0178939 | A1 | 6/2015 | Bradski et al. |
| 2015/0205126 | A1 | 7/2015 | Schowengerdt |
| 2015/0222883 | A1 | 8/2015 | Welch |
| 2015/0222884 | A1 | 8/2015 | Cheng |
| 2015/0268415 | A1 | 9/2015 | Schowengerdt et al. |
| 2015/0289762 | A1 | 10/2015 | Popovich et al. |
| 2015/0302652 | A1 | 10/2015 | Miller et al. |
| 2015/0309263 | A2 | 10/2015 | Abovitz et al. |
| 2015/0326570 | A1 | 11/2015 | Publicover et al. |
| 2015/0331485 | A1 | 11/2015 | Wilairat et al. |
| 2015/0338915 | A1 | 11/2015 | Publicover et al. |
| 2015/0346419 | A1 | 12/2015 | TeKolste et al. |
| 2015/0346495 | A1 | 12/2015 | Welch et al. |
| 2016/0011419 | A1 | 1/2016 | Gao |
| 2016/0026253 | A1 | 1/2016 | Bradski et al. |
| 2016/0353988 | A1 | 12/2016 | Moller et al. |
| 2017/0017361 | A1 | 1/2017 | Ballard et al. |
| 2017/0123492 | A1 | 5/2017 | Marggraff et al. |
| 2017/0205875 | A1 | 7/2017 | Kaehler |
| 2017/0206401 | A1 | 7/2017 | Kaehler |
| 2017/0329400 | A1 | 11/2017 | Noda et al. |
| 2018/0348861 | A1 | 12/2018 | Uscinski et al. |
| 2020/0249755 | A1 | 8/2020 | Uscinski et al. |

OTHER PUBLICATIONS

International Preliminary Report on Patentability, re PCT Application No. PCT/US2018/035190, dated Dec. 3, 2019.

International Search Report and Written Opinion, re PCT Application No. PCT/US2018/035190, dated Aug. 8, 2018.

ARToolKit: https://web.archive.org/web/20051013062315/http://www.hitl.washington.edu:80/artoolkit/documentation/hardware.htm, archived Oct. 13, 2005.

Azuma, "A Survey of Augmented Reality," Teleoperators and Virtual Environments 6, Aug. 4, 1997), pp. 355-385. https://web.archive.org/web/20010604100006/http://www.cs.unc.edu/~azuma/ARpresence.pdf.

Azuma, "Predictive Tracking for Augmented Realty," TR95-007, Department of Computer Science, UNC-Chapel Hill, NC, Feb. 1995.

Bimber, et al., "Spatial Augmented Reality—Merging Real and Virtual Worlds," 2005 https://web.media.mit.edu/~raskar/book/BimberRaskarAugmentedRealityBook.pdf.

Jacob, "Eye Tracking in Advanced Interface Design," Human-Computer Interaction Lab Naval Research Laboratory, Washington, D.C. / paper/ in Virtual Environments and Advanced Interface Design, ed. by W. Barfield and T.A. Furness, pp. 258-288, Oxford University Press, New York (1995).

Tanriverdi and Jacob, "Interacting With Eye Movements in Virtual Environments," Department of Electrical Engineering and Computer Science, Tufts University, Medford, MA—paper/Proc. ACM CHI 2000 Human Factors in Computing Systems Conference, pp. 265-272, Addison-Wesley/ACM Press (2000).

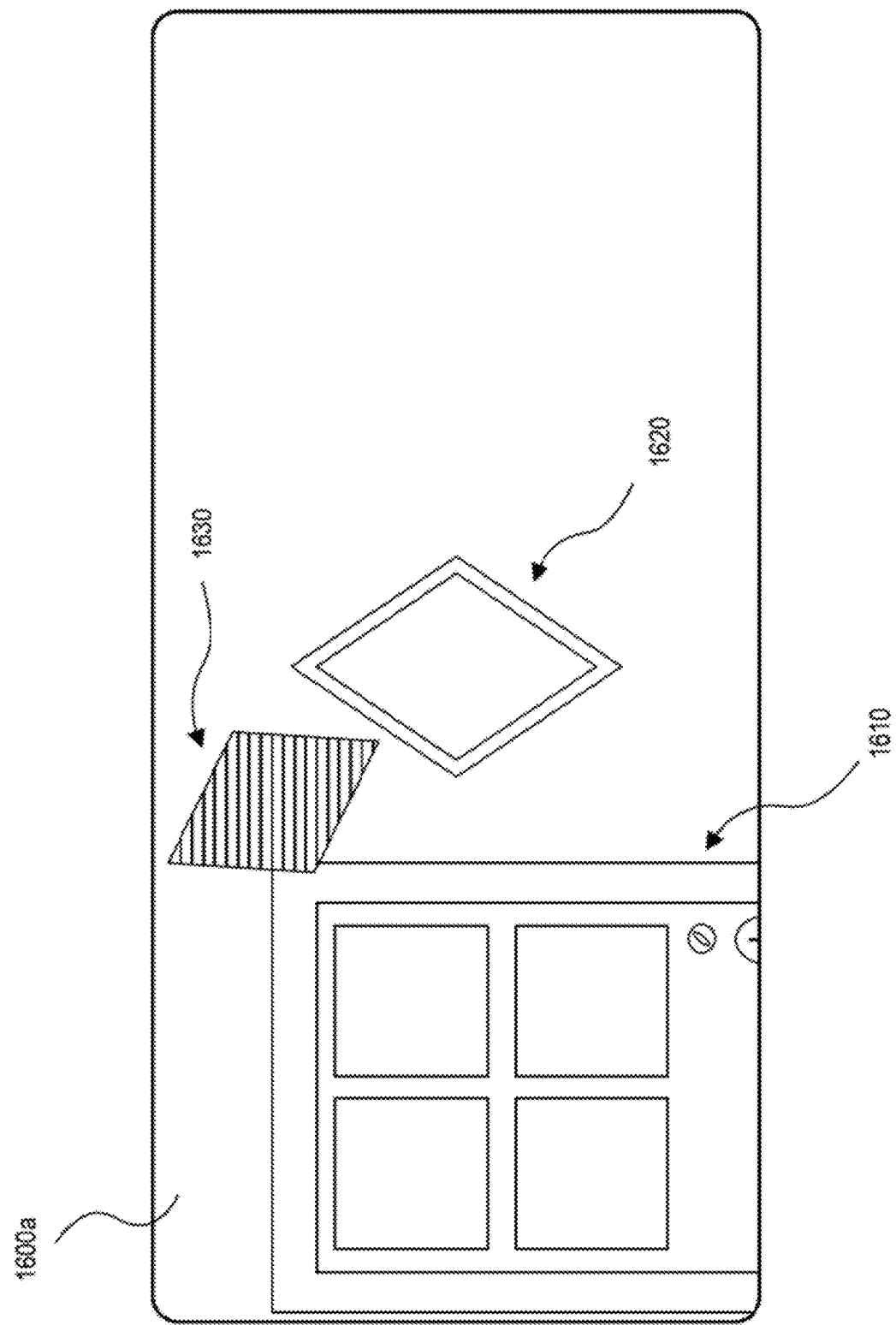

EYE TRACKING CALIBRATION TECHNIQUES

CROSS-REFERENCE TO RELATED APPLICATIONS

This application is a continuation of U.S. patent application Ser. No. 16/855,270, filed Apr. 22, 2020, entitled "EYE TRACKING CALIBRATION TECHNIQUES," which is a continuation of U.S. patent application Ser. No. 15/993,371, filed May 30, 2018, entitled "EYE TRACKING CALIBRATION TECHNIQUES," which claims the benefit of priority under 35 U.S.C. § 119(e) to U.S. Provisional Application No. 62/512,954, filed on May 31, 2017, entitled "EYE TRACKING CALIBRATION TECHNIQUES," the disclosure of which is hereby incorporated by reference herein in its entirety.

FIELD

The present disclosure relates to virtual reality and augmented reality imaging and visualization systems and more particularly to calibration techniques for eye tracking.

BACKGROUND

Modern computing and display technologies have facilitated the development of systems for so called "virtual reality", "augmented reality", or "mixed reality" experiences, wherein digitally reproduced images or portions thereof are presented to a user in a manner wherein they seem to be, or may be perceived as, real. A virtual reality, or "VR", scenario typically involves presentation of digital or virtual image information without transparency to other actual real-world visual input; an augmented reality, or "AR", scenario typically involves presentation of digital or virtual image information as an augmentation to visualization of the actual world around the user; a mixed reality, or "MR", related to merging real and virtual worlds to produce new environments where physical and virtual objects co-exist and interact in real time. As it turns out, the human visual perception system is very complex, and producing a VR, AR, or MR technology that facilitates a comfortable, natural-feeling, rich presentation of virtual image elements amongst other virtual or real-world imagery elements is challenging. Systems and methods disclosed herein address various challenges related to VR, AR and MR technology.

SUMMARY

Various embodiments of techniques for improving accuracies of eye tracking calibrations are disclosed.

Systems and methods for eye tracking calibration in a wearable system are described. The wearable system can present three-dimensional (3D) virtual content and allow a user to interact with the 3D virtual content using eye gaze. During an eye tracking calibration, the wearable system can validate that a user is indeed looking at a calibration target while the eye tracking data is acquired. The validation may be performed based on data associated with the user's head pose and vestibulo-ocular reflex.

Details of one or more implementations of the subject matter described in this specification are set forth in the accompanying drawings and the description below. Other features, aspects, and advantages will become apparent from the description, the drawings, and the claims. Neither this summary nor the following detailed description purports to define or limit the scope of the inventive subject matter.

BRIEF DESCRIPTION OF THE DRAWINGS

FIGS. 16A and 16B illustrate examples of a reticle and a target that are similar in shape.

Figure 1:
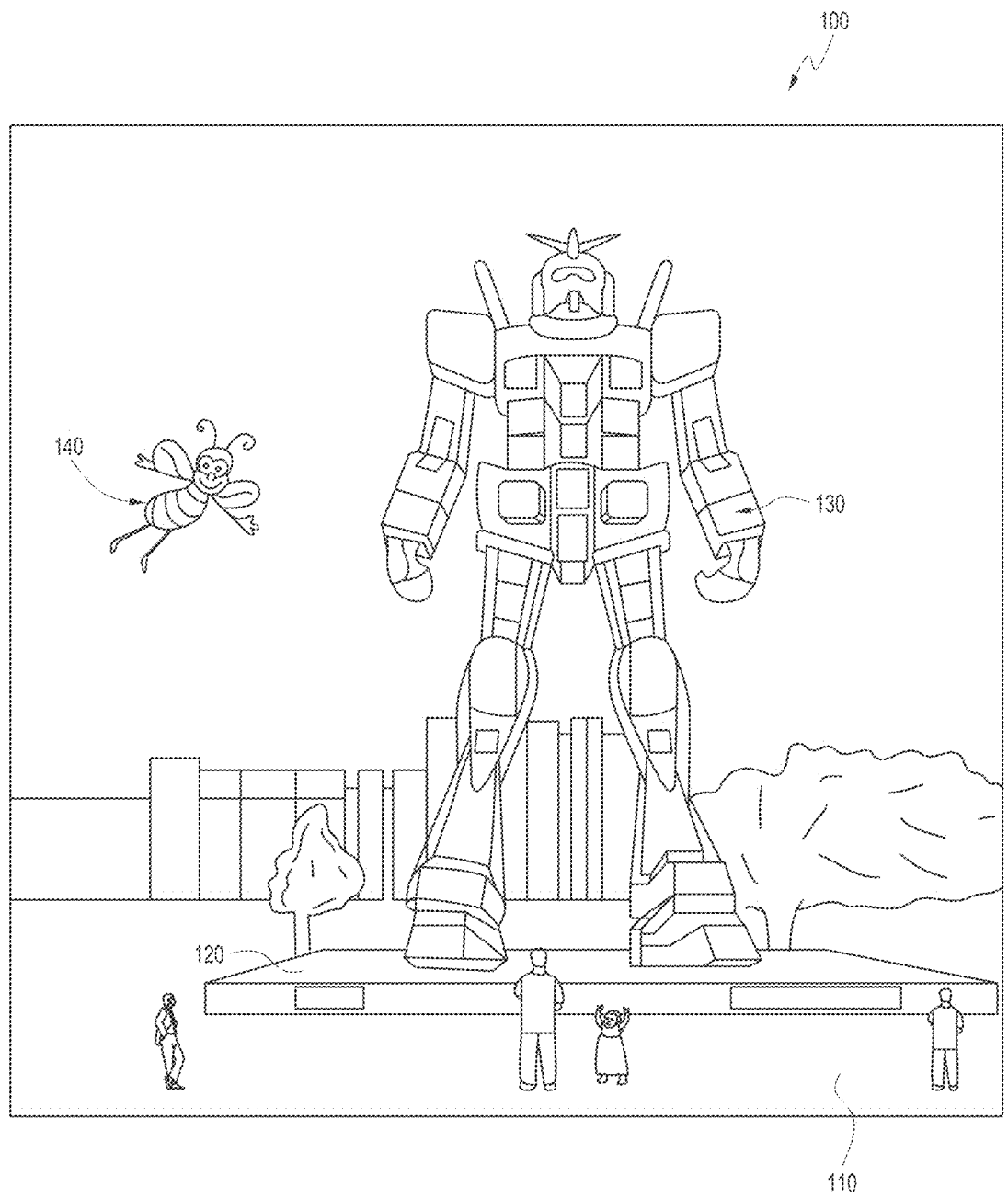
FIG. 1 depicts an illustration of a mixed reality scenario with certain virtual reality objects, and certain physical objects viewed by a person.

Throughout the drawings, reference numbers may be re-used to indicate correspondence between referenced elements. The drawings are provided to illustrate example embodiments described herein and are not intended to limit the scope of the disclosure. Additionally, the figures in the present disclosure are for illustration purposes and are not to scale.

DETAILED DESCRIPTION

Overview

A wearable device can present virtual content an interactive VR/AR/MR environment. The virtual content can comprise data elements that may be interacted with by the user through a variety of poses, such as, e.g., head pose, eye gaze, or body pose. In the context of user interactions using eye gaze, the wearable device can collect eye data such as eye images (e.g., via an eye camera in an inward-facing imaging system of the wearable device). The wearable system can calculate the user's eye gaze direction based on a mapping matrix that provides an association between the user's eye gaze and a gaze vector (which can indicate the user's direction of gaze). To improve user experience, the wearable device can perform an eye tracking calibration process which can calibrate the mapping matrix to take into account the uniqueness of each person's eyes, the particular orientation of the wearable device in relation to the user when worn, current environmental conditions (e.g., lighting conditions, temperature, etc.), in combination or the like.

During the eye tracking calibration process, the wearable device can present various virtual targets and direct a user to look at these virtual targets while collecting information regarding the gaze of the user's eyes. However, the wearable device lacks a mechanism to validate that the user is indeed looking at a target when instructed. If a user does not look at the target as directed, the wearable device may collect data that does not accurately reflect the user's gaze direction, which can introduce inaccuracies in the calibration and cause a false mapping matrix to be generated. As a result of the inaccuracies in the calibration process, if the wearable device were to use eye gaze as an interaction input, the user may not be able to target and interact with objects accurately, which may lead to a less than satisfactory user experience.

To increase the accuracy of the eye gaze calibration process, the wearable device can perform an eye gaze validation to ensure or increase the likelihood that the user is indeed looking at the target when the eye data is collected. The eye gaze validation can use head pose and vestibulo-ocular reflex (the reflex that produces eye movements in a direction opposite to head movements to preserve an image in the center of the visual field) to ensure that a user looks at the target as directed. As an example, the wearable device can identify a physical target or render a virtual target in a user's environment. The location of the target may be represented by a position in a world space which maps the objects in the environment to positions in a three-dimensional world coordinate system. The wearable device can also present a virtual reticle in a rig space which is associated with a coordinate system with reference to the wearable device. As the user moves his or her head, the reticle can accordingly move in the user's environment. The wearable device can validate that the user is indeed looking at the target when the user's head pose causes the reticle in the rig space to align with the target in the world space. Advantageously, in some embodiments, to ensure the quality of eye data used for the calibration process, the wearable device will stop collecting eye data if the wearable device determines that the user is not looking at the target.

By providing a process in which the user can align the reticle with the target using a combination of head pose and eye gaze, the wearable system can provide an intuitive eye calibration process, because many users are familiar with using a reticle to aim at an object. In addition, this approach reduces user discomfort and reduces eyestrain by utilizing the natural functionalities of human visual tracking (e.g., tracking vestibulo-ocular reflex). Further, since head and eye movements are tracked, users do not need to have good hand-eye coordination skills to be able to perform the eye tracking calibration.

Examples of 3D Display of a Wearable System

A wearable system (also referred to herein as an augmented reality (AR) system) can be configured to present two-dimensional (2D) or three-dimensional (3D) virtual images to a user. The images may be still images, frames of a video, or a video, in combination or the like. The wearable system can include a wearable device that can present a VR, AR, or MR environment, alone or in combination, for user interaction. The wearable device is used interchangeably as an AR device (ARD) and the wearable device can be a head-mounted device (HMD).

FIG. 1 depicts an illustration of a mixed reality scenario with certain virtual reality objects, and certain physical objects viewed by a person. In FIG. 1, an MR scene 100 is depicted wherein a user of an MR technology sees a real-world park-like setting 110 featuring people, trees, buildings in the background, and a concrete platform 120. In addition to these items, the user of the MR technology also perceives that he "sees" a robot statue 130 standing upon the real-world platform 120, and a cartoon-like avatar character 140 flying by which seems to be a personification of a bumble bee, even though these elements do not exist in the real world.

In order for the 3D display to produce a true sensation of depth, and more specifically, a simulated sensation of surface depth, it may be desirable for each point in the display's visual field to generate an accommodative response corresponding to its virtual depth. If the accommodative response to a display point does not correspond to the virtual depth of that point, as determined by the binocular depth cues of convergence and stereopsis, the human eye may experience an accommodation conflict, resulting in unstable imaging, harmful eye strain, headaches, and, in the absence of accommodation information, almost a complete lack of surface depth.

VR, AR, and MR experiences can be provided by display systems having displays in which images corresponding to a plurality of depth planes are provided to a viewer. The images may be different for each depth plane (e.g., provide slightly different presentations of a scene or object) and may be separately focused by the viewer's eyes, thereby helping to provide the user with depth cues based on the accommodation of the eye required to bring into focus different image features for the scene located on different depth plane or based on observing different image features on different depth planes being out of focus. As discussed elsewhere herein, such depth cues provide credible perceptions of depth.

Figure 2:
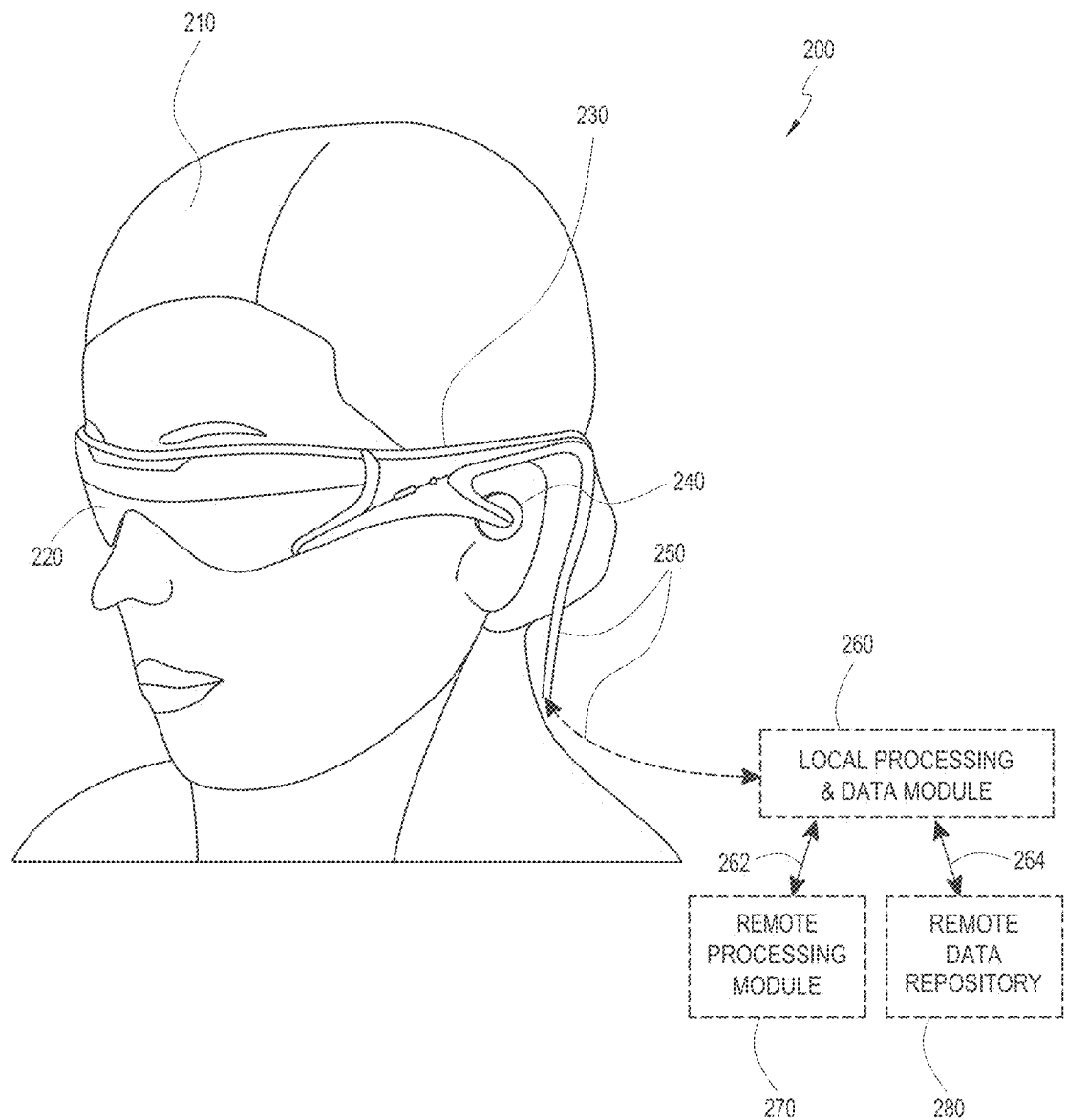
FIG. 2 schematically illustrates an example of a wearable system.

FIG. 2 illustrates an example of wearable system 200. The wearable system 200 includes a display 220, and various mechanical and electronic modules and systems to support the functioning of display 220. The display 220 may be coupled to a frame 230, which is wearable by a user, wearer, or viewer 210. The display 220 can be positioned in front of the eyes of the user 210. The display 220 can present AR/VR/MR content to a user. The display 220 can comprise a head mounted display (HMD) that is worn on the head of the user. In some embodiments, a speaker 240 is coupled to the frame 230 and positioned adjacent the ear canal of the user (in some embodiments, another speaker, not shown, is positioned adjacent the other ear canal of the user to provide for stereo/shapeable sound control).

The wearable system 200 can include an outward-facing imaging system 464 (shown in FIG. 4) which observes the world in the environment around the user. The wearable system 200 can also include an inward-facing imaging system 462 (shown in FIG. 4) which can track the eye movements of the user. The inward-facing imaging system may track either one eye's movements or both eyes' movements. The inward-facing imaging system 462 may be attached to the frame 230 and may be in electrical communication with the processing modules 260 or 270, which may process image information acquired by the inward-facing imaging system to determine, e.g., the pupil diameters or orientations of the eyes, eye movements or eye pose of the user 210.

As an example, the wearable system 200 can use the outward-facing imaging system 464 or the inward-facing imaging system 462 to acquire images of a pose of the user. The images may be still images, frames of a video, or a video, in combination or the like.

The display 220 can be operatively coupled 250, such as by a wired lead or wireless connectivity, to a local data processing module 260 which may be mounted in a variety of configurations, such as fixedly attached to the frame 230, fixedly attached to a helmet or hat worn by the user, embedded in headphones, or otherwise removably attached to the user 210 (e.g., in a backpack-style configuration, in a belt-coupling style configuration).

The local processing and data module 260 may comprise a hardware processor, as well as digital memory, such as non-volatile memory (e.g., flash memory), both of which may be utilized to assist in the processing, caching, and storage of data. The data may include data a) captured from sensors (which may be, e.g., operatively coupled to the frame 230 or otherwise attached to the user 210), such as image capture devices (e.g., cameras in the inward-facing imaging system or the outward-facing imaging system), microphones, inertial measurement units (IMUs), accelerometers, compasses, global positioning system (GPS) units, radio devices, or gyroscopes; or b) acquired or processed using remote processing module 270 or remote data repository 280, possibly for passage to the display 220 after such processing or retrieval. The local processing and data module 260 may be operatively coupled by communication links 262 or 264, such as via wired or wireless communication links, to the remote processing module 270 or remote data repository 280 such that these remote modules are available as resources to the local processing and data module 260. In addition, remote processing module 280 and remote data repository 280 may be operatively coupled to each other.

In some embodiments, the remote processing module 270 may comprise one or more processors configured to analyze and process data and/or image information. In some embodiments, the remote data repository 280 may comprise a digital data storage facility, which may be available through the internet or other networking configuration in a "cloud" resource configuration. In some embodiments, all data is stored and all computations are performed in the local processing and data module, allowing fully autonomous use from a remote module.

The human visual system is complicated and providing a realistic perception of depth is challenging. Without being limited by theory, it is believed that viewers of an object may perceive the object as being three-dimensional due to a combination of vergence and accommodation. Vergence movements (i.e., rolling movements of the pupils toward or away from each other to converge the lines of sight of the eyes to fixate upon an object) of the two eyes relative to each other are closely associated with focusing (or "accommodation") of the lenses of the eyes. Under normal conditions, changing the focus of the lenses of the eyes, or accommodating the eyes, to change focus from one object to another object at a different distance will automatically cause a matching change in vergence to the same distance, under a relationship known as the "accommodation-vergence reflex." Likewise, a change in vergence will trigger a matching change in accommodation, under normal conditions. Display systems that provide a better match between accommodation and vergence may form more realistic and comfortable simulations of three-dimensional imagery.

Figure 3:
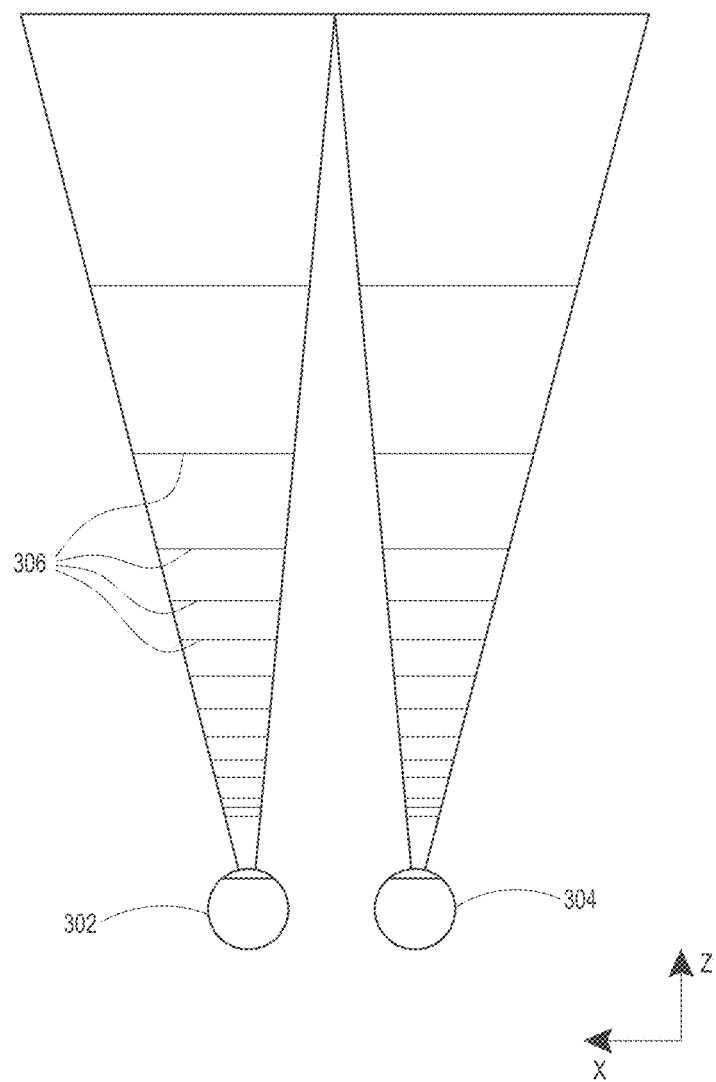
FIG. 3 schematically illustrates aspects of an approach for simulating three-dimensional imagery using multiple depth planes.

FIG. 3 illustrates aspects of an approach for simulating a three-dimensional imagery using multiple depth planes. With reference to FIG. 3, objects at various distances from eyes 302 and 304 on the z-axis are accommodated by the eyes 302 and 304 so that those objects are in focus. The eyes 302 and 304 assume particular accommodated states to bring into focus objects at different distances along the z-axis. Consequently, a particular accommodated state may be said to be associated with a particular one of depth planes 306, with has an associated focal distance, such that objects or parts of objects in a particular depth plane are in focus when the eye is in the accommodated state for that depth plane. In some embodiments, three-dimensional imagery may be simulated by providing different presentations of an image for each of the eyes 302 and 304, and also by providing different presentations of the image corresponding to each of the depth planes. While shown as being separate for clarity of illustration, it will be appreciated that the fields of view of the eyes 302 and 304 may overlap, for example, as distance along the z-axis increases. In addition, while shown as flat for the ease of illustration, it will be appreciated that the contours of a depth plane may be curved in physical space, such that all features in a depth plane are in focus with the eye in a particular accommodated state. Without being limited by theory, it is believed that the human eye typically can interpret a finite number of depth planes to provide depth perception. Consequently, a highly believable simulation of perceived depth may be achieved by providing, to the eye, different presentations of an image corresponding to each of these limited number of depth planes.

Waveguide Stack Assembly

Figure 4:
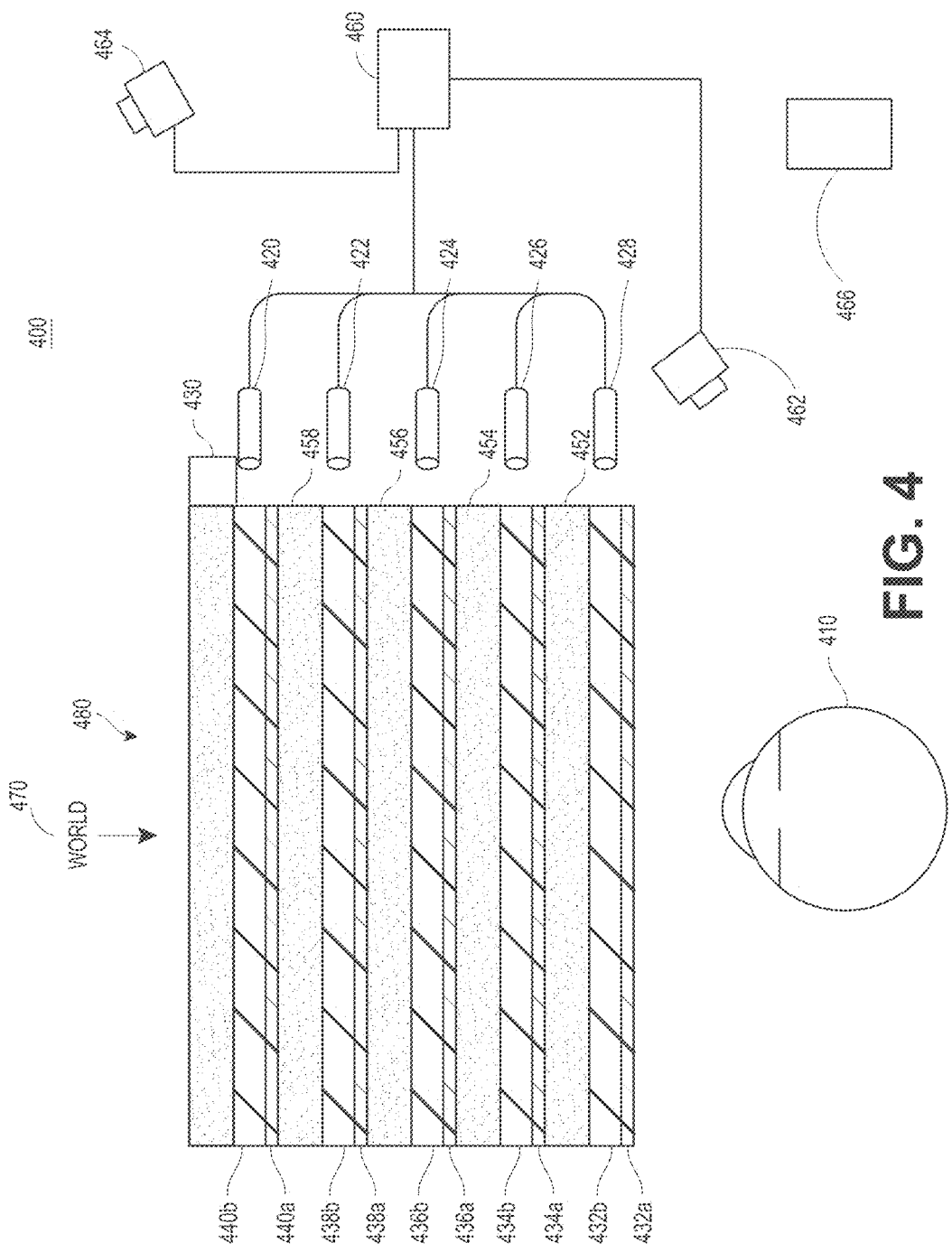
FIG. 4 schematically illustrates an example of a waveguide stack for outputting image information to a user.

FIG. 4 illustrates an example of a waveguide stack for outputting image information to a user. A wearable system 400 includes a stack of waveguides, or stacked waveguide assembly 480 that may be utilized to provide three-dimensional perception to the eye/brain using a plurality of waveguides 432b, 434b, 436b, 438b, 4400b. In some embodiments, the wearable system 400 may correspond to wearable system 200 of FIG. 2, with FIG. 4 schematically showing some parts of that wearable system 200 in greater detail. For example, in some embodiments, the waveguide assembly 480 may be integrated into the display 220 of FIG. 2.

With continued reference to FIG. 4, the waveguide assembly 480 may also include a plurality of features 458, 456, 454, 452 between the waveguides. In some embodiments, the features 458, 456, 454, 452 may be lenses. In other embodiments, the features 458, 456, 454, 452 may not be lenses. Rather, they may simply be spacers (e.g., cladding layers or structures for forming air gaps).

The waveguides 432b, 434b, 436b, 438b, 440b or the plurality of lenses 458, 456, 454, 452 may be configured to send image information to the eye with various levels of wavefront curvature or light ray divergence. Each waveguide level may be associated with a particular depth plane and may be configured to output image information corresponding to that depth plane. Image injection devices 420, 422, 424, 426, 428 may be utilized to inject image information into the waveguides 440*b*, 438*b*, 436*b*, 434*b*, 432*b*, each of which may be configured to distribute incoming light across each respective waveguide, for output toward the eye 410. Light exits an output surface of the image injection devices 420, 422, 424, 426, 428 and is injected into a corresponding input edge of the waveguides 440*b*, 438*b*, 436*b*, 434*b*, 432*b*. In some embodiments, a single beam of light (e.g., a collimated beam) may be injected into each waveguide to output an entire field of cloned collimated beams that are directed toward the eye 410 at particular angles (and amounts of divergence) corresponding to the depth plane associated with a particular waveguide.

In some embodiments, the image injection devices 420, 422, 424, 426, 428 are discrete displays that each produce image information for injection into a corresponding waveguide 440*b*, 438*b*, 436*b*, 434*b*, 432*b*, respectively. In some other embodiments, the image injection devices 420, 422, 424, 426, 428 are the output ends of a single multiplexed display which may, e.g., pipe image information via one or more optical conduits (such as fiber optic cables) to each of the image injection devices 420, 422, 424, 426, 428.

A controller 460 controls the operation of the stacked waveguide assembly 480 and the image injection devices 420, 422, 424, 426, 428. The controller 460 includes programming (e.g., instructions in a non-transitory computer-readable medium) that regulates the timing and provision of image information to the waveguides 440*b*, 438*b*, 436*b*, 434*b*, 432*b*. In some embodiments, the controller 460 may be a single integral device, or a distributed system connected by wired or wireless communication channels. The controller 460 may be part of the processing modules 260 or 270 (illustrated in FIG. 2) in some embodiments.

The waveguides 440*b*, 438*b*, 436*b*, 434*b*, 432*b* may be configured to propagate light within each respective waveguide by total internal reflection (TIR). The waveguides 440*b*, 438*b*, 436*b*, 434*b*, 432*b* may each be planar or have another shape (e.g., curved), with major top and bottom surfaces and edges extending between those major top and bottom surfaces. In the illustrated configuration, the waveguides 440*b*, 438*b*, 436*b*, 434*b*, 432*b* may each include light extracting optical elements 440*a*, 438*a*, 436*a*, 434*a*, 432*a* that are configured to extract light out of a waveguide by redirecting the light, propagating within each respective waveguide, out of the waveguide to output image information to the eye 410. Extracted light may also be referred to as outcoupled light, and light extracting optical elements may also be referred to as outcoupling optical elements. An extracted beam of light is outputted by the waveguide at locations at which the light propagating in the waveguide strikes a light redirecting element. The light extracting optical elements (440*a*, 438*a*, 436*a*, 434*a*, 432*a*) may, for example, be reflective or diffractive optical features. While illustrated disposed at the bottom major surfaces of the waveguides 440*b*, 438*b*, 436*b*, 434*b*, 432*b* for ease of description and drawing clarity, in some embodiments, the light extracting optical elements 440*a*, 438*a*, 436*a*, 434*a*, 432*a* may be disposed at the top or bottom major surfaces, or may be disposed directly in the volume of the waveguides 440*b*, 438*b*, 436*b*, 434*b*, 432*b*. In some embodiments, the light extracting optical elements 440*a*, 438*a*, 436*a*, 434*a*, 432*a* may be formed in a layer of material that is attached to a transparent substrate to form the waveguides 440*b*, 438*b*, 436*b*, 434*b*, 432*b*. In some other embodiments, the waveguides 440*b*, 438*b*, 436*b*, 434*b*, 432*b* may be a monolithic piece of material and the light extracting optical elements 440*a*, 438*a*, 436*a*, 434*a*, 432*a* may be formed on a surface or in the interior of that piece of material.

With continued reference to FIG. 4, as discussed herein, each waveguide 440*b*, 438*b*, 436*b*, 434*b*, 432*b* is configured to output light to form an image corresponding to a particular depth plane. For example, the waveguide 432*b* nearest the eye may be configured to deliver collimated light, as injected into such waveguide 432*b*, to the eye 410. The collimated light may be representative of the optical infinity focal plane. The next waveguide up 434*b* may be configured to send out collimated light which passes through the first lens 452 (e.g., a negative lens) before it can reach the eye 410. First lens 452 may be configured to create a slight convex wavefront curvature so that the eye/brain interprets light coming from that next waveguide up 434*b* as coming from a first focal plane closer inward toward the eye 410 from optical infinity. Similarly, the third up waveguide 436*b* passes its output light through both the first lens 452 and second lens 454 before reaching the eye 410. The combined optical power of the first and second lenses 452 and 454 may be configured to create another incremental amount of wavefront curvature so that the eye/brain interprets light coming from the third waveguide 436*b* as coming from a second focal plane that is even closer inward toward the person from optical infinity than was light from the next waveguide up 434*b*.

The other waveguide layers (e.g., waveguides 438*b*, 440*b*) and lenses (e.g., lenses 456, 458) are similarly configured, with the highest waveguide 440*b* in the stack sending its output through all of the lenses between it and the eye for an aggregate focal power representative of the closest focal plane to the person. To compensate for the stack of lenses 458, 456, 454, 452 when viewing/interpreting light coming from the world 470 on the other side of the stacked waveguide assembly 480, a compensating lens layer 430 may be disposed at the top of the stack to compensate for the aggregate power of the lens stack 458, 456, 454, 452 below. Such a configuration provides as many perceived focal planes as there are available waveguide/lens pairings. Both the light extracting optical elements of the waveguides and the focusing aspects of the lenses may be static (e.g., not dynamic or electro-active). In some alternative embodiments, either or both may be dynamic using electro-active features.

With continued reference to FIG. 4, the light extracting optical elements 440*a*, 438*a*, 436*a*, 434*a*, 432*a* may be configured to both redirect light out of their respective waveguides and to output this light with the appropriate amount of divergence or collimation for a particular depth plane associated with the waveguide. As a result, waveguides having different associated depth planes may have different configurations of light extracting optical elements, which output light with a different amount of divergence depending on the associated depth plane. In some embodiments, as discussed herein, the light extracting optical elements 440*a*, 438*a*, 436*a*, 434*a*, 432*a* may be volumetric or surface features, which may be configured to output light at specific angles. For example, the light extracting optical elements 440*a*, 438*a*, 436*a*, 434*a*, 432*a* may be volume holograms, surface holograms, and/or diffraction gratings. Light extracting optical elements, such as diffraction gratings, are described in U.S. Patent Publication No. 2015/0178939, published Jun. 25, 2015, which is incorporated by reference herein in its entirety.

In some embodiments, the light extracting optical elements 440*a*, 438*a*, 436*a*, 434*a*, 432*a* are diffractive features that form a diffraction pattern, or "diffractive optical element" (also referred to herein as a "DOE"). Preferably, the DOE has a relatively low diffraction efficiency so that only a portion of the light of the beam is deflected away toward the eye 410 with each intersection of the DOE, while the rest continues to move through a waveguide via total internal reflection. The light carrying the image information can thus be divided into a number of related exit beams that exit the waveguide at a multiplicity of locations and the result is a fairly uniform pattern of exit emission toward the eye 304 for this particular collimated beam bouncing around within a waveguide.

In some embodiments, one or more DOEs may be switchable between "on" state in which they actively diffract, and "off" state in which they do not significantly diffract. For instance, a switchable DOE may comprise a layer of polymer dispersed liquid crystal, in which microdroplets comprise a diffraction pattern in a host medium, and the refractive index of the microdroplets can be switched to substantially match the refractive index of the host material (in which case the pattern does not appreciably diffract incident light) or the microdroplet can be switched to an index that does not match that of the host medium (in which case the pattern actively diffracts incident light).

In some embodiments, the number and distribution of depth planes or depth of field may be varied dynamically based on the pupil sizes or orientations of the eyes of the viewer. Depth of field may change inversely with a viewer's pupil size. As a result, as the sizes of the pupils of the viewer's eyes decrease, the depth of field increases such that one plane that is not discernible because the location of that plane is beyond the depth of focus of the eye may become discernible and appear more in focus with reduction of pupil size and commensurate with the increase in depth of field. Likewise, the number of spaced apart depth planes used to present different images to the viewer may be decreased with the decreased pupil size. For example, a viewer may not be able to clearly perceive the details of both a first depth plane and a second depth plane at one pupil size without adjusting the accommodation of the eye away from one depth plane and to the other depth plane. These two depth planes may, however, be sufficiently in focus at the same time to the user at another pupil size without changing accommodation.

In some embodiments, the display system may vary the number of waveguides receiving image information based upon determinations of pupil size or orientation, or upon receiving electrical signals indicative of particular pupil size or orientation. For example, if the user's eyes are unable to distinguish between two depth planes associated with two waveguides, then the controller 460 may be configured or programmed to cease providing image information to one of these waveguides. Advantageously, this may reduce the processing burden on the system, thereby increasing the responsiveness of the system. In embodiments in which the DOEs for a waveguide are switchable between the on and off states, the DOEs may be switched to the off state when the waveguide does receive image information.

In some embodiments, it may be desirable to have an exit beam meet the condition of having a diameter that is less than the diameter of the eye of a viewer. However, meeting this condition may be challenging in view of the variability in size of the viewer's pupils. In some embodiments, this condition is met over a wide range of pupil sizes by varying the size of the exit beam in response to determinations of the size of the viewer's pupil. For example, as the pupil size decreases, the size of the exit beam may also decrease. In some embodiments, the exit beam size may be varied using a variable aperture.

The wearable system 400 can include an outward-facing imaging system 464 (e.g., a digital camera) that images a portion of the world 470. This portion of the world 470 may be referred to as the field of view (FOV) of a world camera and the imaging system 464 is sometimes referred to as an FOV camera. The entire region available for viewing or imaging by a viewer may be referred to as the field of regard (FOR). The FOR may include 4π steradians of solid angle surrounding the wearable system 400 because the wearer can move his or her body, head, or eyes to perceive substantially any direction in space. In other contexts, the wearer's movements may be more constricted, and accordingly the wearer's FOR may subtend a smaller solid angle. Images obtained from the outward-facing imaging system 464 can be used to track gestures made by the user (e.g., hand or finger gestures), detect objects in the world 470 in front of the user, and so forth.

The wearable system 400 can also include an inward-facing imaging system 466 (e.g., a digital camera), which observes the movements of the user, such as the eye movements and the facial movements. The inward-facing imaging system 466 may be used to capture images of the eye 410 to determine the size and/or orientation of the pupil of the eye 304. The inward-facing imaging system 466 can be used to obtain images for use in determining the direction the user is looking (e.g., eye pose) or for biometric identification of the user (e.g., via iris identification). In some embodiments, at least one camera may be utilized for each eye, to separately determine the pupil size or eye pose of each eye independently, thereby allowing the presentation of image information to each eye to be dynamically tailored to that eye. In some other embodiments, the pupil diameter or orientation of only a single eye 410 (e.g., using only a single camera per pair of eyes) is determined and assumed to be similar for both eyes of the user. The images obtained by the inward-facing imaging system 466 may be analyzed to determine the user's eye pose or mood, which can be used by the wearable system 400 to decide which audio or visual content should be presented to the user. The wearable system 400 may also determine head pose (e.g., head position or head orientation) using sensors such as IMUs, accelerometers, gyroscopes, etc.

The wearable system 400 can include a user input device 466 by which the user can input commands to the controller 460 to interact with the wearable system 400. For example, the user input device 466 can include a trackpad, a touchscreen, a joystick, a multiple degree-of-freedom (DOF) controller, a capacitive sensing device, a game controller, a keyboard, a mouse, a directional pad (D-pad), a wand, a haptic device, a totem (e.g., functioning as a virtual user input device), and so forth. A multi-DOF controller can sense user input in some or all possible translations (e.g., left/right, forward/backward, or up/down) or rotations (e.g., yaw, pitch, or roll) of the controller. A multi-DOF controller which supports the translation movements may be referred to as a 3DOF while a multi-DOF controller which supports the translations and rotations may be referred to as 6DOF. In some cases, the user may use a finger (e.g., a thumb) to press or swipe on a touch-sensitive input device to provide input to the wearable system 400 (e.g., to provide user input to a user interface provided by the wearable system 400). The user input device 466 may be held by the user's hand during the use of the wearable system 400. The user input device 466 can be in wired or wireless communication with the wearable system 400.

Figure 5:
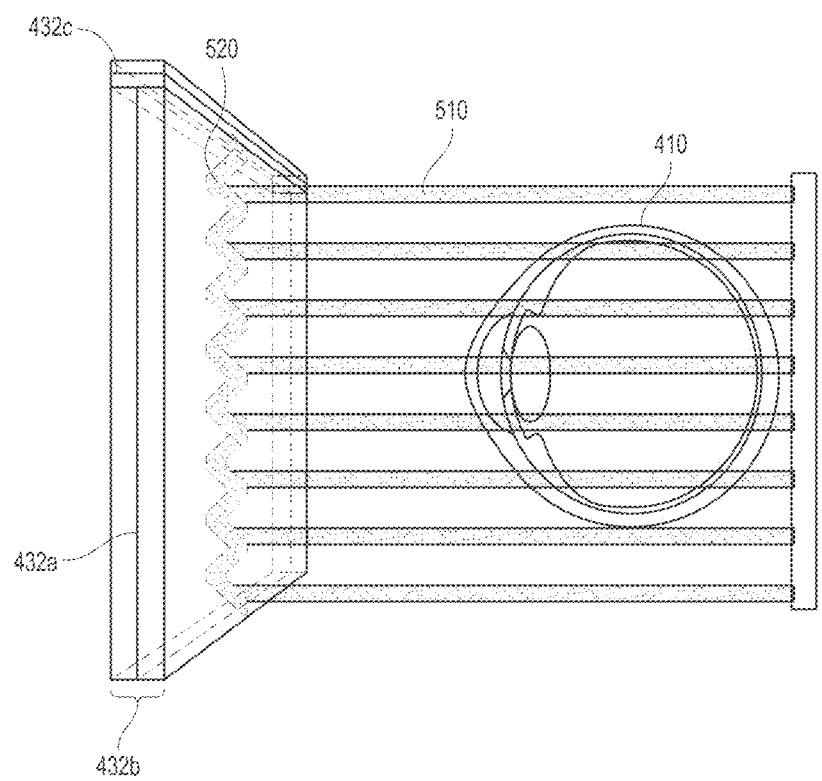
FIG. 5 shows example exit beams that may be outputted by a waveguide.

FIG. 5 shows an example of exit beams outputted by a waveguide. One waveguide is illustrated, but it will be appreciated that other waveguides in the waveguide assembly 480 may function similarly, where the waveguide assembly 480 includes multiple waveguides. Light 520 is injected into the waveguide 432b at the input edge 432c of the waveguide 432b and propagates within the waveguide 432b by TIR. At points where the light 520 impinges on the DOE 432a, a portion of the light exits the waveguide as exit beams 510. The exit beams 510 are illustrated as substantially parallel but they may also be redirected to propagate to the eye 410 at an angle (e.g., forming divergent exit beams), depending on the depth plane associated with the waveguide 432b. It will be appreciated that substantially parallel exit beams may be indicative of a waveguide with light extracting optical elements that outcouple light to form images that appear to be set on a depth plane at a large distance (e.g., optical infinity) from the eye 410. Other waveguides or other sets of light extracting optical elements may output an exit beam pattern that is more divergent, which would require the eye 410 to accommodate to a closer distance to bring it into focus on the retina and would be interpreted by the brain as light from a distance closer to the eye 410 than optical infinity.

Figure 6:
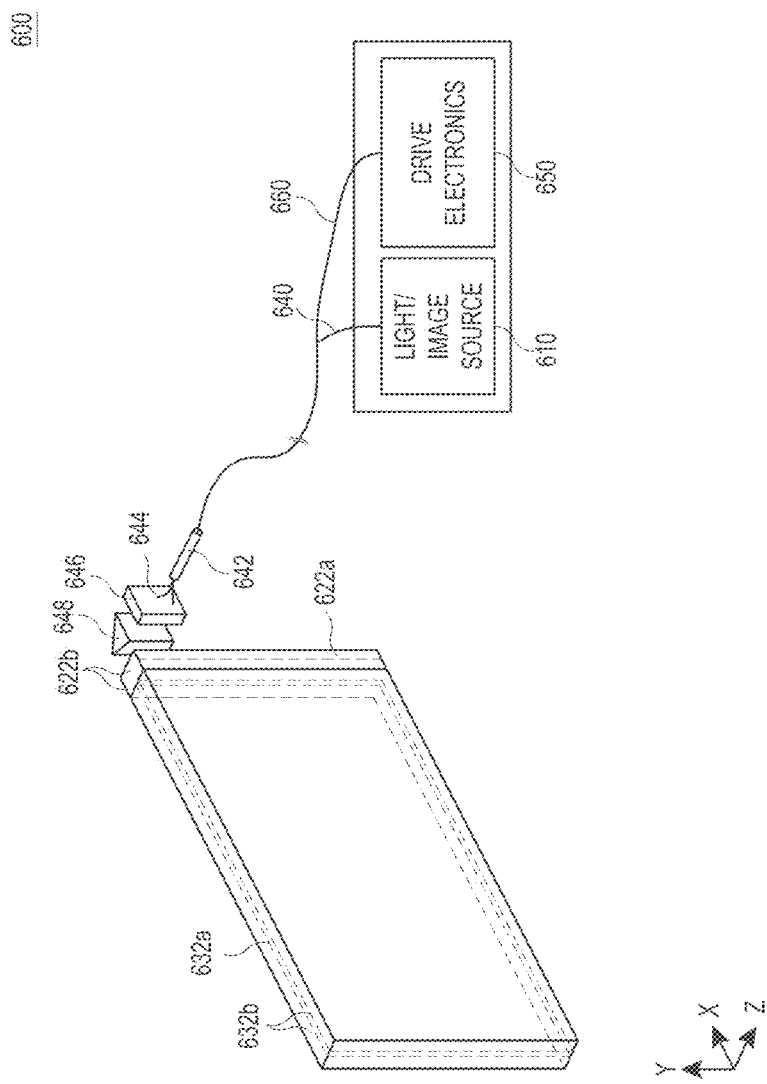
FIG. 6 is a schematic diagram showing an optical system including a waveguide apparatus, an optical coupler subsystem to optically couple light to or from the waveguide apparatus, and a control subsystem, used in the generation of a multi-focal volumetric display, image, or light field.

FIG. 6 is a schematic diagram showing an optical system including a waveguide apparatus, an optical coupler subsystem to optically couple light to or from the waveguide apparatus, and a control subsystem, used in the generation of a multi-focal volumetric display, image, or light field. The optical system can include a waveguide apparatus, an optical coupler subsystem to optically couple light to or from the waveguide apparatus, and a control subsystem. The optical system can be used to generate a multi-focal volumetric, image, or light field. The optical system can include one or more primary planar waveguides 632a (only one is shown in FIG. 6) and one or more DOEs 632b associated with each of at least some of the primary waveguides 632a. The planar waveguides 632b can be similar to the waveguides 432b, 434b, 436b, 438b, 440b discussed with reference to FIG. 4. The optical system may employ a distribution waveguide apparatus to relay light along a first axis (vertical or Y-axis in view of FIG. 6), and expand the light's effective exit pupil along the first axis (e.g., Y-axis). The distribution waveguide apparatus may, for example, include a distribution planar waveguide 622b and at least one DOE 622a (illustrated by double dash-dot line) associated with the distribution planar waveguide 622b. The distribution planar waveguide 622b may be similar or identical in at least some respects to the primary planar waveguide 632b, having a different orientation therefrom. Likewise, at least one DOE 622a may be similar or identical in at least some respects to the DOE 632a. For example, the distribution planar waveguide 622b or DOE 622a may be comprised of the same materials as the primary planar waveguide 632b or DOE 632a, respectively. Embodiments of the optical display system 600 shown in FIG. 6 can be integrated into the wearable system 200 shown in FIG. 2.

The relayed and exit-pupil expanded light may be optically coupled from the distribution waveguide apparatus into the one or more primary planar waveguides 632b. The primary planar waveguide 632b can relay light along a second axis, preferably orthogonal to first axis (e.g., horizontal or X-axis in view of FIG. 6). Notably, the second axis can be a non-orthogonal axis to the first axis. The primary planar waveguide 632b expands the light's effective exit pupil along that second axis (e.g., X-axis). For example, the distribution planar waveguide 622b can relay and expand light along the vertical or Y-axis, and pass that light to the primary planar waveguide 632b which can relay and expand light along the horizontal or X-axis.

The optical system may include one or more sources of colored light (e.g., red, green, and blue laser light) 610 which may be optically coupled into a proximal end of a single mode optical fiber 640. A distal end of the optical fiber 640 may be threaded or received through a hollow tube 642 of piezoelectric material. The distal end protrudes from the tube 642 as fixed-free flexible cantilever 644. The piezoelectric tube 642 can be associated with four quadrant electrodes (not illustrated). The electrodes may, for example, be plated on the outside, outer surface or outer periphery or diameter of the tube 642. A core electrode (not illustrated) may also be located in a core, center, inner periphery or inner diameter of the tube 642.

Drive electronics 650, for example electrically coupled via wires 660, drive opposing pairs of electrodes to bend the piezoelectric tube 642 in two axes independently. The protruding distal tip of the optical fiber 644 has mechanical modes of resonance. The frequencies of resonance can depend upon a diameter, length, and material properties of the optical fiber 644. By vibrating the piezoelectric tube 642 near a first mode of mechanical resonance of the fiber cantilever 644, the fiber cantilever 644 can be caused to vibrate, and can sweep through large deflections.

By stimulating resonant vibration in two axes, the tip of the fiber cantilever 644 is scanned biaxially in an area filling two-dimensional (2D) scan. By modulating an intensity of light source(s) 610 in synchrony with the scan of the fiber cantilever 644, light emerging from the fiber cantilever 644 can form an image. Descriptions of such a set up are provided in U.S. Patent Publication No. 2014/0003762, which is incorporated by reference herein in its entirety.

A component of an optical coupler subsystem can collimate the light emerging from the scanning fiber cantilever 644. The collimated light can be reflected by mirrored surface 648 into the narrow distribution planar waveguide 622b which contains the at least one diffractive optical element (DOE) 622a. The collimated light can propagate vertically (relative to the view of FIG. 6) along the distribution planar waveguide 622b by TIR, and in doing so repeatedly intersects with the DOE 622a. The DOE 622a preferably has a low diffraction efficiency. This can cause a fraction (e.g., 10%) of the light to be diffracted toward an edge of the larger primary planar waveguide 632b at each point of intersection with the DOE 622a, and a fraction of the light to continue on its original trajectory down the length of the distribution planar waveguide 622b via TIR.

At each point of intersection with the DOE 622a, additional light can be diffracted toward the entrance of the primary waveguide 632b. By dividing the incoming light into multiple outcoupled sets, the exit pupil of the light can be expanded vertically by the DOE 4 in the distribution planar waveguide 622b. This vertically expanded light coupled out of distribution planar waveguide 622b can enter the edge of the primary planar waveguide 632b.

Light entering primary waveguide 632b can propagate horizontally (relative to the view of FIG. 6) along the primary waveguide 632b via TIR. As the light intersects with DOE 632a at multiple points as it propagates horizontally along at least a portion of the length of the primary waveguide 632b via TIR. The DOE 632a may advantageously be designed or configured to have a phase profile that is a summation of a linear diffraction pattern and a radially symmetric diffractive pattern, to produce both deflection and focusing of the light. The DOE 632a may advantageously have a low diffraction efficiency (e.g., 10%), so that only a portion of the light of the beam is deflected toward the eye of the view with each intersection of the DOE 632a while the rest of the light continues to propagate through the primary waveguide 632b via TIR.

At each point of intersection between the propagating light and the DOE 632a, a fraction of the light is diffracted toward the adjacent face of the primary waveguide 632b allowing the light to escape the TIR, and emerge from the face of the primary waveguide 632b. In some embodiments, the radially symmetric diffraction pattern of the DOE 632a additionally imparts a focus level to the diffracted light, both shaping the light wavefront (e.g., imparting a curvature) of the individual beam as well as steering the beam at an angle that matches the designed focus level.

Accordingly, these different pathways can cause the light to be coupled out of the primary planar waveguide 632b by a multiplicity of DOEs 632a at different angles, focus levels, and/or yielding different fill patterns at the exit pupil. Different fill patterns at the exit pupil can be beneficially used to create a light field display with multiple depth planes. Each layer in the waveguide assembly or a set of layers (e.g., 3 layers) in the stack may be employed to generate a respective color (e.g., red, blue, green). Thus, for example, a first set of three adjacent layers may be employed to respectively produce red, blue and green light at a first focal depth. A second set of three adjacent layers may be employed to respectively produce red, blue and green light at a second focal depth. Multiple sets may be employed to generate a full 3D or 4D color image light field with various focal depths.

Other Components of the Wearable System

In many implementations, the wearable system may include other components in addition or in alternative to the components of the wearable system described above. The wearable system may, for example, include one or more haptic devices or components. The haptic devices or components may be operable to provide a tactile sensation to a user. For example, the haptic devices or components may provide a tactile sensation of pressure or texture when touching virtual content (e.g., virtual objects, virtual tools, other virtual constructs). The tactile sensation may replicate a feel of a physical object which a virtual object represents, or may replicate a feel of an imagined object or character (e.g., a dragon) which the virtual content represents. In some implementations, haptic devices or components may be worn by the user (e.g., a user wearable glove). In some implementations, haptic devices or components may be held by the user.

The wearable system may, for example, include one or more physical objects which are manipulable by the user to allow input or interaction with the wearable system. These physical objects may be referred to herein as totems. Some totems may take the form of inanimate objects, such as for example, a piece of metal or plastic, a wall, a surface of table. In certain implementations, the totems may not actually have any physical input structures (e.g., keys, triggers, joystick, trackball, rocker switch). Instead, the totem may simply provide a physical surface, and the wearable system may render a user interface so as to appear to a user to be on one or more surfaces of the totem. For example, the wearable system may render an image of a computer keyboard and trackpad to appear to reside on one or more surfaces of a totem. For example, the wearable system may render a virtual computer keyboard and virtual trackpad to appear on a surface of a thin rectangular plate of aluminum which serves as a totem. The rectangular plate does not itself have any physical keys or trackpad or sensors. However, the wearable system may detect user manipulation or interaction or touches with the rectangular plate as selections or inputs made via the virtual keyboard or virtual trackpad. The user input device 466 (shown in FIG. 4) may be an embodiment of a totem, which may include a trackpad, a touchpad, a trigger, a joystick, a trackball, a rocker or virtual switch, a mouse, a keyboard, a multi-degree-of-freedom controller, or another physical input device. A user may use the totem, alone or in combination with poses, to interact with the wearable system or other users.

Examples of haptic devices and totems usable with the wearable devices, HMD, and display systems of the present disclosure are described in U.S. Patent Publication No. 2015/0016777, which is incorporated by reference herein in its entirety.

Example Wearable Systems, Environments, and Interfaces

A wearable system may employ various mapping related techniques in order to achieve high depth of field in the rendered light fields. In mapping out the virtual world, it is advantageous to know all the features and points in the real world to accurately portray virtual objects in relation to the real world. To this end, FOV images captured from users of the wearable system can be added to a world model by including new pictures that convey information about various points and features of the real world. For example, the wearable system can collect a set of map points (such as 2D points or 3D points) and find new map points to render a more accurate version of the world model. The world model of a first user can be communicated (e.g., over a network such as a cloud network) to a second user so that the second user can experience the world surrounding the first user.

Figure 7:
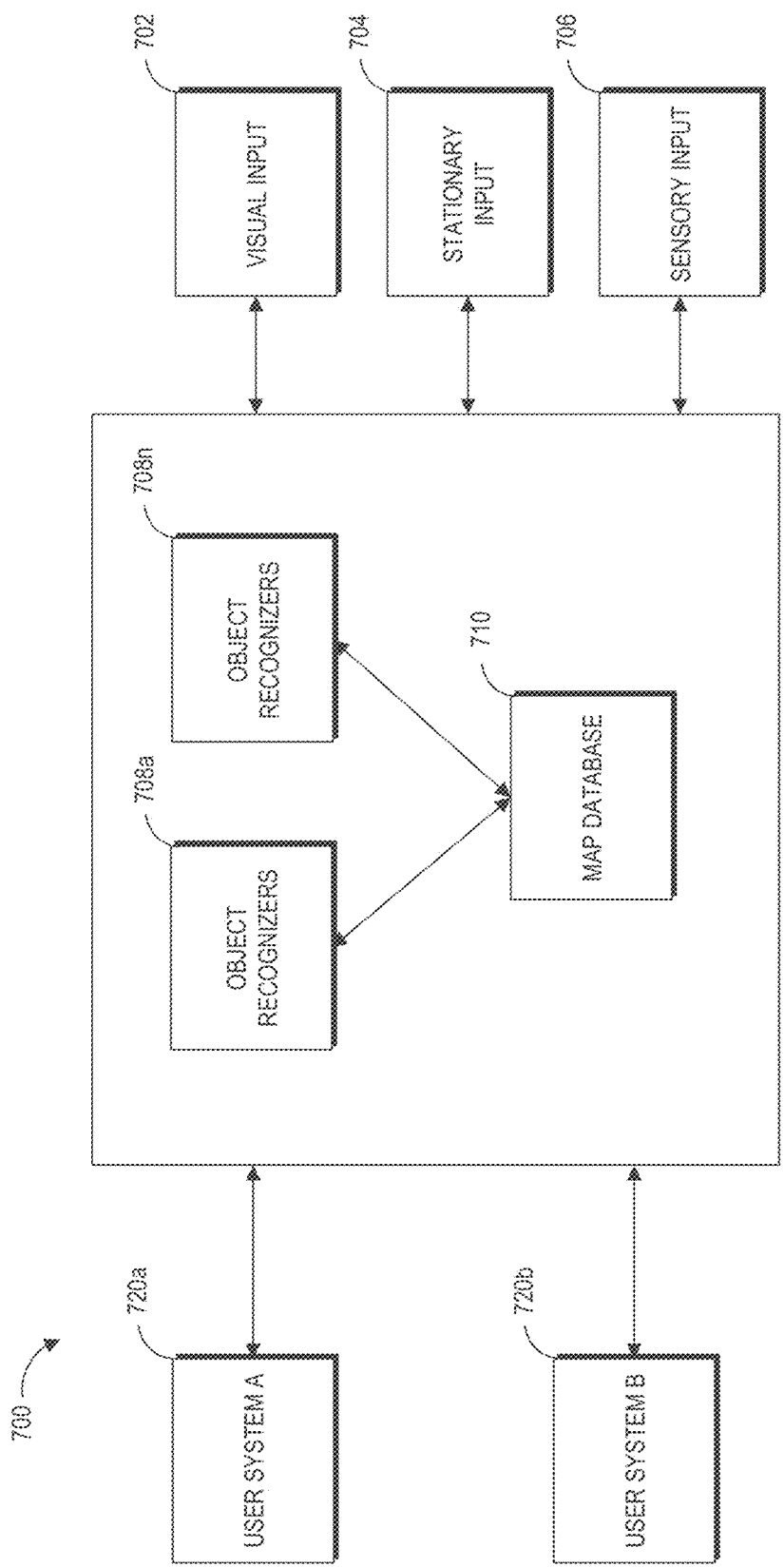
FIG. 7 is a block diagram of an example of a wearable system.

FIG. 7 is a block diagram of an example of an MR environment 700. The MR environment 700 may be configured to receive input (e.g., visual input 702 from the user's wearable system, stationary input 704 such as room cameras, sensory input 706 from various sensors, gestures, totems, eye tracking, user input from the user input device 466 etc.) from one or more user wearable systems (e.g., wearable system 200 or display system 220) or stationary room systems (e.g., room cameras, etc.). The wearable systems can use various sensors (e.g., accelerometers, gyroscopes, temperature sensors, movement sensors, depth sensors, GPS sensors, inward-facing imaging system, outward-facing imaging system, etc.) to determine the location and various other attributes of the environment of the user. This information may further be supplemented with information from stationary cameras in the room that may provide images or various cues from a different point of view. The image data acquired by the cameras (such as the room cameras and/or the cameras of the outward-facing imaging system) may be reduced to a set of mapping points.

One or more object recognizers 708 can crawl through the received data (e.g., the collection of points) and recognize or map points, tag images, attach semantic information to objects with the help of a map database 710. The map database 710 may comprise various points collected over time and their corresponding objects. The various devices and the map database can be connected to each other through a network (e.g., LAN, WAN, etc.) to access the cloud.

Based on this information and collection of points in the map database, the object recognizers 708a to 708n may recognize objects in an environment. For example, the object recognizers can recognize faces, persons, windows, walls, user input devices, televisions, other objects in the user's environment, etc. One or more object recognizers may be specialized for object with certain characteristics.

For example, the object recognizer 708a may be used to recognizer faces, while another object recognizer may be used recognize totems.

The object recognitions may be performed using a variety of computer vision techniques. For example, the wearable system can analyze the images acquired by the outward-facing imaging system 464 (shown in FIG. 4) to perform scene reconstruction, event detection, video tracking, object recognition, object pose estimation, learning, indexing, motion estimation, or image restoration, etc. One or more computer vision algorithms may be used to perform these tasks. Non-limiting examples of computer vision algorithms include: Scale-invariant feature transform (SIFT), speeded up robust features (SURF), oriented FAST and rotated BRIEF (ORB), binary robust invariant scalable keypoints (BRISK), fast retina keypoint (FREAK), Viola-Jones algorithm, Eigenfaces approach, Lucas-Kanade algorithm, Horn-Schunk algorithm, Mean-shift algorithm, visual simultaneous location and mapping (vSLAM) techniques, a sequential Bayesian estimator (e.g., Kalman filter, extended Kalman filter, etc.), bundle adjustment, Adaptive thresholding (and other thresholding techniques), Iterative Closest Point (ICP), Semi Global Matching (SGM), Semi Global Block Matching (SGBM), Feature Point Histograms, various machine learning algorithms (such as e.g., support vector machine, k-nearest neighbors algorithm, Naive Bayes, neural network (including convolutional or deep neural networks), or other supervised/unsupervised models, etc.), and so forth.

The object recognitions can additionally or alternatively be performed by a variety of machine learning algorithms. Once trained, the machine learning algorithm can be stored by the HMD. Some examples of machine learning algorithms can include supervised or non-supervised machine learning algorithms, including regression algorithms (such as, for example, Ordinary Least Squares Regression), instance-based algorithms (such as, for example, Learning Vector Quantization), decision tree algorithms (such as, for example, classification and regression trees), Bayesian algorithms (such as, for example, Naive Bayes), clustering algorithms (such as, for example, k-means clustering), association rule learning algorithms (such as, for example, a-priori algorithms), artificial neural network algorithms (such as, for example, Perceptron), deep learning algorithms (such as, for example, Deep Boltzmann Machine, or deep neural network), dimensionality reduction algorithms (such as, for example, Principal Component Analysis), ensemble algorithms (such as, for example, Stacked Generalization), and/or other machine learning algorithms. In some embodiments, individual models can be customized for individual data sets. For example, the wearable device can generate or store a base model. The base model may be used as a starting point to generate additional models specific to a data type (e.g., a particular user in the telepresence session), a data set (e.g., a set of additional images obtained of the user in the telepresence session), conditional situations, or other variations. In some embodiments, the wearable HMD can be configured to utilize a plurality of techniques to generate models for analysis of the aggregated data. Other techniques may include using pre-defined thresholds or data values.

Based on this information and collection of points in the map database, the object recognizers 708a to 708n may recognize objects and supplement objects with semantic information to give life to the objects. For example, if the object recognizer recognizes a set of points to be a door, the system may attach some semantic information (e.g., the door has a hinge and has a 90 degree movement about the hinge). If the object recognizer recognizes a set of points to be a mirror, the system may attach semantic information that the mirror has a reflective surface that can reflect images of objects in the room. Over time the map database grows as the system (which may reside locally or may be accessible through a wireless network) accumulates more data from the world. Once the objects are recognized, the information may be transmitted to one or more wearable systems. For example, the MR environment 700 may include information about a scene happening in California. The environment 700 may be transmitted to one or more users in New York. Based on data received from an FOV camera and other inputs, the object recognizers and other software components can map the points collected from the various images, recognize objects etc., such that the scene may be accurately "passed over" to a second user, who may be in a different part of the world. The environment 700 may also use a topological map for localization purposes.

Figure 8:
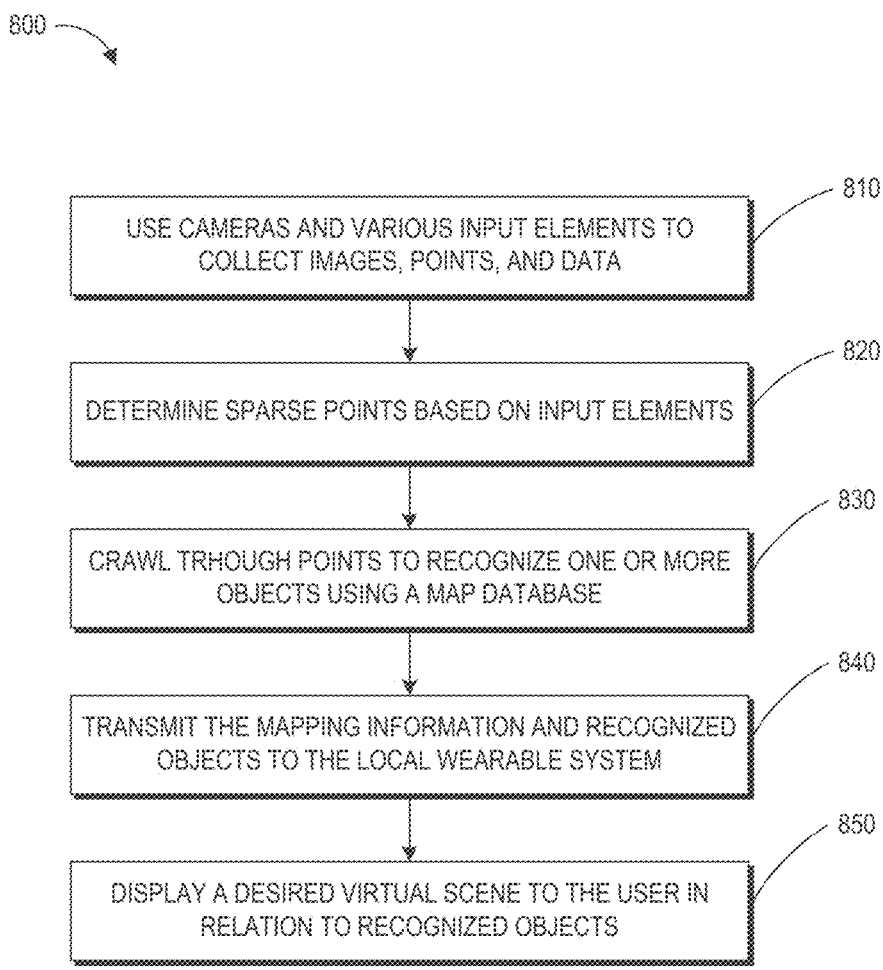
FIG. 8 is a process flow diagram of an example of a method of rendering virtual content in relation to recognized objects.

FIG. 8 is a process flow diagram of an example of a method 800 of rendering virtual content in relation to recognized objects. The method 800 describes how a virtual scene may be represented to a user of the wearable system. The user may be geographically remote from the scene. For example, the user may be New York, but may want to view a scene that is presently going on in California, or may want to go on a walk with a friend who resides in California.

At block 810, the wearable system may receive input from the user and other users regarding the environment of the user. This may be achieved through various input devices, and knowledge already possessed in the map database. The user's FOV camera, sensors, GPS, eye tracking, etc., convey information to the system at block 810. The system may determine sparse points based on this information at block 820. The sparse points may be used in determining pose data (e.g., head pose, eye pose, body pose, or hand gestures) that can be used in displaying and understanding the orientation and position of various objects in the user's surroundings. The object recognizers 708a-708n may crawl through these collected points and recognize one or more objects using a map database at block 830. This information may then be conveyed to the user's individual wearable system at block 840, and the desired virtual scene may be accordingly displayed to the user at block 850. For example, the desired virtual scene (e.g., user in CA) may be displayed at the appropriate orientation, position, etc., in relation to the various objects and other surroundings of the user in New York.

Figure 9:
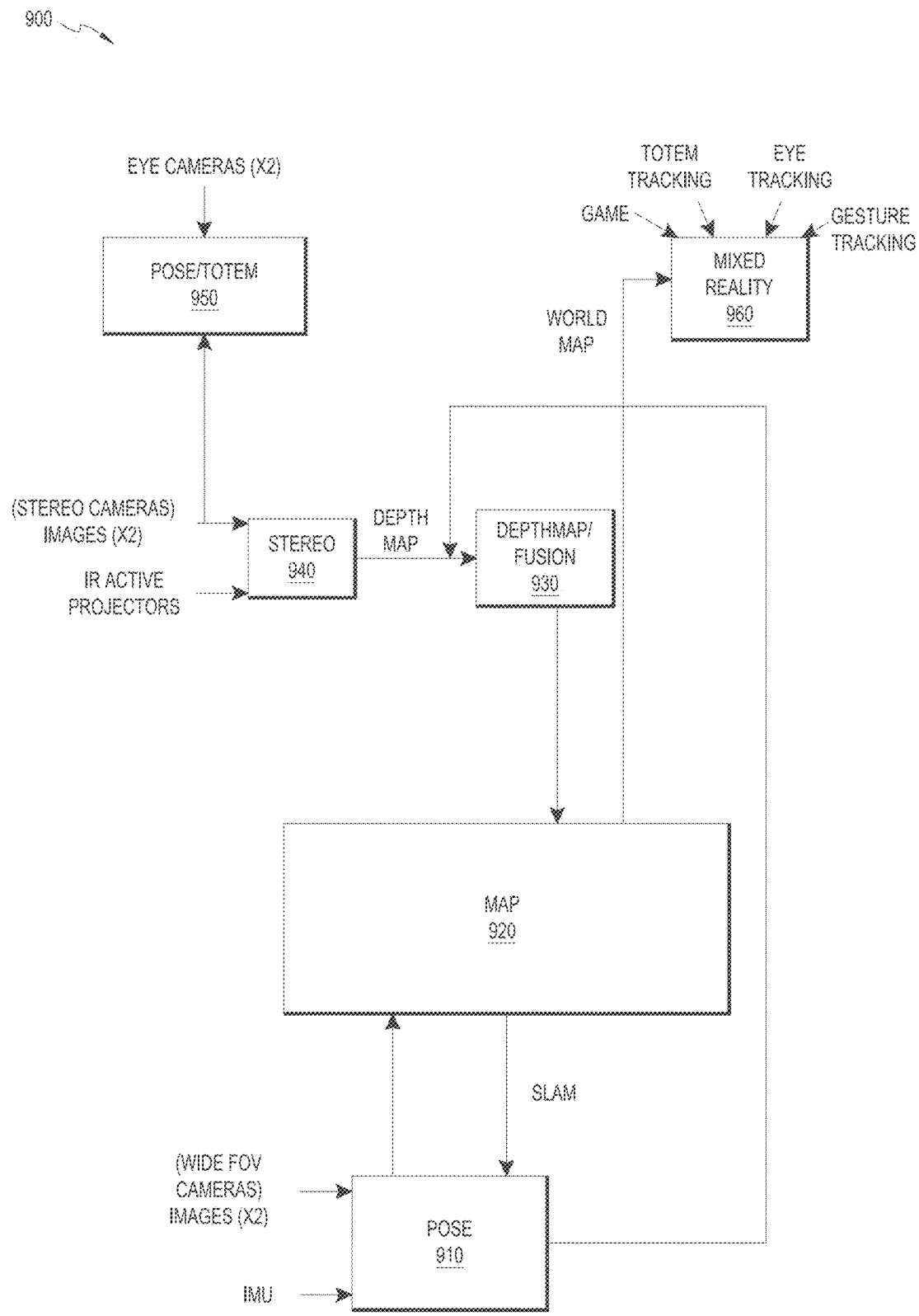
FIG. 9 is a block diagram of another example of a wearable system.

FIG. 9 is a block diagram of another example of a wearable system. In this example, the wearable system 900 comprises a map, which may include map data for the world. The map may partly reside locally on the wearable system, and may partly reside at networked storage locations accessible by wired or wireless network (e.g., in a cloud system). A pose process 910 may be executed on the wearable computing architecture (e.g., processing module 260 or controller 460) and utilize data from the map to determine position and orientation of the wearable computing hardware or user. Pose data may be computed from data collected on the fly as the user is experiencing the system and operating in the world. The data may comprise images, data from sensors (such as inertial measurement units, which generally comprise accelerometer and gyroscope components) and surface information pertinent to objects in the real or virtual environment.

A sparse point representation may be the output of a simultaneous localization and mapping (SLAM or V-SLAM, referring to a configuration wherein the input is images/ visual only) process. The system can be configured to not only find out where in the world the various components are, but what the world is made of. Pose may be a building block that achieves many goals, including populating the map and using the data from the map.

In one embodiment, a sparse point position may not be completely adequate on its own, and further information may be needed to produce a multifocal AR, VR, or MR experience. Dense representations, generally referring to depth map information, may be utilized to fill this gap at least in part. Such information may be computed from a process referred to as Stereo 940, wherein depth information is determined using a technique such as triangulation or time-of-flight sensing. Image information and active patterns (such as infrared patterns created using active projectors) may serve as input to the Stereo process 940. A significant amount of depth map information may be fused together, and some of this may be summarized with a surface representation. For example, mathematically definable surfaces may be efficient (e.g., relative to a large point cloud) and digestible inputs to other processing devices like game engines. Thus, the output of the stereo process (e.g., a depth map) 940 may be combined in the fusion process 930. Pose may be an input to this fusion process 930 as well, and the output of fusion 930 becomes an input to populating the map process 920. Sub-surfaces may connect with each other, such as in topographical mapping, to form larger surfaces, and the map becomes a large hybrid of points and surfaces.

To resolve various aspects in a mixed reality process 960, various inputs may be utilized. For example, in the embodiment depicted in FIG. 9, Game parameters may be inputs to determine that the user of the system is playing a monster battling game with one or more monsters at various locations, monsters dying or running away under various conditions (such as if the user shoots the monster), walls or other objects at various locations, and the like. The world map may include information regarding where such objects are relative to each other, to be another valuable input to mixed reality. Pose relative to the world becomes an input as well and plays a key role to almost any interactive system.

Controls or inputs from the user are another input to the wearable system 900. As described herein, user inputs can include visual input, gestures, totems, audio input, sensory input, etc. In order to move around or play a game, for example, the user may need to instruct the wearable system 900 regarding what he or she wants to do. Beyond just moving oneself in space, there are various forms of user controls that may be utilized. In one embodiment, a totem (e.g. a user input device), or an object such as a toy gun may be held by the user and tracked by the system. The system preferably will be configured to know that the user is holding the item and understand what kind of interaction the user is having with the item (e.g., if the totem or object is a gun, the system may be configured to understand location and orientation, as well as whether the user is clicking a trigger or other sensed button or element which may be equipped with a sensor, such as an IMU, which may assist in determining what is going on, even when such activity is not within the field of view of any of the cameras.)

Hand gesture tracking or recognition may also provide input information. The wearable system 900 may be configured to track and interpret hand gestures for button presses, for gesturing left or right, stop, grab, hold, etc. For example, in one configuration, the user may want to flip through emails or a calendar in a non-gaming environment, or do a "fist bump" with another person or player. The wearable system 900 may be configured to leverage a minimum amount of hand gesture, which may or may not be dynamic. For example, the gestures may be simple static gestures like open hand for stop, thumbs up for ok, thumbs down for not ok; or a hand flip right, or left, or up/down for directional commands.

Eye tracking is another input (e.g., tracking where the user is looking to control the display technology to render at a specific depth or range). In one embodiment, vergence of the eyes may be determined using triangulation, and then using a vergence/accommodation model developed for that particular person, accommodation may be determined.

With regard to the camera systems, the example wearable system 900 shown in FIG. 9 can include three pairs of cameras: a relative wide FOV or passive SLAM pair of cameras arranged to the sides of the user's face, a different pair of cameras oriented in front of the user to handle the stereo imaging process 940 and also to capture hand gestures and totem/object tracking in front of the user's face. The FOV cameras and the pair of cameras for the stereo process 940 may be a part of the outward-facing imaging system 464 (shown in FIG. 4). The wearable system 900 can include eye tracking cameras (which may be a part of an inward-facing imaging system 462 shown in FIG. 4) oriented toward the eyes of the user in order to triangulate eye vectors and other information. The wearable system 900 may also comprise one or more textured light projectors (such as infrared (IR) projectors) to inject texture into a scene.

Figure 10:
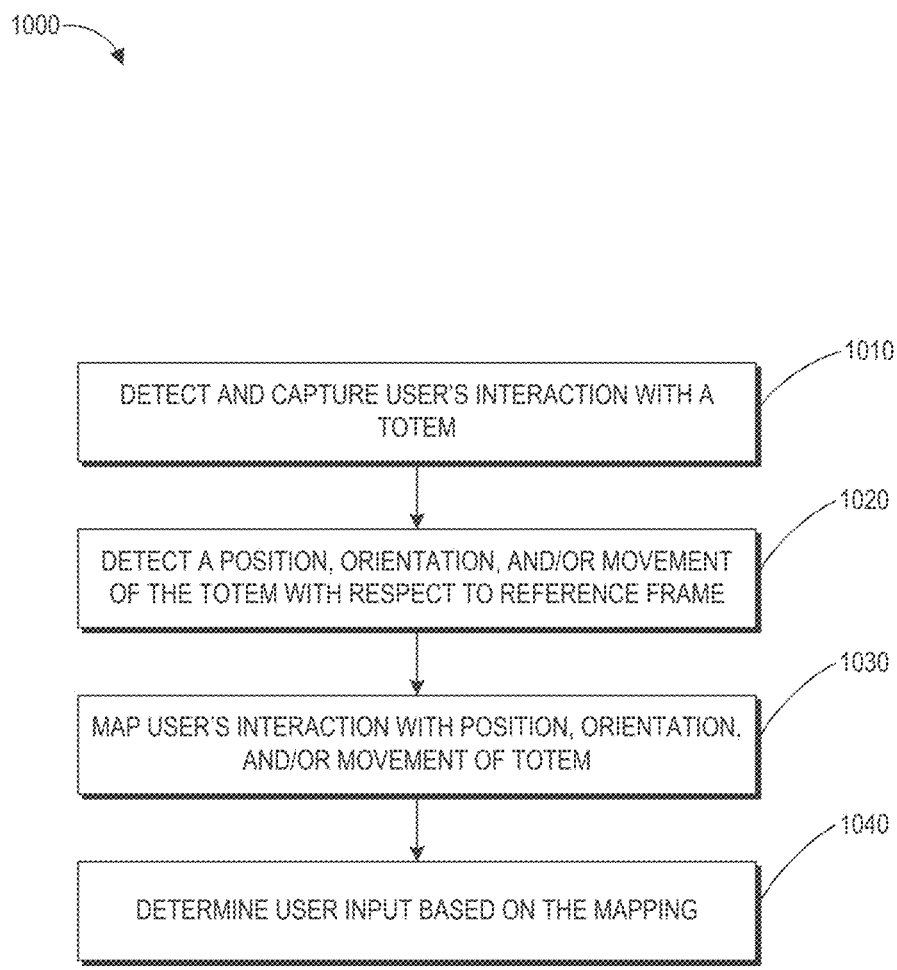
FIG. 10 is a process flow diagram of an example of a method for determining user input to a wearable system.

FIG. 10 is a process flow diagram of an example of a method 1000 for determining user input to a wearable system. In this example, the user may interact with a totem. The user may have multiple totems. For example, the user may have designated one totem for a social media application, another totem for playing games, etc. At block 1010, the wearable system may detect a motion of a totem. The movement of the totem may be recognized through the outward facing system or may be detected through sensors (e.g., haptic glove, image sensors, hand tracking devices, eye-tracking cameras, head pose sensors, etc.).

Based at least partly on the detected gesture, eye pose, head pose, or input through the totem, the wearable system detects a position, orientation, and/or movement of the totem (or the user's eyes or head or gestures) with respect to a reference frame, at block 1020. The reference frame may be a set of map points based on which the wearable system translates the movement of the totem (or the user) to an action or command. At block 1030, the user's interaction with the totem is mapped. Based on the mapping of the user interaction with respect to the reference frame 1020, the system determines the user input at block 1040.

For example, the user may move a totem or physical object back and forth to signify turning a virtual page and moving on to a next page or moving from one user interface (UI) display screen to another UI screen. As another example, the user may move their head or eyes to look at different real or virtual objects in the user's FOR. If the user's gaze at a particular real or virtual object is longer than a threshold time, the real or virtual object may be selected as the user input. In some implementations, the vergence of the user's eyes can be tracked and an accommodation/vergence model can be used to determine the accommodation state of the user's eyes, which provides information on a depth plane on which the user is focusing. In some implementations, the wearable system can use ray casting techniques to determine which real or virtual objects are along the direction of the user's head pose or eye pose. In various implementations, the ray casting techniques can include casting thin, pencil rays with substantially little transverse width or casting rays with substantial transverse width (e.g., cones or frustums).

The user interface may be projected by the display system as described herein (such as the display 220 in FIG. 2). It may also be displayed using a variety of other techniques such as one or more projectors. The projectors may project images onto a physical object such as a canvas or a globe. Interactions with user interface may be tracked using one or more cameras external to the system or part of the system (such as, e.g., using the inward-facing imaging system 462 or the outward-facing imaging system 464).

Figure 11:
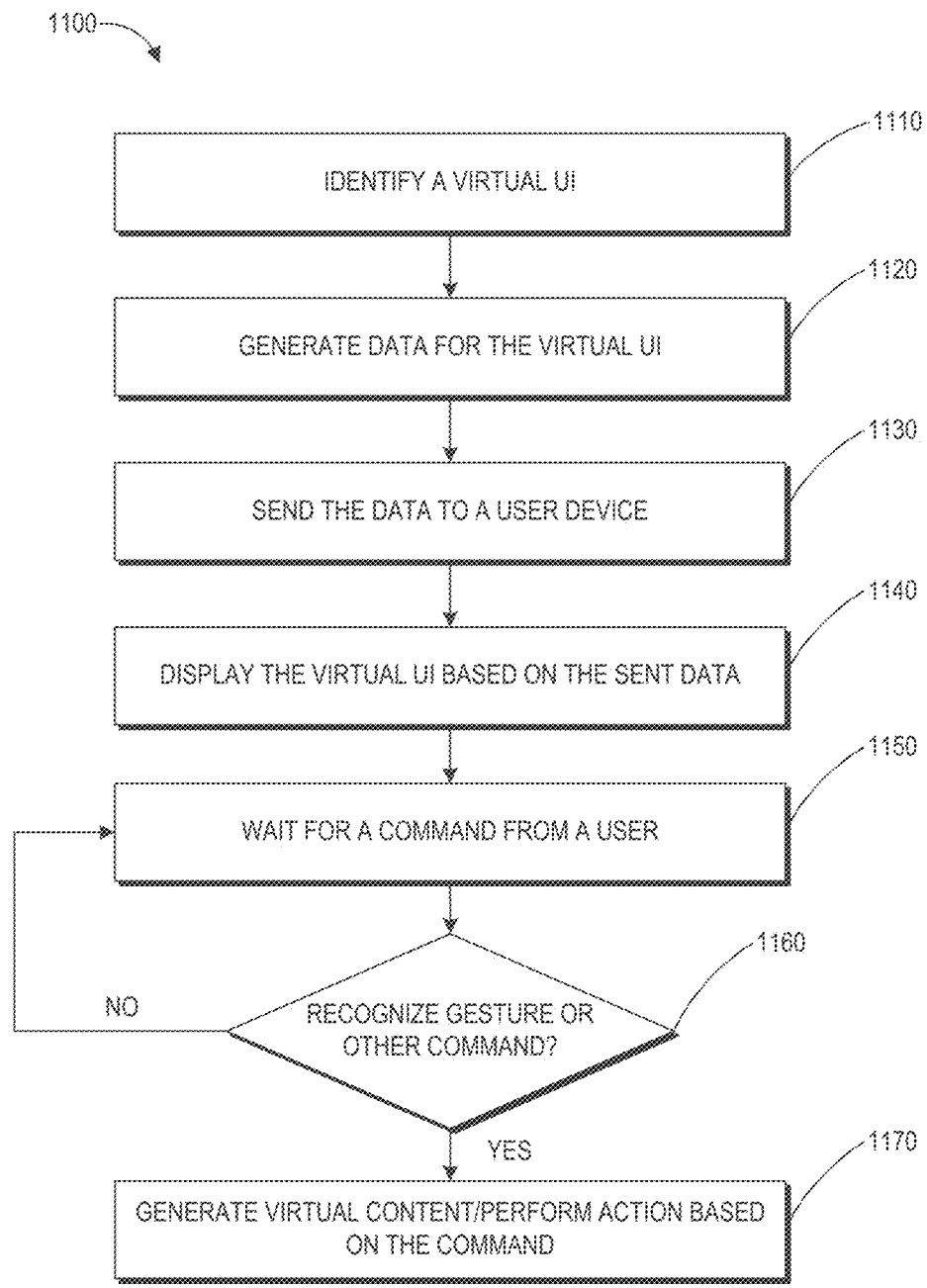
FIG. 11 is a process flow diagram of an example of a method for interacting with a virtual user interface.

FIG. 11 is a process flow diagram of an example of a method 1100 for interacting with a virtual user interface. The method 1100 may be performed by the wearable system described herein.

At block 1110, the wearable system may identify a particular UI. The type of UI may be predetermined by the user. The wearable system may identify that a particular UI needs to be populated based on a user input (e.g., gesture, visual data, audio data, sensory data, direct command, etc.). At block 1120, the wearable system may generate data for the virtual UI. For example, data associated with the confines, general structure, shape of the UI etc., may be generated. In addition, the wearable system may determine map coordinates of the user's physical location so that the wearable system can display the UI in relation to the user's physical location. For example, if the UI is body centric, the wearable system may determine the coordinates of the user's physical stance, head pose, or eye pose such that a ring UI can be displayed around the user or a planar UI can be displayed on a wall or in front of the user. If the UI is hand centric, the map coordinates of the user's hands may be determined. These map points may be derived through data received through the FOV cameras, sensory input, or any other type of collected data.

At block 1130, the wearable system may send the data to the display from the cloud or the data may be sent from a local database to the display components. At block 1140, the UI is displayed to the user based on the sent data. For example, a light field display can project the virtual UI into one or both of the user's eyes. Once the virtual UI has been created, the wearable system may simply wait for a command from the user to generate more virtual content on the virtual UI at block 1150. For example, the UI may be a body centric ring around the user's body. The wearable system may then wait for the command (a gesture, a head or eye movement, input from a user input device, etc.), and if it is recognized (block 1160), virtual content associated with the command may be displayed to the user (block 1170). As an example, the wearable system may wait for user's hand gestures before mixing multiple steam tracks.

Additional examples of wearable systems, UIs, and user experiences (UX) are described in U.S. Patent Publication No. 2015/0016777, which is incorporated by reference herein in its entirety.

Examples of Eye Tracking Calibration

As described herein, a user can interact with a wearable device using eye gaze, which may include the direction that user's eye is pointed toward. Eye gaze (sometimes also referred to herein as eye pose) may be measured from a fiducial direction (typically the forward direction to which the user's eyes naturally point) and is often measured with two angles (e.g., elevation and azimuth relative to the fiducial direction) or three angles (e.g., elevation, azimuth, and additionally a roll angle). To provide a realistic and intuitive interaction with objects in the user's environment using eye gaze, the wearable system can use an eye tracking calibration to calibrate the wearable device to incorporate uniqueness of user's eye features and other conditions that may have some effect on eye measurements.

Eye tracking calibration involves a process for enabling a computing device to learn how to associate a user's eye gaze (e.g., as identified in eye images) with gaze points in a 3D space. An eye gaze may be associated with a single point in the 3D space. An eye gaze can also be associated with multiple points in the 3D space, which can describe a movement of a virtual object (e.g., a series of points describing movement of the virtual avatar 140 described above with reference to FIG. 1 or the virtual butterfly described below with reference to FIG. 12B).

The wearable system can determine a user's eye gaze based on eye images. The wearable system can obtain eye images using sensors (e.g., eye cameras) in the inward-facing imaging system 462. The wearable system can image one or both eyes of the user while the user changes his or her eye gazes (such as, e.g., when the user is looking around to follow a moving calibration target). To map a user's eye image with a point of gaze, the wearable system can present a virtual target for the user to look at. The virtual target may be associated with one or more known points of gaze in the 3D space. While the user is looking at the target, the wearable system can acquire eye image(s) and associate the image(s) with gaze point(s). The wearable system can calculate a mapping matrix based on the associations of an eye image and a point of gaze associated with the target. The mapping matrix can provide an association between measurements of the user's eye gaze and a gaze vector (which can indicate the user's direction of gaze).

The mapping matrix may be generated using various machine learning techniques described with reference to FIG. 7. For example, a component of the wearable system, such as the remote processing module 270, can receive eye images and target's positions as input and generate the mapping matrix as an output by analyzing associations of eye images and gaze points using machine learning techniques. Eye gaze calculation techniques that can be used include feature-based techniques that detect and localize image features (e.g., iris features or the shape of the pupillary or limbic boundaries) or model-based approaches that do not explicitly identify features but rather calculate a best fitting eye model that is consistent with the obtained eye image(s). Some techniques (e.g., starburst) are hybrid approaches that include aspects of both feature-based and model-based eye gaze techniques.

Once trained, the wearable system can apply the mapping matrix to determine the user's direction of gaze. For example, the wearable system can observe an eye gaze while a user is interacting with a virtual object and input the eye gaze into the mapping matrix to determine the user's gaze points. The gaze points may be used in ray casting to identify an object of interest which intersects with the user's direction of gaze. For example, the wearable system can cast a ray in the user's direction of gaze to identify and select virtual objects that are "hit" by the ray. In some cases, the ray can be a line with negligible lateral width, whereas in other cases, the ray can be a cone subtending a solid angle and having a lateral width. The wearable system can accordingly allow the user to select or perform other user interface operations based on the determined object of interest.

The calibration result can reflect uniqueness in each person's eyes. For example, the wearable system can generate a mapping matrix customized to one or both eyes of a specific individual. For example, the users may have different amounts of eye movements or eye gazes in response to a specific target. As a result, by generating a calibration result specific to an individual user, the wearable system may allow more accurate user interactions with eye gazes.

Figure 12A:
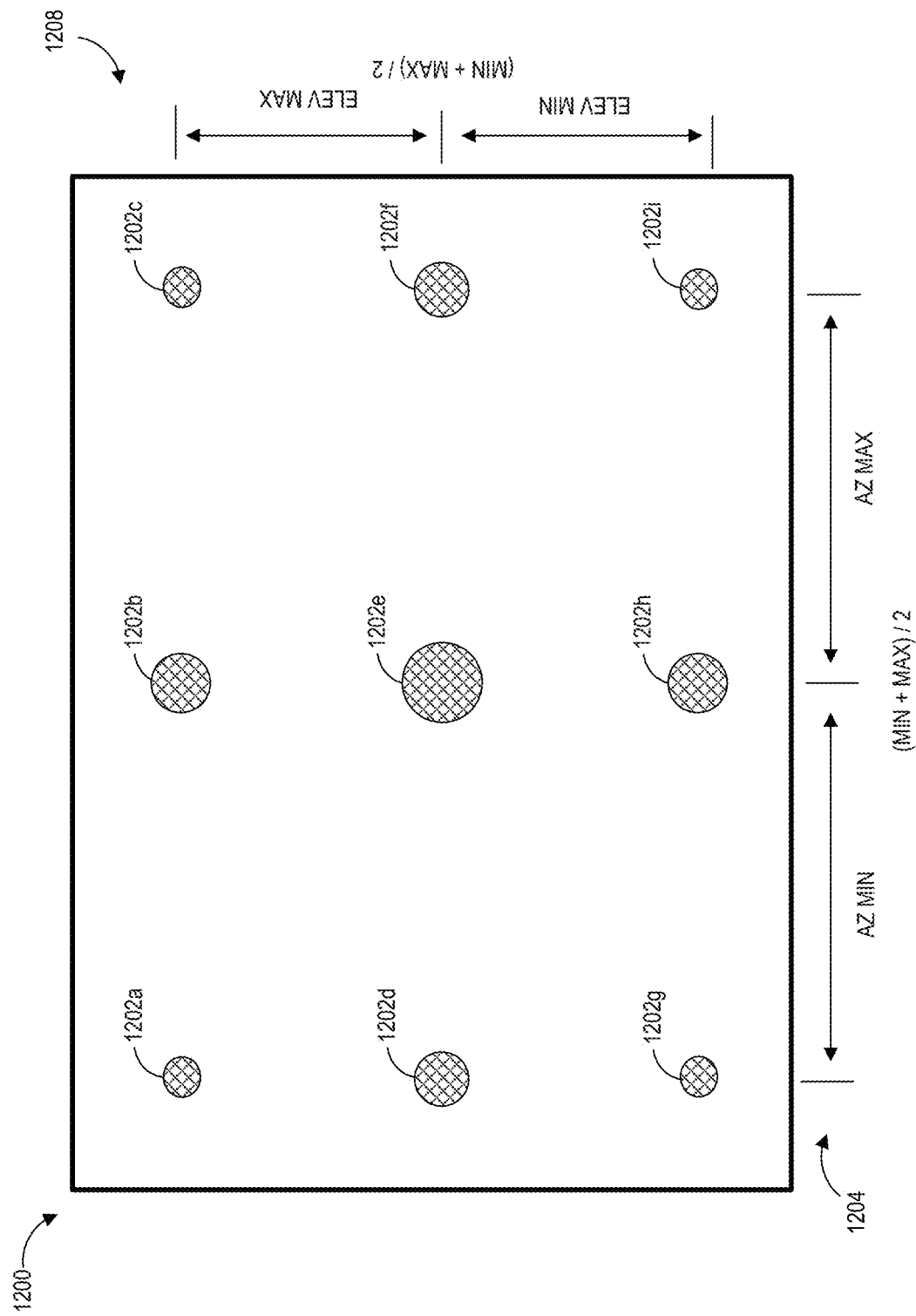
FIG. 12A illustrates example targets in an eye tracking calibration process.

FIG. 12A illustrates example targets in an eye tracking calibration process. FIG. 12A illustrates nine virtual targets in a user's FOV 1200. The user's FOV 1200 can include a portion of the user's FOR that the user can perceive at a given time. The nine targets 1202a-1202i can be rendered at different depths. For example, the target 1202e is at a depth plane that appears closer to the user than the target 1202a. As a result, the target 1202e appears larger than the target 1202a to the user. The nine targets can be rendered sequentially to a user during the eye tracking calibration process. For example, the wearable system may render target 1202e first, followed by the target 1202c, then followed by the target 1202b, and so forth. As described further below with reference to FIG. 12B, in some embodiments, a single target is displayed to the user, and the target moves around the user's field of view (for example, passing or temporarily stopping at the positions 1202a-1202i during the target's movement). The wearable system can acquire an image of the user's eyes while the user is looking at these targets. For example, the wearable system can acquire a first image when the user is looking at the target 1202e while acquiring a second image when the user is looking at the target 1202c, and a third image when the user is looking at the target 1202b, and so forth. The wearable system can accordingly match the first image to the position of the target 1202e and match the second image to the position of the target 1202c, and match the third image to the position of the target 1202b, and so forth. Although nine targets are shown in FIG. 12A, this is for illustration and in other implementations, fewer or more targets (or target locations) can be used, and their positions can be different than shown.

The locations of the targets can be represented by positions in a rig space. The rig space may include a coordinate system fixed with reference to the wearable device (e.g., the HMD described herein). The coordinate system can be represented as a Cartesian x-y-z coordinate system. In this example, the horizontal axis (x) is represented by the axis 1204 (also referred to as azimuth) and the vertical axis (y) is represented by the axis 1208 (also referred to as elevation). The axis (z) associated with the depth from the user is not shown in FIG. 12A.

As illustrated, the target 1202e is in the center of the nine virtual targets. Therefore, the x-axis position of the target 1202e can be calculated by 0.5 times the sum of the x-axis 1204 value of the left most virtual objects (e.g., objects 1202a, 1202d, 1202g) and the x-axis 1204 value of the right most virtual objects (e.g., objects 1202c, 1202f, 1202i). Similarly, the y-axis position of the target 1202e can be calculated by 0.5 times the sum of the y-axis 1208 value of the virtual objects on the top of the FOV (e.g., objects 1202a, 1202b, 1202c) and the y-axis 1208 value of the virtual objects on the bottom of the FOV (e.g., objects 1202g, 1202h, 1202i).

The wearable system can present a target in various eye pose regions of the display 220. The target can be shown as a graphic (such as a realistic or animated butterfly or bumble bee, or an avatar). A graphic may be a still image that appears at a position in the FOV or appears to move from position to position within the FOV.

The target can be displayed in various eye pose regions of the display 220 until an eye image of a sufficient eye image quality is obtained for one or more eye pose regions of the display 220. For example, the quality of an eye image can be determined and compared to an image quality threshold to determine that the eye image has an image quality that can be used for a biometric application (e.g., the generation of iris codes). If an eye image in a certain eye pose region does not pass or satisfy an image quality threshold, the display 220 can be configured to continue display one or more graphics in that particular region, until an eye image of a sufficient eye image quality is obtained. The one or more graphics displayed in one particular region can be the same or different in different implementations. For example, the graphic can be displayed at the same or different locations or in the same or different orientations in that particular region.

A graphic can be displayed in the various eye pose regions of the display 220 using a story mode or a mode that can direct or attract a wearer's one or both eyes toward different regions of the display 220. For example, in one embodiment described below with reference to FIG. 12B, a virtual avatar (e.g., a butterfly) can be shown to move across the various regions of the display 220. The instances of the graphic displayed in various regions of the display 220 can have properties (for example, different depths, colors, or sizes) that attract or direct a wearer's one or both eyes toward one or more eye pose regions in which the instances of the graphic are displayed. In some embodiments, the graphics displayed in various regions of the display 220 can appear to have varying depths so that a wearer's one or both eyes are attracted toward eye pose regions in which the instances of the graphic are displayed.

Figure 12B:
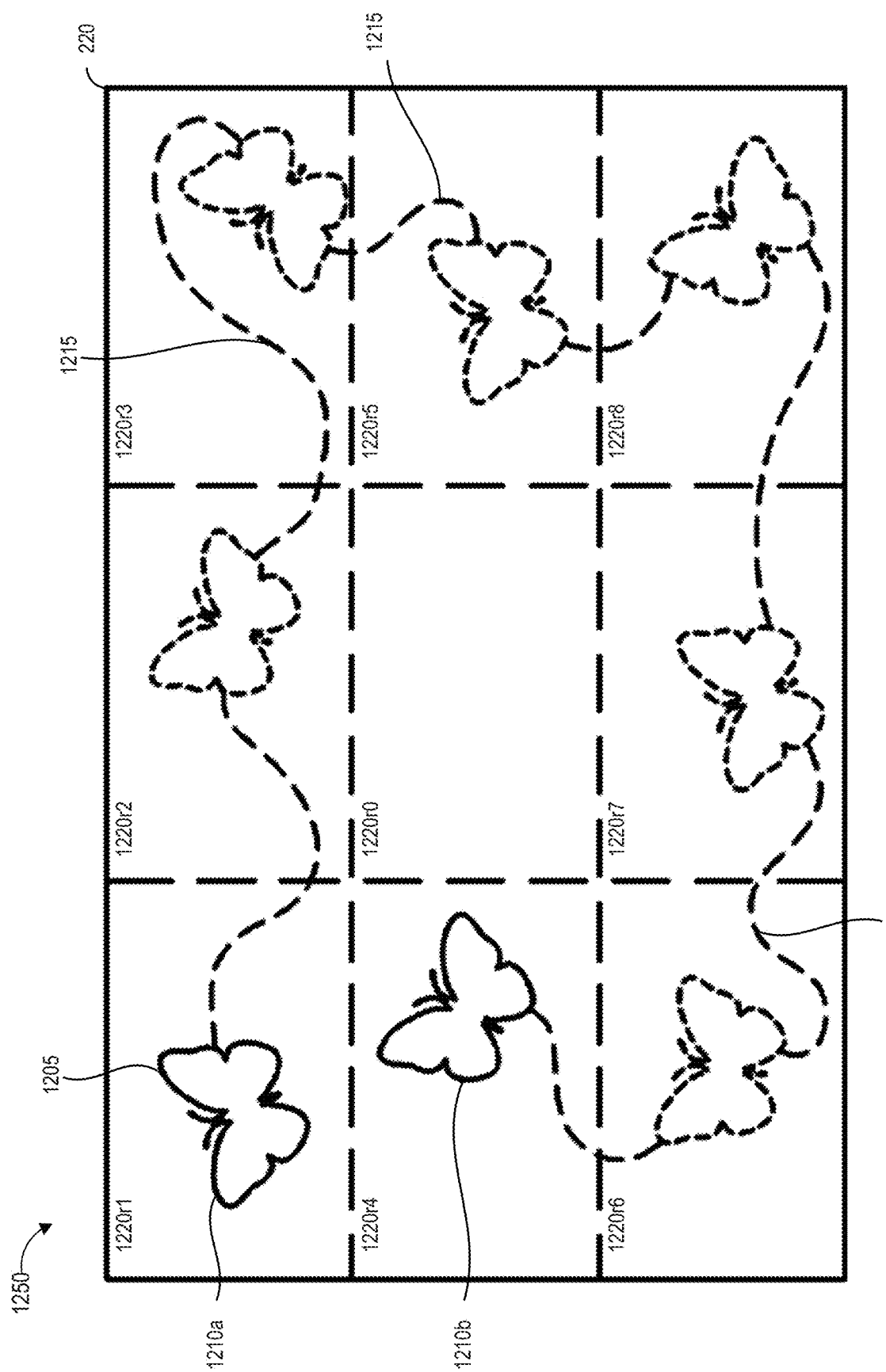
FIG. 12B schematically illustrates an example scene for an eye tracking calibration process.

FIG. 12B schematically illustrates an example scene 1250 on a display 220 of a head mounted display system. As depicted in FIG. 12B, the display 220 can display a scene 1250 with a moving graphic 1205. For example, as depicted, the graphic 1205 can be a butterfly that is displayed to the user as flying throughout the scene 1250. The graphic 1205 may be displayed over or as part of a background image or scene (not shown in FIG. 12B). In various embodiments, the graphic can be an avatar (e.g., a personification of a person, animal, or things such as, e.g., a butterfly or the bumble bee 140 shown in FIG. 1), or any other image or animation that can be configured to be displayed in a particular eye pose region of the display 220. The graphic 1205 may be tailored to the user (e.g., based on age, anxiety level, maturity, interests, etc.). For example, to avoid causing anxiety in a child, the graphic 1205 may be a child-friendly character (such as the butterfly or the friendly bumble bee 140). As another example, for a user who is an automobile enthusiast, the graphic 1205 can be a car such as a racing car. Thus, in moving in various regions of the display 220, the graphic 1205 can be displayed as and appear as a video animation to a wearer 210 using the wearable display system 200. The graphic 1205 can start in an initial position 1210a and proceed to a final position 1210b along a path 1215. For example, as depicted, the graphic 1205 can move across the display (e.g., along the dotted line) into different regions of the display 220 in a clockwise manner. As another example, the graphic 1205 can appear as zigzagging or moving randomly across the different regions of the display 220. One possible zigzagging pattern can be regions 1220r1, 1220r2, 1220r4, 1220r0, 1220r3, 1220r5, 1220r7, and 1220r8.

The display 220 is shown in FIG. 12B to have nine regions 1220r0-1220r8 of identical size for illustration only. The number of regions 1220r0-1220r8 of the display 220 can be different in different implementations. Any number of regions of a display can be used to capture eye images while a graphic proceeds from region to region, to direct the eye toward that respective region. For example, the number of eye pose regions can be 2, 3, 4, 5, 6, 9, 12, 18, 24, 36, 49, 64, 128, 256, 1000, or more. Eye images can be captured for some or all of the eye pose region. The shapes of the regions 1220r0-1220r8 of the display 220 can be different in different implementations, such as rectangular, square, circular, triangular, oval, diamond. In some embodiments, the sizes of different regions of the display 220 can be different. For example, regions closer to the center of the display 220 can be smaller or bigger than the regions further away from the center of the display 220. As another example, the eye pose regions can comprise halves, quadrants, or any segmentation of the display 220.

The path 1215 can move in, across, or around eye pose regions where it is desirable to obtain good quality eye images, and the path 1215 may avoid eye pose regions where eye images are undesirable (e.g., generally poor quality) or unneeded (e.g., for a particular biometric application). For example, a biometric application (e.g., iris code generation) may tend to use eye images where the eye of the user is pointed straight forward (e.g., through the eye pose region 1220r0). In such a case the graphic 1205 may tend to move primarily within the eye pose region 1220r0 and not move (or move less frequently) in eye pose regions 1220r1-1220r8. The path 1215 may be more concentrated in the center of the scene 1250 as compared to the peripheral regions of the scene 1250. In other biometric applications (e.g., diagnosis of the retina of the eye), it may be desirable to obtain eye images where the user is looking toward directions away from the region 1220r0 (e.g., away from the natural resting eye pose) so that images of the medial or lateral regions of the retina (away from the fovea) are obtained. In such an application, the graphic 1205 may tend to move around the periphery of the scene 1250 (e.g., the regions 1220r1-1220r8) as compared to the center of the scene (e.g., the region 1220r0). The path 1215 may be more concentrated around the periphery of the scene and tend to avoid the center of the scene (e.g., similar to the path 1215 shown in FIG. 12).

The eye pose regions 1220r0-1220r8 of the display 220 are depicted as being separated by horizontal and vertical dotted lines in the display 220 for illustration only. Such eye pose regions 1220r0-1220r8 are delineated for convenience of description and may represent regions of the display 220 where the wearer's eyes should point so that an eye image can be obtained. In some implementations, the horizontal and vertical dotted lines shown in FIG. 12B are not visible to the user. In some implementations, the horizontal or dotted lines shown in FIG. 12B may be visible to the user to direct the wear's one or more eyes toward particular regions of display 220.

The path 1215 shown in FIG. 12B is illustrative and not intended to be limiting. The path 1215 can have a different shape than shown in FIG. 12B. For example, the path 1215 may cross, re-cross, or avoid one or more of the eye pose regions 1220r0-1220r1 and may be rectilinear, polygonal, or curved, etc. The speed of the moving graphic 1215 can be substantially constant or can be variable. For example, the graphic 1205 may slow down or stop in certain eye pose regions (e.g., where one or more eye images are taken) or the graphic 1205 may speed up or skip through other eye pose regions (e.g., where eye images are not needed or desired). The path 1215 can be continuous or discontinuous (e.g., the graphic 1205 may skip over or around certain eye pose regions). For example, with reference to FIG. 12B, if the graphic 1205 is at position 1210b in the eye pose region 1220r4, and a biometric application needs an eye image with the user's eye directed toward the eye pose region 1220r8, the display system could display the graphic 1205 so that it moves continuously to the region 1220r8 (e.g., the butterfly flies across the scene from the region 1220r4 through the region 1220r0 and into the region 1220r8) or the display system could simply stop displaying the graphic 1205 in the region 1220r4 and then start displaying the graphic 1205 in the region 1220r8 (e.g., the butterfly would appear to have jumped from the region 1220r4 to 1220r8).

An eye pose region can be considered as a connected subset of a real two-dimensional coordinate space $\mathbb{R}^2$ or a positive integer two-dimensional coordinate space $(\mathbb{N} > 0)^2$, which specifies that eye pose region in terms of the angular space of the wearer's eye pose. For example, in one embodiment, an eye pose region can be between a particular $\theta_{min}$ and a particular $\theta_{max}$ in azimuthal deflection (e.g., the horizontal axis 1204 in FIG. 12A) and between a particular $\phi_{min}$ and a particular $\phi$max in elevation deflection (e.g., the vertical axis 1208 in FIG. 12A). Additionally, an eye pose region can be associated with a particular region assignment. Such region assignments may not appear on the display 220 to a wearer 210, but are shown in FIG. 12B for illustrative purposes. The regions can be assigned in any suitable manner. For example, as depicted in FIG. 12B, the center region can be assigned region 1220r0. In the depicted embodiment, the numbering of the regions can proceed in a generally horizontally sequential manner, with the center region assigned region 1220r0, ending with bottom right region assigned region 1220r8. Such regions 1220r0-1220r8 can be referred to as eye pose regions. In other implementations, the regions can be numbered or referenced differently than shown in FIG. 12B. For example, the upper left region can be assigned region 1220r0 and the bottom right region can be assigned region 1220r8.

The scene 1250 may be presented by the wearable display system in a VR mode of display, where the wearer 210 sees the graphic 1205, but not the outside world. Alternatively, the scene 1250 may be presented in an AR/VR/MR mode of display, where the wearer 210 sees the visual graphic 1205 superimposed on the outside world. While the graphic 1205 is being displayed in an eye pose region, eye images can be captured by an image capture device (e.g. the inward-facing imaging system 462 in FIG. 4) coupled to the wearable display system 200. As but one example, one or more eye images can be captured in one or more of the eye pose regions 1220r0-1220r8 of the display 220. For example, as depicted, the graphic 1205 can start in the initial position 1210a and move within that upper-left eye pose region (e.g., region 1220r1) of the display 220. With the graphic 1205 moving in that upper-left eye pose region, the wearer 210 may direct their eyes toward that region of the display 220. One or more eye images captured by the camera, while the graphic 1205 is in the upper left eye pose region of the display 220, can include the eye in a certain eye pose when looking in that direction.

Continuing in this example, the graphic 1205 may move along the path 1215 to the upper middle eye pose region (e.g., region 1220r2), where an eye image with an eye pose that is directed to the upper middle region can be captured. The graphic 1205 can move along in the various eye pose regions 1220r0-1220r8 of the display 220, while eye images are captured intermittently or continuously during this process, until the graphic 1205 reaches the final position 1210b in the region 1220r4. One or more eye images can be captured for each of the regions, or eye images may be captured in fewer than all of the regions that graphic 1205 moves through. Accordingly, eye images captured can include at least one image of the eye in one or more different eye poses. An eye pose can be represented as an expression of two angles, as will be described further below.

The graphic 1205 can also remain in an eye pose region of the display 220 until an image of a certain image quality is obtained or captured. As described herein, various image quality metrics are available to determine whether a certain eye image passes an image quality threshold (Q). For example, the image quality threshold can be a threshold that corresponds to an image metric level for generating an iris code. Accordingly, if an eye image captured, while the graphic 1205 is in a certain eye pose region of display 220, passes an image quality threshold, the graphic 1205 can remain in that eye pose region (or return to that eye pose region) until an image is obtained that meets or passes the image quality threshold. Image quality thresholds can also be defined for a particular eye pose region of the display. For example, a particular biometric application may require darkening of certain regions of the display 220. Thus, the image quality threshold for those regions may be higher than the image quality threshold of a region that has not been darkened. During this image collection process, the graphic 1205 can continue in a story mode or animations that continue to direct a wearer's eye toward that region.

An eye image collection routine can also be used to correct for fragile bits in an iris code. Fragile bits refers to bits of an iris code that are inconsistent between eye images (e.g., there is a substantial probability the bit is zero for some eye images and one for other images of the same iris). More specifically, fragile bits may be weakly defined bits in an iris code of the eye image, which may represent empirical unreliability in measurement. Fragile bits may be quantified, for example, utilizing a Bayesian model for the uncertainty in parameters of a Bernoulli distribution. Fragile bits may also be identified, for example, as those bits representing areas typically covered by the eyelid or occluded by eyelashes. An eye image collection routine can utilize the graphic 1205 to actively guide an eye to different eye poses, thereby reducing the impact of fragile bits on the resulting iris code. As but one example, the graphic 1205 can guide an eye to eye pose regions not occluded by eyelids or eyelashes. Additionally or alternatively, a mask can be applied to an eye image to reduce the impact of fragile bits. For example, the mask may be applied so that eye regions identified as producing fragile bits (e.g., upper or lower portions of the iris where occlusion is more likely to occur) may be disregarded for iris generation. As yet another example, the graphic 1205 may return to eye pose regions that are more likely to generate fragile bits to obtain more eye images from those region(s), thereby reducing the impact of fragile bits on the resulting iris code.

The graphic 1205 can also remain in (or return to) an eye pose region of the display 220 until a number of images are captured or obtained for a particular eye pose region. That is, instead of comparing an image quality metric of each eye image with an image quality threshold "on-the-fly," or in real time a certain number of eye images can be obtained from each eye pose region. Then, each of the eye images obtained for that eye pose region can be processed to obtain an image quality metric which is in turn compared to a respective image quality threshold. As can be seen, eye pose regions of the eye image collection process can be performed in parallel or sequence, depending on application needs or requirements.

During this eye image collection routine, a graphic can be displayed in one or more eye pose regions of display 220 in a variety of modes. For example, a graphic can be displayed in a particular eye pose region (or across two or more eye pose regions) of the display in a random mode, a flight mode, a blinking mode, a fluctuating mode, or a story mode. The story mode can contain various animations that the graphic may engage in. As but one example of a story mode, a butterfly can emerge from a cocoon and fly around a particular region of the display 220. As the butterfly flies around, a flower may appear that the butterfly may retrieve nectar. As can be seen, a story of the butterfly can be displayed in a particular region of the display 220 or across two or more regions of the display 220.

In a fluctuating mode, a butterfly's wings may appear to be fluctuating in size as it flies around in a particular region of the display 220. In a random mode, the exact location of the graphic 1205 within a particular region can be randomized. For example, the graphic 1205 may simply appear in different locations of the upper left region. As another example, the graphic 1205 may move in a partially random manner within the upper left eye pose region, starting from the initial position 1210a. In a blinking mode, a butterfly or a party of a butterfly may appear as blinking within a particular region or across two or more regions of the display 220. Various modes are possible in the various eye pose regions of display 220. For example, the graphic 1205 may appear in the upper left region in an initial position 1210a in a story mode; while the graphic 1205 may appear in the middle left region in the final position 1210b using a blinking mode.

Graphics can also be displayed throughout the eye pose regions 1220r0-1220r8 of the display 220 in a variety of modes. For example, graphics can appear in a random or sequential manner (referred to as a random mode or a sequential mode respectively). As described herein, a graphic 1205 can move across in sequential manner through the various regions of the display 220. Continuing in that example, the graphic 220 may move along the path 1215 using intervening animations between the eye pose regions of the display 220. As another example, the graphic 1205 may appear in different regions of the display 220 without intervening animations. As yet another example, a first graphic (e.g., a butterfly) can appear in a first eye pose region, while another graphic (e.g., a bumblebee) can appear in a second eye pose region.

Different graphics may appear in series from one region to the next. Or, in another embodiment, various graphics can be used in a story mode as different graphics appear in different eye pose regions to tell a story. For example, a cocoon may appear in one eye pose region, and then the butterfly in another. In various implementations, different graphics may also appear randomly distributed through the eye pose regions, as the eye image collection process can direct an eye from one eye pose region to another with a different graphic appearing in each eye pose region.

Eye images can also be obtained in a random manner. Thus, the graphic 1205 can also be displayed in the various eye pose regions of display 220 in a random manner. For example, the graphic 1205 can appear in the upper middle region, and once an eye image is obtained for that region, the graphic 1205 may thereafter appear in the bottom right eye pose region (e.g., assigned region 1220r8) of the display 220 in FIG. 12B. As another example, the graphic 1205 may be displayed in a seemingly random way, displaying the graphic 1205 on each eye pose region at least once, with no duplication on an individual region until the graphic 1205 has been displayed in the other regions. Such a pseudo-random manner of display may occur until a sufficient number of eye images are obtained for an image quality threshold or some other application. Accordingly, the various eye poses for a wearer's one or both eyes can be obtained in a random manner, rather than a sequential manner.

In some cases, if an eye image cannot be obtained for a certain eye pose region after a threshold number of attempts (e.g., three eye images captured for the eye pose region do not pass the image quality threshold), the eye image collection routine may skip or pause collection on that eye pose region for a period of time, while obtaining eye images from one or more other eye pose regions first. In one embodiment, the eye image collection routine may not obtain an eye image for a certain eye pose region if an eye image cannot be obtained after a threshold number of attempts.

Eye pose can be described with respect to a natural resting pose (e.g., in which the user's face and gaze are both oriented as they would be toward a distant object directly ahead of the user). The natural resting pose of the eye can be indicated by a natural resting position, which is a direction orthogonal to the surface of the eye when in the natural resting pose (e.g., directly out of the plane of an eye). As the eye moves to look toward different objects, the eye pose changes relative to the natural resting position. Thus, a current eye pose can be measured with reference to an eye pose direction, which is a direction orthogonal to the surface of the eye (and centered in the pupil) but oriented toward the object at which the eye is currently directed.

With reference to an example coordinate system, the pose of an eye can be expressed as two angular parameters indicating an azimuthal deflection and a zenithal deflection of the eye pose direction of the eye, both relative to the natural resting position of the eye. These angular parameters can be represented as $\theta$ (azimuthal deflection, measured from a fiducial azimuth) and $\phi$ (elevation deflection, sometimes also referred to as a polar deflection). In some implementations, angular roll of the eye around the eye pose direction can be included in the measurement of eye pose, and angular roll can be included in the following analysis. In other implementations, other techniques for measuring eye pose can be used, for example, a pitch, yaw, and optionally roll system. Using such representations for eye pose, an eye pose expressed as an azimuthal deflection and a zenithal deflection can be associated with a particular eye pose region. Accordingly, an eye pose can be determined from each eye image obtained during the eye image collection process. Such associations between the eye pose, the eye region, of the eye image can be stored in the data modules 260, 280, or made accessible to the processing modules 260, 270 (e.g., accessible via cloud storage).

Eye images can also be selectively obtained. For example, certain eye images of a particular wearer may already be stored or accessible by the processing modules 260, 270. As another example, certain eye images for particular wearer may already be associated with certain eye pose regions. In such cases, a graphic 1205 may appear in only one eye pose region or particular eye pose regions that do not have eye images associated with that eye pose region or particular eye pose regions. Illustratively, eye images may have been obtained for eye regions numbers 1, 3, 6, and, 8, but not the other eye pose regions 2, 4, 5, and 7. Accordingly, a graphic 1205 may appear in the latter pose regions 2, 4, 5, and 7 until eye images are obtained for each respective eye pose region that passes an image quality metric threshold.°

Detailed examples of eye image collection and analysis for eye gaze are further described in U.S. application Ser. No. 15/408,277, titled "Eye Image Collection", filed on Jan. 17, 2017, the disclosure of which is hereby incorporated by reference in its entirety.

Examples of Validating Eye Gaze

Although the wearable system can acquire eye images during the eye tracking calibration process described with reference to FIGS. 12A and 12B, one challenge in the eye tracking calibration process is that users may not look at the targets as expected. For example, when a wearable system renders a target (e.g., the virtual butterfly 1205 or one of the targets 1202a-i) in a rig space, the user may look at another direction instead of the graphic. For example, in one laboratory-based experiment, ten percent of the users did not look at some of the targets during calibration, even under laboratory testing conditions. User compliance with a calibration protocol may be substantially less when a user is alone in a home or office environment. As a result, the wearable system may not get accurate eye tracking results from the calibration and, consequently, the user's visual experiences with the wearable system may be affected.

Figure 12C:
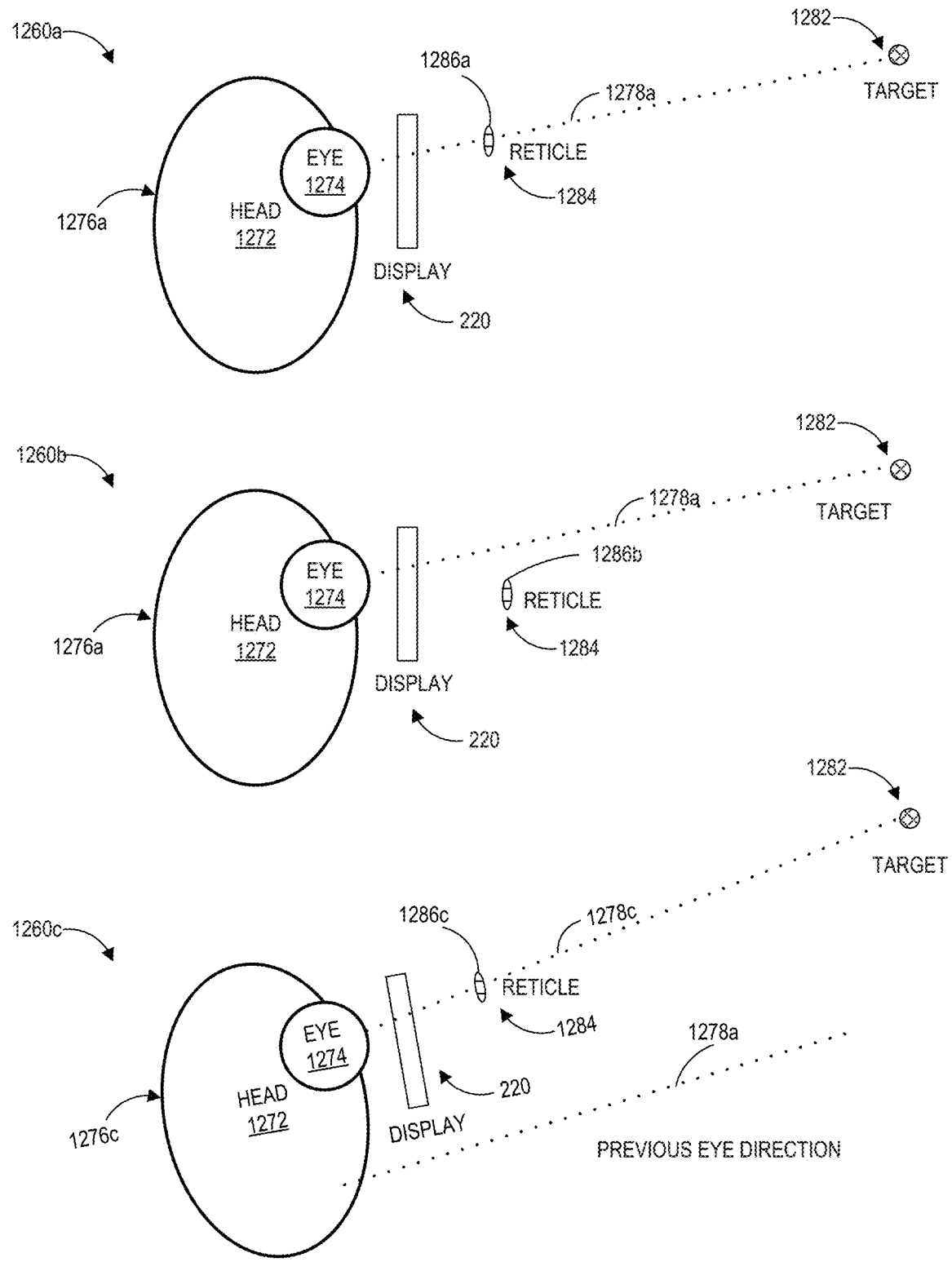
FIG. 12C illustrates an example of validating whether a user is looking a target using the user's head pose.

To ameliorate this challenge and to improve the quality of data acquired for eye gazes, the wearable system can validate the user's eye gaze before adjusting the mapping matrix for calibration. During the eye gaze validation, the wearable system can use head pose (e.g., head position or rotation information) to validate that the user is indeed looking at the target. FIG. 12C illustrates an example of validating whether a user is looking a target using the user's head pose. FIG. 12C illustrates three scenes 1260a, 1260b, and 1260c. In these three scenes, a user can perceive a reticle 1284 and a target 1282 via the display 220. The reticle 1284 represents a virtual object in the rig space while the target 1282 represents a virtual or a physical object which is at a given location in the user's environment. The location of the target 1282 may be represented by a position in a world space which is associated with a world coordinate system. The world coordinate system may be with respect to the user's 3D space rather than the user's HMD. As a result, an object in the world coordinate system may not necessarily align with an object in the rig space.

During an eye gaze validation process, a user needs to align the reticle 1284 with the target 1282, and the wearable system may instruct the user to "aim" the reticle 1284 at the target 1282. As the reticle 1284 moves in the rig space, a user needs to move the head and eyeballs to be able to align the reticle 1284 with the target again. The wearable system can check whether the reticle 1284 aligns with the target 1282 (e.g., by comparing measured user head pose or eye gaze with the known position of the target) and provide feedback to the user (e.g., indicating whether the reticle 1284 aligns or misaligns with the target 1282). Advantageously, in some embodiments, the wearable system may be configured to only collect eye images for eye tracking calibration when there is sufficient alignment between the reticle 1284 and the target 1282. For example, the wearable system may determine there is sufficient alignment when an offset between the positions of the target and the reticle differs by less than a threshold amount (e.g., smaller than an angular threshold such as less than 10°, less than 5°, less than 10, etc.).

With reference to FIG. 12C, the head 1272 is initially at the position 1276a and the eye 1274 is gazing in the direction 1278a in scene 1260a. The user can perceive that the reticle 1284 is located at the position 1286a via the display system 220. As illustrated in the scene 1260a, the reticle 1284 is aligned with the target 1282.

During the calibration process, the wearable system can render the reticle 1284 at different locations in the user's FOV. In the scene 1260b, the reticle 1284 is moved to the position 1286b. As a result of this movement, the reticle 1284 is no longer aligned with the target 1282.

The user may need to rotate his or her eye balls and/or move his or her head 1272 to realign the reticle 1284 with the target 1282. As depicted in the scene 1260c, the user's head is tilted to the position 1276c. In the scene 1260c, the wearable system can analyze the user's head pose and eye gaze, and determine that the user's direction of gaze is now at the direction 1278c as compared to the direction 1278a. Because of the user's head movement, the reticle 1284 is moved to the position 1286c and is aligned with the target 1282 as shown in the scene 1260c.

In FIG. 12C, the location of the reticle 1284 may be associated with a position in the rig space. The location of the target 1282 may be associated with a position in a world space. As a result, the relative positions between the reticle 1284 and the display 220 do not change even though the user's head pose has changed in scenes 1260b and 1260c. The wearable systems can align the reticle and the target may align the position of the reticle in the rig space with the position of the reticle in the world space.

Advantageously, in some embodiments, the wearable system can exploit the user's vestibulo-ocular reflex to reduce discomfort and eyestrain caused by the calibration process. The wearable system can automatically track and deduce the eye gaze based on the head pose. For example, when the user's head moves to the right, the wearable system can track and deduct that the eyes move to the left naturally under the vestibulo-ocular reflex.

Figure 13A:
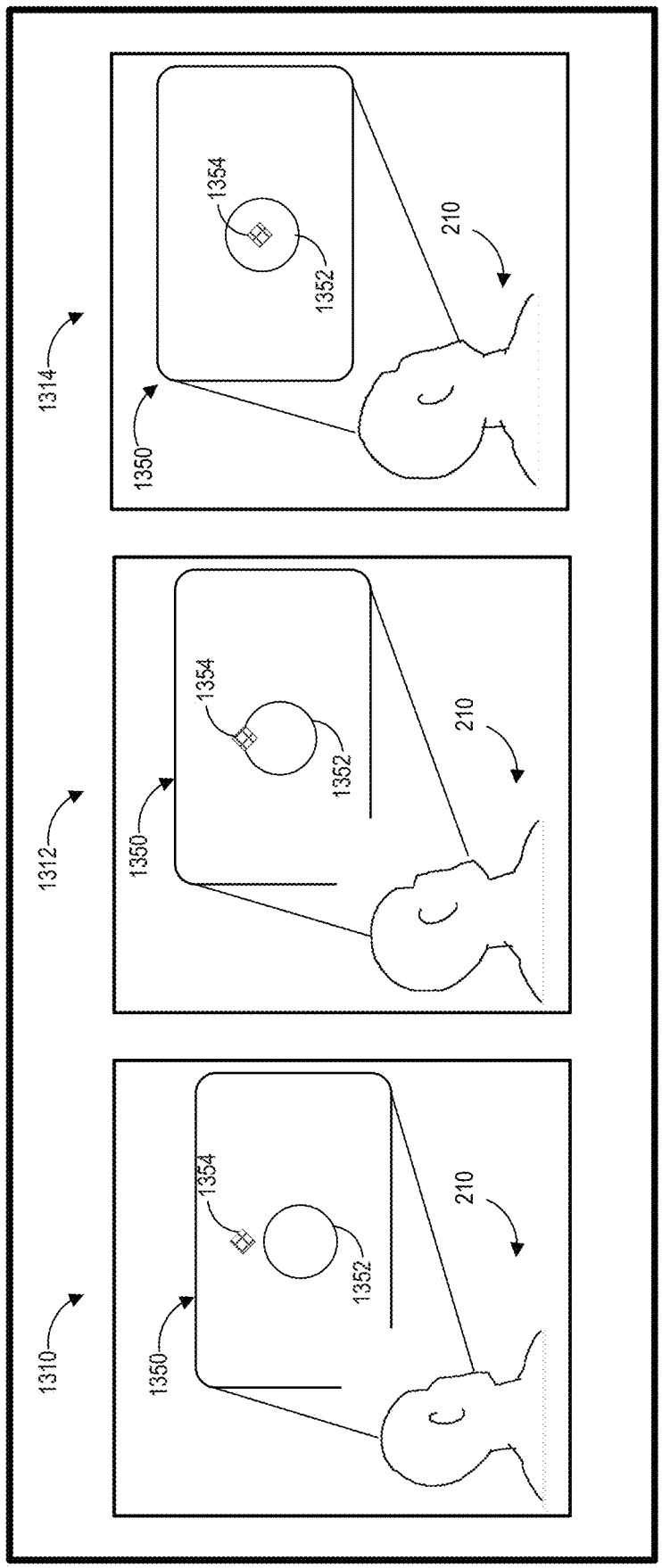
FIG. 13A illustrates an example of validating eye gaze where a reticle is in the center of the user's FOV.

FIG. 13A illustrates an example of validating eye gaze where the reticle is in the center of the user's FOV 1350. In FIG. 13A, three time-sequential scenes, 1310, 1312, and 1314 are shown. In this example, the user can perceive an eye calibration target 1354 and a reticle 1352. The target 1354 (e.g., a diamond-shaped graphic) is displayed as being fixed in the three-dimensional space of the user's environment and is located away from the virtual reticle (e.g., off-center in the user's FOV). The reticle 1352 (e.g., a hoop or ring-shaped graphic) is displayed as being fixed at or near the center of the user's FOV 1350. For example, at or near the center of the FOV can comprise an angular offset less than 10°, less than 5°, less than 10, etc.

In the scene 1310, the reticle 1352 is not aligned with the target 1354, where the reticle 1352 is slightly below the target 1354. As described with reference to FIG. 12C, the user can move his or her head around to align the reticle 1352 with the target 1354. The wearable system can detect the user's head movement using the IMUs described with reference to FIG. 2. In certain embodiments, the head poses can be determined based on data acquired from other sources, such as from a sensor external to an HMD (e.g., a camera in the user's room) or from an reflected image of the user's head as observed by the outward-facing imaging system 464. As illustrated in the scene 1312, the user can move his or her head upward to attempt to align the reticle 1352 with the target 1354. Once the reticle reaches the position as illustrated in the scene 1314, the wearable system can determine that the reticle 1352 is adequately aligned with the eye calibration target 1354, and thus the user's head is properly positioned for viewing the eye calibration target.

The wearable system can use a variety of techniques to calculate alignments between the reticle and the eye calibration target. As one example, the wearable system can determine the relative positions between the reticle and the eye calibration target. If the eye calibration target is within the reticle or a portion of eye calibration target overlaps with the reticle, the wearable system can determine that the reticle has aligned with the eye calibration target. The wearable system can also determine that the reticle and the target are aligned if the center of the reticle and the target coincide sufficiently. In certain embodiments, because the reticle is in the rig space while the target is in the world space, the wearable system may be configured to align the coordinate system associated with the rig space with the coordinate system associated with the world space to determine whether the reticle aligns with the target. The wearable system may determine whether the reticle and target overlap or coincide by determining that the relative offset between them is smaller than a threshold (e.g., an angular threshold as described above). In some examples, this threshold may correspond to one or more thresholds associated with user head pose, as described in further detail below with reference to FIGS. 14A and 14B.

The wearable system can also identify a target head pose which represents the head pose where an alignment between the reticle and the eye calibration target occurs. The wearable system can compare the user's current head pose with the target head pose to validate that the user is indeed looking at the target. A target head pose may be specific to a reticle's position in the 3D space or a target's position. In some embodiments, the target head pose may be estimated based on data associated with the user or other people (such as, e.g., previous users of the wearable system, users of other similar wearable systems in network communication with one or more servers or other computing devices with which the wearable system communicates, and so on).

In certain embodiments, the wearable system can use ray casting or cone casting techniques to determine the alignment between the target and the reticle. For example, the wearable system can cast a ray or a cone (which includes a volume transverse to the ray) and determine the alignment by detecting a collision between the ray/cone and the target. The wearable system can detect the collision if a portion of the ray/cone intersects with the target or when the target falls within the volume of the cone. The direction of the ray/cone may be based on the user's head or eye gaze. For example, the wearable system can cast a ray from a location that is in-between the user's eyes. The reticle can reflect a portion of the ray/cone. For example, the shape of the reticle may match the shape on a distal end of the cone (e.g., the end of the cone that is away from the user). Where the cone is a geometric cone, the reticle may have a circular or oval shape (which may represent a portion of the cone, such as a cross-section of the cone). In certain implementations, because the reticle is rendered in the rig space, as the user moves around, the wearable system can update the direction of the ray/cone even though the relative positions between the ray and the user's HMD do not change.

Once the wearable system determines that the user is looking at the target (e.g., because the reticle aligns with the target), the wearable system may begin to collect eye gaze data for purposes of calibration using, e.g., the inward-facing imaging system 462. In some examples, the wearable system may initially store the output of one or more eye tracking sensors or processing modules (e.g., the local processing data module) to a temporary data store (such as, e.g., a cache memory) that is routinely flushed. In response to determining that the user is indeed looking at the target, the wearable system can proceed to transfer the output data from the temporary data store to another data store such as, e.g., disk or another memory location for further analysis or for long term storage.

After the eye gaze data is collected, the system may either conclude the eye tracking calibration process, or may proceed to render another eye calibration target or reticle such that additional eye gaze data may be collected. For example, the wearable system can present the reticle 1352 at a different location within the user's FOV 1350 as shown in the scene 1320 in FIG. 13B after the wearable system has collected the eye data in the scene 1314 shown in FIG. 13A. In some embodiments, the wearable system may evaluate each frame collected against a set of criteria so as to determine whether each frame represents data that is suitable for use in eye tracking calibration processes. For a given frame, such an evaluation may, for example, include determining whether the user was blinking at the time of the collection of the frame, determining whether the target and reticle were adequately aligned with one another at the time of the collection of the frame, determining whether the user's eye was successfully detected at the time of the collection of the frame, etc. In these embodiments, the wearable system may determine whether a threshold quantity of frames (e.g., 120 frames) have been collected that satisfy the set of criteria and, in response to determining that the threshold quantity of frames has been met, the wearable system may conclude the eye tracking calibration process. The wearable system may proceed to render another eye calibration target or reticle in response to determining that the threshold quantity of frames has not yet been met.

Figure 13B:
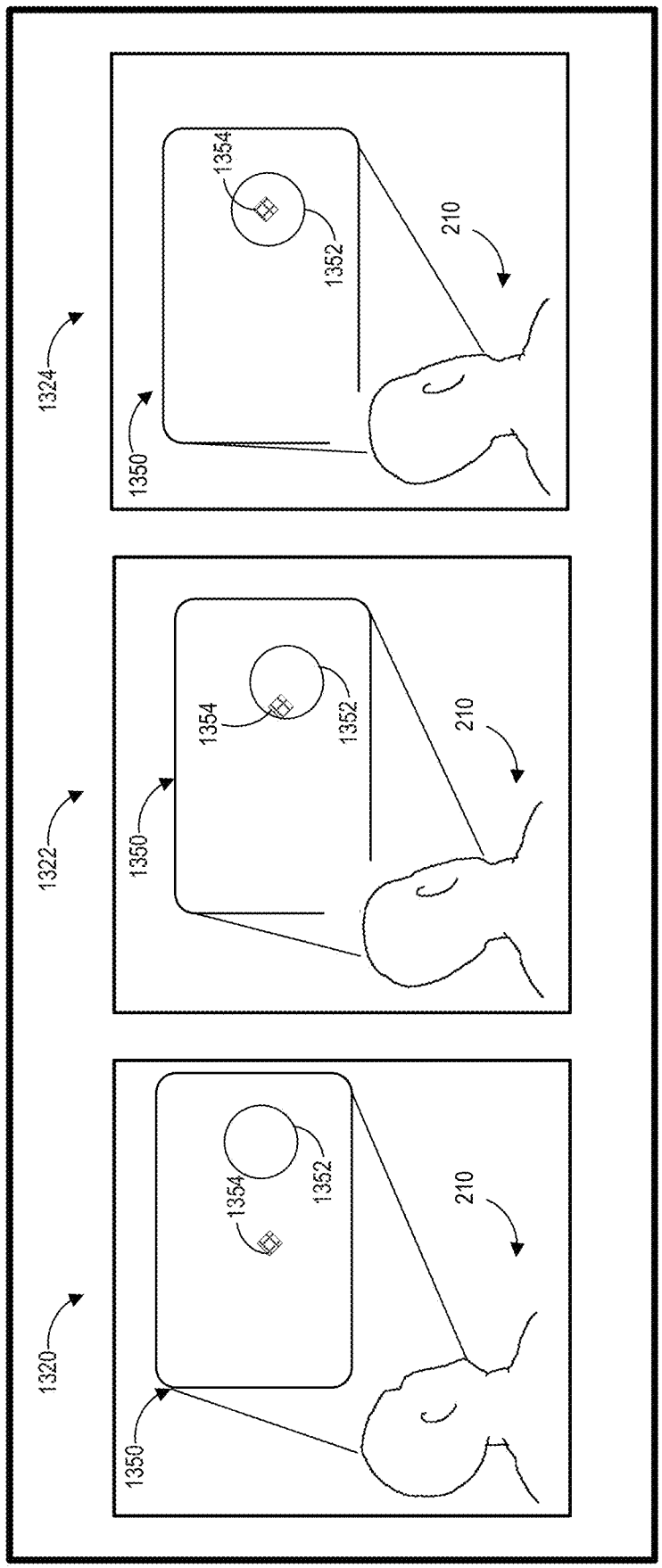
FIG. 13B illustrates an example of validating eye gaze where the reticle is rendered at an off-center location in the user's FOV.

FIG. 13B illustrates an example of validating eye gaze where the reticle is rendered at an off-center location in the user's FOV 1350. The location of the virtual reticle in FIG. 13B is different from the location of the virtual reticle in FIG. 13A. For example, in FIG. 13A, the location of the virtual reticle is at or near the center of the user's FOV, while in FIG. 13B, the location of the virtual reticle is off-center from the center of the user's FOV. Likewise, the location of the target is different in FIG. 13A (e.g., toward the top of the FOV) than the location of the target in FIG. 13B (e.g., at or near the center of the FOV). In FIG. 13B, three time-sequential scenes, 1320, 1322, and 1324 are shown. In this example, the reticle 1352 is rendered on the right side of the user's FOV 1350, and the target 1354 is rendered near the center of the user's FOV 1350. It can be seen that, from scene 1314 to scene 1320, the location in the user's FOV 1350 at which the reticle 1352 is rendered has been updated, but the location in the environment at which the target 1354 is rendered has remained substantially the same. To align the reticle 1352 with the target 1354, the user may rotate his or her head to the left so as to align the reticle with the eye calibration target (see example scenes 1322 and 1324). Once the wearable system has determined that the target 1354 is within the reticle 1352, the wearable system may begin to collect eye gaze data in a manner similar to the example described above with reference to FIG. 13A. If the user's eye gaze moves (e.g., such that the target and reticle are no longer sufficiently aligned), the wearable system may stop collecting eye gaze data, since the user is no longer looking at the target and any acquired data would be of lower quality.

In certain embodiments, the wearable system can calculate a target head pose at which the reticle 1352 is aligned with the target 1354. The wearable system can track the user's head pose as the user moves. Once the wearable system determines that the user has assumed the target head pose (e.g., the head pose shown in the scenes 1314 or 1324), the wearable system can determine that the target 1354 and the reticle 1352 are aligned and the wearable system can collect eye images when the head is at the target head pose.

Example Processes of Eye Tracking Calibration with Eye Gaze Validation

Figure 14A:
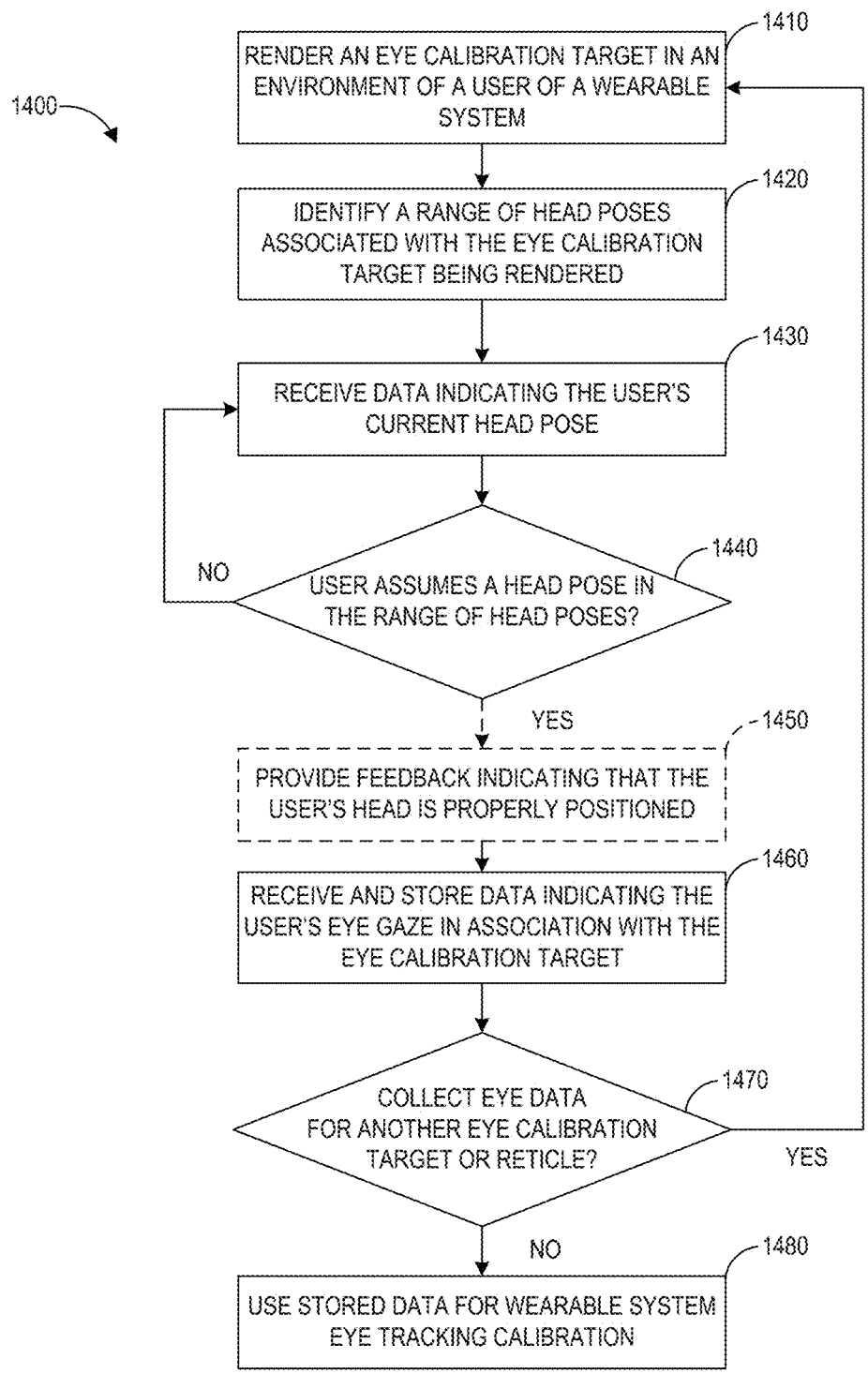
FIG. 14A illustrates a flowchart for an example eye tracking calibration process with eye gaze validation.

FIG. 14A illustrates an example flowchart for an eye tracking calibration process with eye gaze validation. The example process 1400 may be performed by one or more components of the wearable system 200 such as, e.g., the remote processing module 270 or the local processing and data module 260, alone or in combination. The display 220 of the wearable system 200 can present the targets or reticles to the user, the inward-facing imaging system 462 can obtain the eye images for eye gaze determination, and IMUs, accelerometers, or gyroscopes can determine head pose.

At block 1410, the wearable system can render an eye calibration target in an environment of a user. The eye calibration target may be rendered in a world space (which may be represented by a coordinate system with respect to the environment. The eye calibration target may be represented in a variety of graphical forms, which may include 1D, 2D, and 3D images. The eye calibration target may also include still or moving images (such as, e.g., animations). With reference to FIG. 13A, the eye calibration target is schematically represented by a diamond.

At block 1420, the wearable system can identify a head pose range associated with the eye calibration target being rendered. A head pose range can include a plurality of head poses (e.g., 2, 3, 4, 5, 10, or more). A head pose can describe a position and an orientation of the user's head. The position may be represented by translational coordinate values (such as, e.g., coordinate values in an x-y-z coordinate system shown in FIG. 6). The orientation may be represented by angular values relative to a natural resting state of the head. For example, the angular values can represent the head tilting forward and backward (e.g., pitching), turning left and right (e.g., yawing), and tilting side to side (e.g., rolling). The wearable system can identify a range of head positions and a range of head orientations, which together can specify a range of head poses for which the reticle and target are deemed to be sufficiently aligned with one another. The bounds of such ranges may be seen as corresponding to thresholds. The head poses that fall within this range can correspond to target head poses in order for a user to align the target and the reticle while the reticle appears in different regions of the user's FOV. With reference to FIGS. 13A and 13B, the range of head poses can encompass head poses 1314 and 1324, and the wearable system may determine that the head positions and orientations corresponding head poses 1314 and 1324, respectively, fall within the identified range of head positions and range of head orientations, and thus satisfy one or more thresholds or other requirements of sufficient reticle-target alignment.

The wearable system can track the head poses using sensors internal to an HMD such as, e.g., an IMU or an outward-facing imaging system (e.g., to track a reflected image of the user's head) or external to the HMD (such as, e.g., a camera mounted to a wall in the user's room). At block 1430, the wearable system can receive data indicating the user's current head pose. The data can include the current position and orientation of the user's head or the movements of the user's head in the 3D space. For example, in FIG. 13A, as the user moves the head from the position shown in the scene 1310 to the position shown in the scene 1314, the wearable system can track and record the user's head movements.

At block 1440, the wearable system can determine, based on the data acquired from block 1430, whether the user has assumed a head pose that falls within the identified range of head poses. The wearable system can determine whether the user's head pose is at a position or orientation that can cause the reticle to align with the target. As an example, the wearable system can determine whether both the head position and head orientation associated with the user's head pose fall within the identified range of head positions and the identified range of head orientations. The wearable system may make such a determination by comparing the head position associated with the user's head pose with threshold values that define the bounds of the identified range of head positions (e.g., translational coordinate values), and by comparing the head orientation associated with the user's head pose with threshold values that define the bounds of the identified range of head orientations (e.g., angular values). With reference to FIG. 13A, the wearable system can determine whether the user has assumed the head pose shown in 1314. If the user has not assumed a head pose that falls within the identified range of head poses, and thus has not assumed a head pose for which the reticle and the target are deemed to be sufficiently aligned with one another, the wearable system can continue acquire and analyze data associated with the user's head pose as shown in block 1430.

Optionally at 1450, the wearable system can provide the user with feedback (e.g., visual, audible, haptic, etc.) to indicate that the user's head is properly positioned. For example, the visual feedback can include a color change or blinking effect of the target or the reticle which can indicate that the user's head is properly positioned such that the reticle aligns with the target by causing the reticle and/or eye calibration target to blink or change color. In some embodiments, blocks 1410-1450 are part of an eye gaze validation process.

If it is determined that the user's head is in one of the identified head poses, at block 1460, the wearable system can receive and store data indicating the user's eye gaze in association with the eye calibration target. Within the context of FIG. 13A, when the wearable system detects that the users head pose is at the position and orientation shown in the scene 1314, the wearable system can receive and store data from one or more eye tracking sensors (e.g., eye cameras in the inward-facing imaging system 462).

At block 1470, the wearable system can determine whether additional data should be collected during the eye tracking calibration. For example, the wearable system can determine whether eye images at another eye gaze direction should be collected to update or complete the calibration process. If it is determined that additional eye calibration data should be collected, the wearable system can go back to block 1410 to repeat the process 1400. With reference to FIGS. 13A and 13B, for example, the wearable system can render the target 1354 as shown in the scene 1322 after the wearable system has collected the eye images when the user 210 is in the position illustrated in the scene 1314.

In certain embodiments, even though the user is indeed gazing at the target, the images acquired by the wearable system may be deemed unsatisfactory (e.g., because the user blinks). As a result, the process may go back to the block 1460 to take additional images.

If it is determined that additional eye calibration data does not need to be collected, at block 1480, the wearable system can conclude the process 1400 and use the stored eye gaze data for eye tracking calibration. For example, the stored data can be used to generate the mapping matrix described above.

Figure 14B:
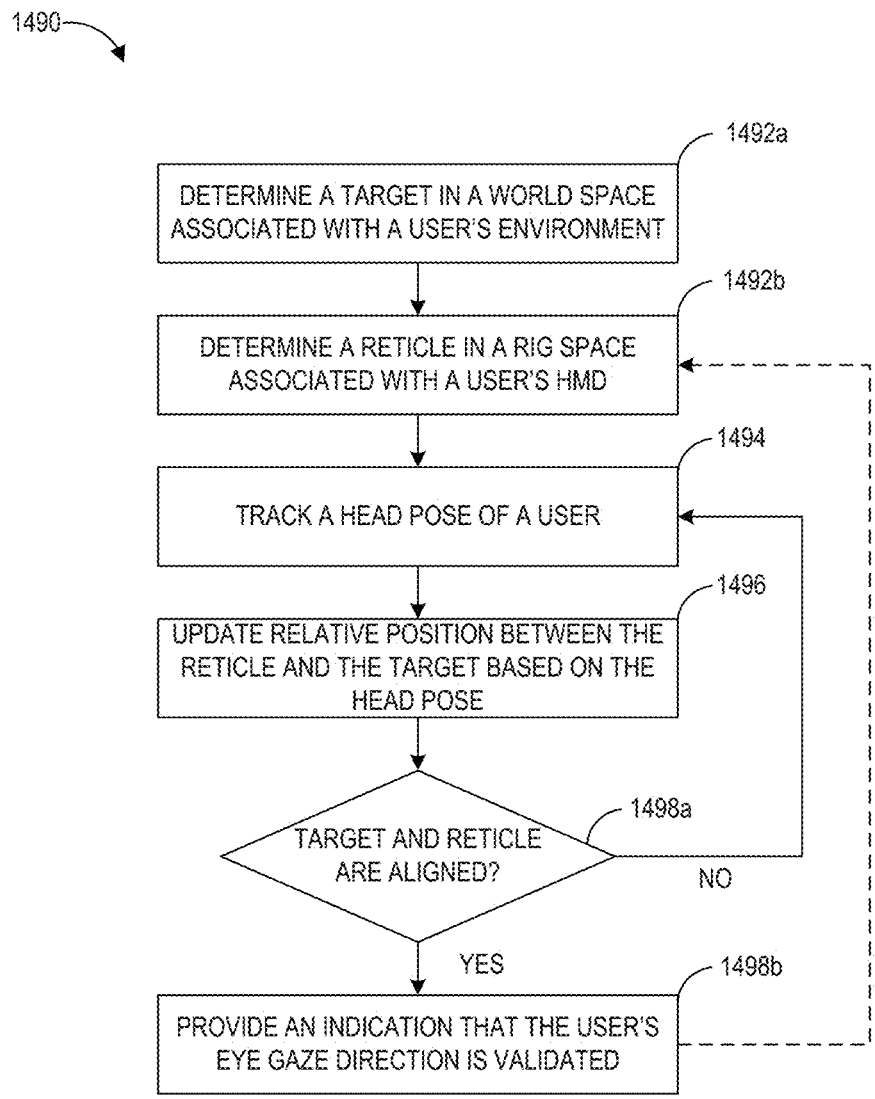
FIG. 14B illustrates a flowchart for an example eye gaze validation process.

FIG. 14B illustrates an example eye gaze validation process. The example process 1490 can be performed by one or more components of the wearable system, such as, e.g., the remote processing module 270 and the local processing and data module 260, alone or in combination. The wearable system can include an HMD. The display 220 of the wearable system 200 can present the targets or reticles to the user, the inward-facing imaging system 462 can obtain the eye images for eye gaze determination, and IMUs, accelerometers, or gyroscopes can determine head pose.

At block 1492a, the wearable system can determine a target in a world space associated with a user's environment. The target may be fixed at a given position in the world space. The target may be a virtual object rendered by the display 220 or a physical object in the user's environment (e.g., a vase, a shelf, a pot, a book, a painting, etc.). The virtual target may have a variety of appearances as described with reference to FIGS. 12A, 12B, and 18. The world space may include the world map 920 shown in FIG. 9. The location of the target in the world space may be represented by a position in a 3D world coordinate system.

At block 1492b, the wearable system determines a reticle in a rig space associated with the user's HMD. The reticle can be rendered by the HMD at a predetermined location in the user's FOV. The rig space may be associated with a coordinate system separate from the world coordinate system.

At block 1494, the wearable system can track a head pose of a user. The wearable system can track the head pose based on an IMU or an outward-facing imaging system in the user's HMD. The wearable system can also track the head pose using other devices, such as a web camera in the user's room or a totem (which can be configured to image the user's environment). As the user's head pose changes, the relative position between the reticle and the target can also change.

At block 1496, the wearable system can update the relative position between the reticle and the target based on the head pose. For example, where the target is to the right of the reticle and the user turns his or her head rightward, the reticle may appear to become closer to the target. However, if the user turns his or her head leftward, the reticle may appear to move farther away from the target.

At block 1498a, the wearable system can determine whether the target and the reticle are aligned. The alignment may be performed using ray/cone casting. For example, the wearable system can cast a ray from the reticle and determine whether the target intersects with the ray. If the target intersects the ray, the wearable system can determine that the target and the reticle are aligned. The wearable system can also determine an offset between a position in the rig space and a position in the world space based on the user's head pose. The wearable system can align the location of the target in the world space and the location of the reticle in the rig space by applying the offset to the reticle (or to the target) and determine the position of the reticle coincide with the position of the target. In some situations, the offset may be used to translate the position of the reticle from the rig space to a corresponding position in the world space. The alignment between the reticle and the target may be determined based on the coordinate values of the reticle and the target with reference to the world space.

If the target and the reticle are not aligned, the wearable system can continue tracking the head pose at block 1494. If the target and the reticle are aligned, the wearable system can determine that the user is indeed looking at the target and can, at block 1498b, provide an indication that the user's eye gaze direction is validated. The indication can include an audio, visual, or tactical effect.

In some embodiments, the wearable system can present a series of reticles (e.g., each in a different eye gaze region shown in FIG. 12B) for eye tracking calibration. As a result, after block 1498b, the wearable system can optionally restart at the block 1492a and present the reticle at a new location in the rig space. The user can attempt to align the reticle at the new location with the target again by changing the user's head pose.

Examples of Dynamically Adjustable Reticle

A reticle can have a variety of appearances, such as, e.g., color, shape, size, graphic, etc. The appearances of the reticle depend on parameters involved in an eye tracking calibration process. The appearances of the reticle may be dynamically adjusted based on contextual information. The contextual information may include characteristics of the target (e.g., the size or location of the target), information associated with the user (e.g., the user's position), or required alignment precision for the eye tracking calibration process. For example, the wearable system may use a larger reticle if the target is large while using a smaller reticle if the target is small. In some embodiments, the wearable system may use a relatively large reticle if the target is positioned relatively nearby the user, and may use a relatively small reticle if the target is positioned relatively far away from the user.

In some examples, the size of the reticle may be informative as to the size of the range of head poses identified by the wearable system through execution of the operation of block 1420, as described above with reference to FIG. 14A. For example, when the size of the reticle is small, the range of the head poses may be relatively large, because it may be more difficult for a user to precisely position his or her head to align the reticle with the target. On the other hand, when the size of the reticle is large, the range of head poses may be relatively small to reduce the error rates in the alignment.

Although it is generally easier to align a larger reticle with the target, the larger reticle may result in less reliable or accurate calibration data than a smaller reticle. As a result, the wearable system may render a smaller reticle if the data used in eye tracking calibration requires a high precision, while rendering a larger reticle if the data used in eye tracking calibration requires a low precision. In some implementations, the system starts with a larger reticle to acquire a first calibration data set, and then uses a smaller reticle to acquire a second calibration data set, and so forth, until the sufficient data has been collected to generate an eye tracking calibration of sufficient reliability and accuracy for the user or a particular user application. Thus, the wearable system can dynamically adjust reticle size (or other aspects of the calibration procedure) during an eye calibration process.

Figure 15A:
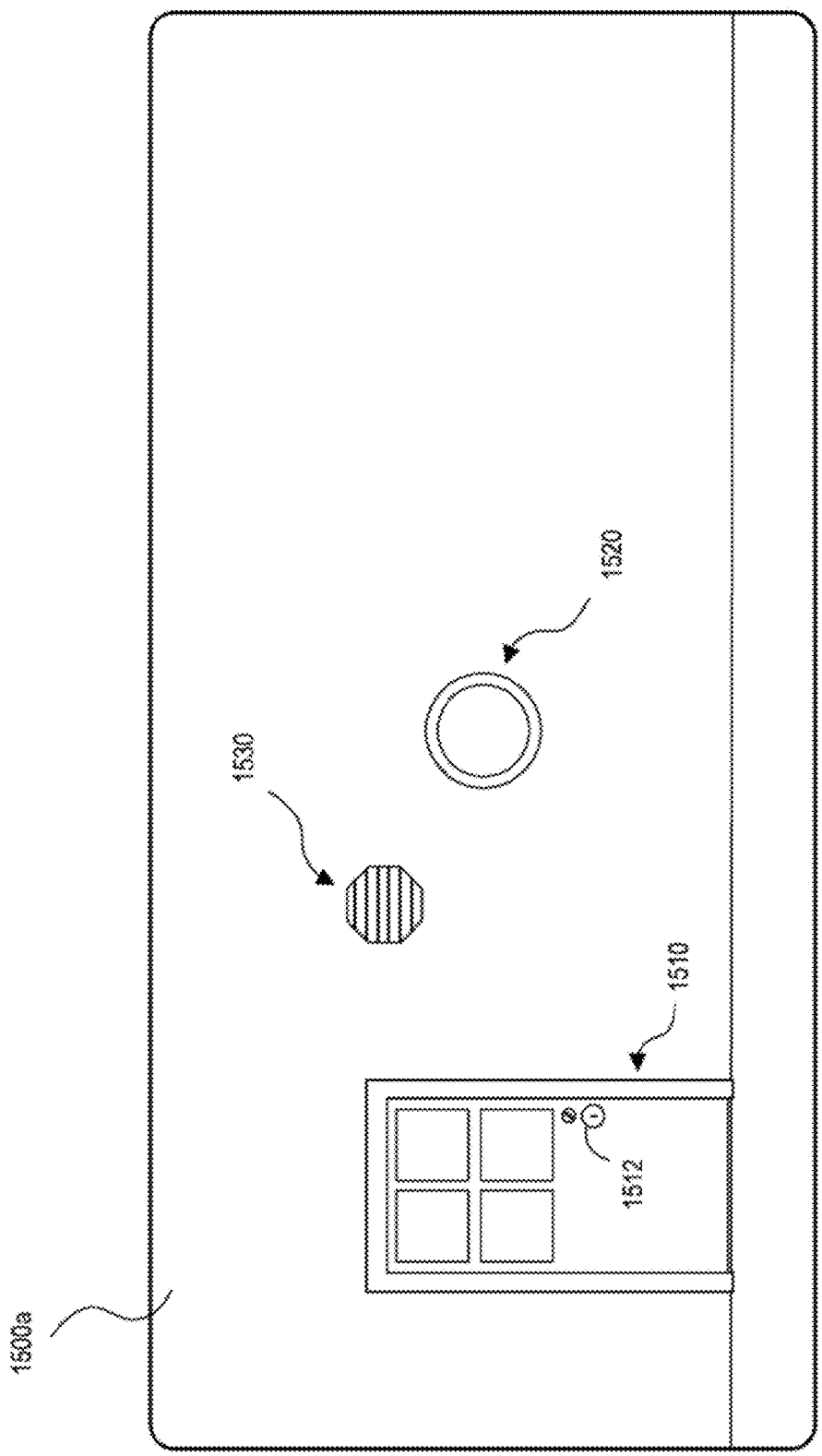
FIGS. 15A and 15B illustrate examples of dynamically adjusting the size of a reticle based on the distance between a target and a reticle.
Figure 15B:
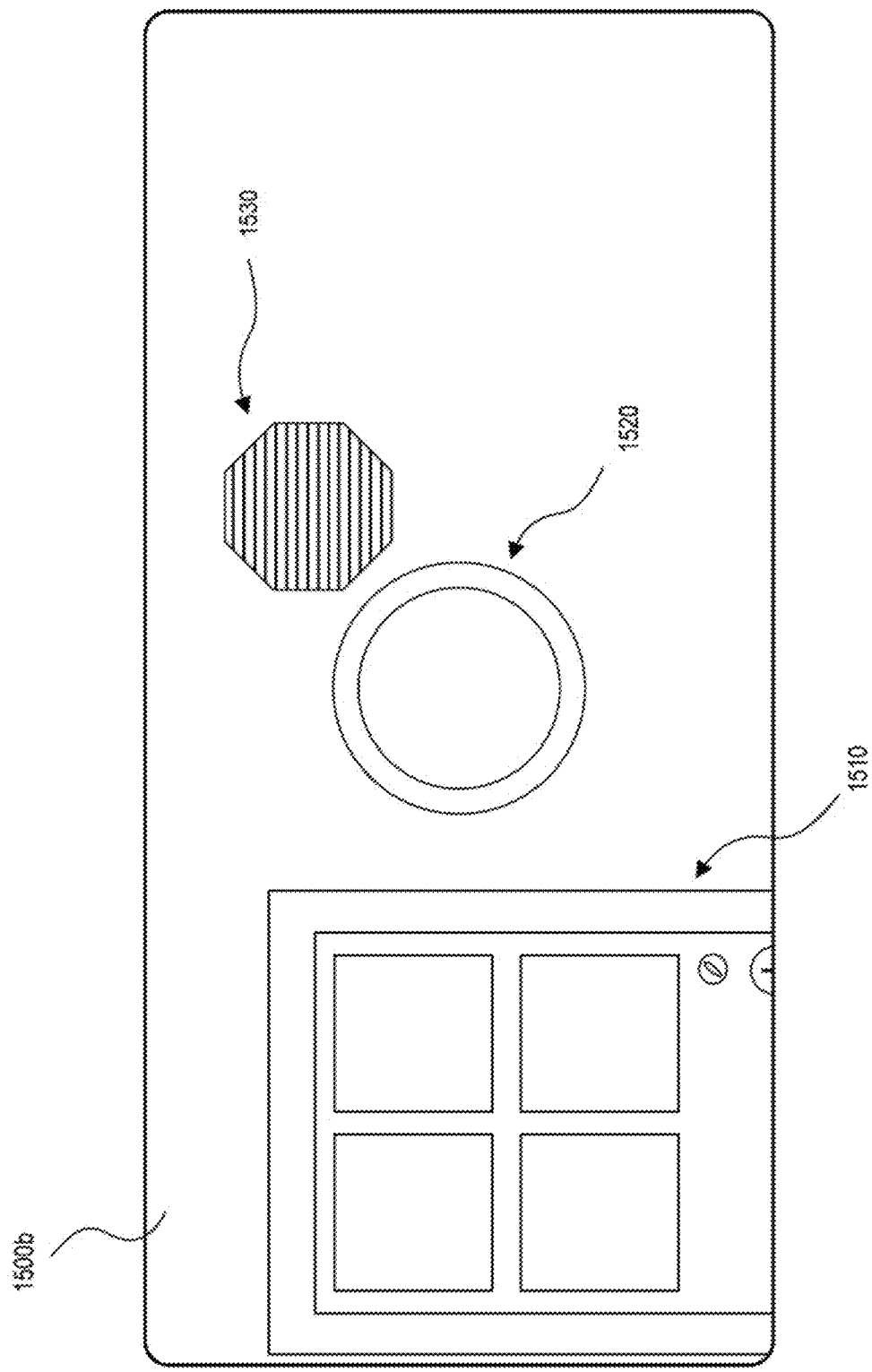

FIGS. 15A and 15B illustrate examples of dynamically adjusting the size of a reticle based on the distance between a target and a reticle. In FIGS. 15A and 15B, a user can perceive, via the display 220, real world objects such as a door 1510 and virtual objects such as a target 1530 and a reticle 1520 in the scene 1500a. The target 1530 can be fixed at a location in the user's 3D space. The user can move toward the door 1510 and perceive the scene 1500b shown in FIG. 15B. In the scene 1500b, the target 1530 is located in the same position in the 3D space, but because the target 1530 is closer to the user in the scene 1500b than in the scene 1500a, the target 1530 appears to be larger in the scene 1500b.

The wearable system can dynamically adjust the size of the reticle 1520 based on the relative location between the user and the target 1530. For example, the reticle 1520 appears to be smaller in size in the scene 1500a than the reticle 1520 in the scene 1500b because the target is farther away (and as a result appears to be smaller) to the user. Similarly, the reticle 1520 appears to be larger in size in the scene 1500b than the reticle 1520 in the scene 1500a because the target is closer (and as a result appears to be larger) to the user. Advantageously, in some embodiments, by dynamically adjusting the size of the reticle 1520 based on the distance between the user and the target 1530, the wearable system can adjust accuracy of alignment. For example, by presenting the reticle 1520 in the scene 1500a as being relatively small in size, the likelihood that the target 1530 will fall within the reticle 1520 will also be relatively low (in comparison to the likelihood that the target 15030 will fall within the reticle 1520 in the scene 1500b), which thereby requires the user to more precisely position the head/eye gaze.

In addition to or in alternative to the size of the reticle, other characteristics of the reticle can also be adjusted based on the contextual information. For example, as described in further detail below with reference to FIGS. 16A and 16B, the shape of the reticle may be similar to the shape of the target. As another example, the appearance of the reticle may be a geometrical cone indicating that the wearable system uses cone casting techniques to determine alignment. As yet another example, the color of the reticle may be different than the color of the target so that the user can distinguish the reticle from the target, which can aid the user in aligning the reticle and target. Although presented as a virtual target in FIGS. 15A and 15B, the target can be a physical object in the user's environment, such as a doorknob 1512 on the door 1510. The wearable system can identify physical objects as potential targets by using the object recognizers 708 described with reference to FIG. 7.

Examples of Reticle Appearance

Figure 16B:
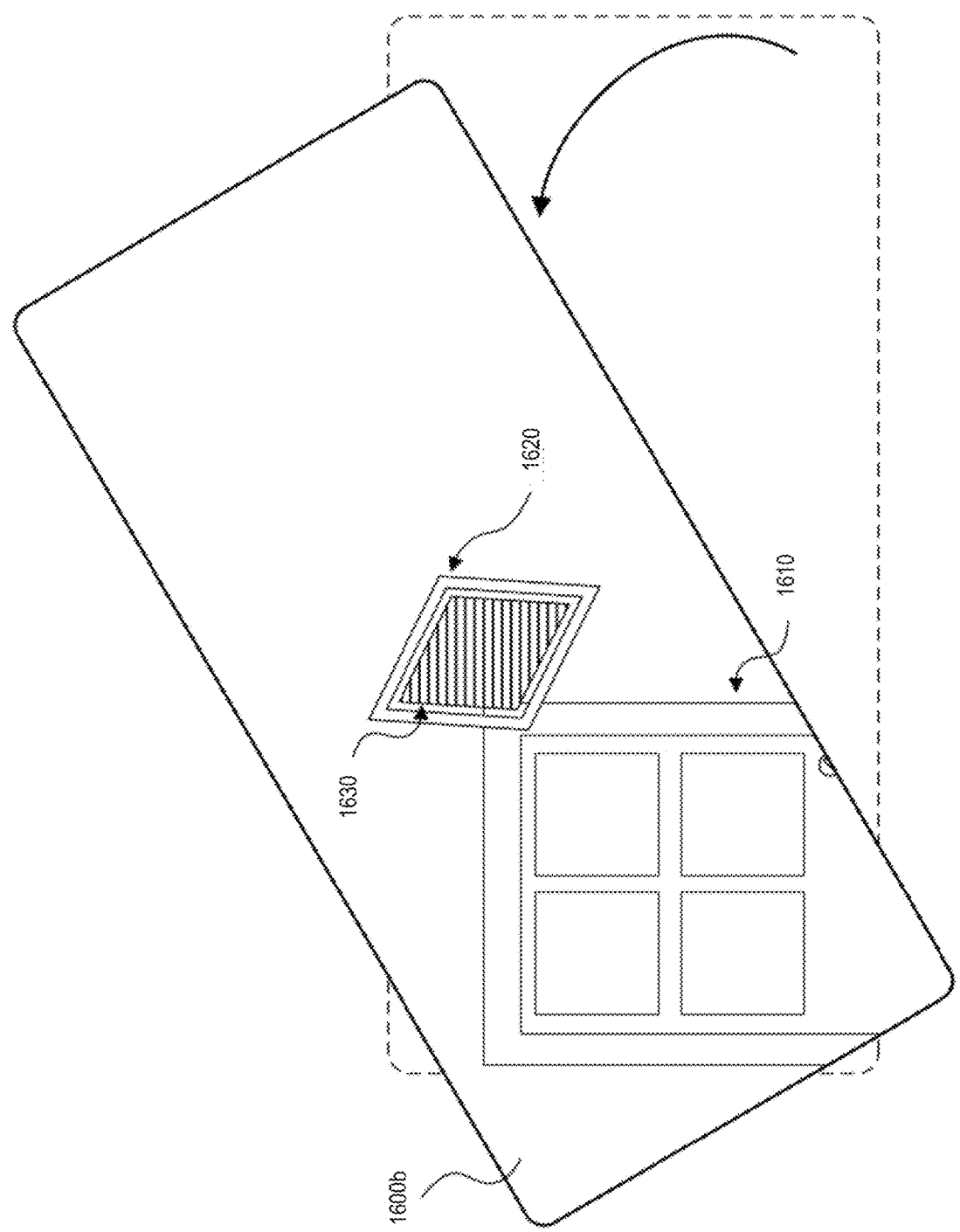

As mentioned above, the appearance of a reticle can take on any of a variety of different colors, shapes, sizes, graphics, and so on. For example, the shape of the reticle may be similar to the shape of the target. This may serve to lower the likelihood that the target will fall within the reticle (which may increase the accuracy of alignment), because there will be relatively few head poses for which the reticle and the target are determined to be adequately aligned with one another. FIGS. 16A and 16B illustrate examples of a reticle and a target that are similar in shape. In FIGS. 16A and 16B, a user can perceive, via the display 220, real world objects such as a door 1610 and virtual objects such as a target 1630 and a reticle 1620 in the scene 1600a. The target 1630 can be fixed at a location in the user's 3D space while the reticle 1620 can be rendered at a location in the rig space.

It can be seen that, in this example, both the target 1630 and the reticle 1620 have a diamond or diamond-like shape. However, the user can perceive that the target 1630 and the reticle 1620 in the scene 1600a appear to have different orientations. As a result, to align the target 1630 and the reticle 1620, the user may need to reorient his or her head so as to effectively rotate the reticle 1620 with respect to the target 1630, door 1610, and any other physical or virtual objects that are fixed in the user's 3D space. The user's head pose after the reorientation can be compared with one or more thresholds to determine whether the target 1630 and the reticle 1620 have been aligned. For example, the wearable system can determine whether the user's head pose is within a range of acceptable head poses or whether the target 1630 (as a whole or a major portion such as greater than 50%, greater than 60%, greater than 75%, greater than 90%, or more) is within the reticle 1620.

The user can tilt and turn his or her head to reorient. The user can perceive the scene 1600b shown in FIG. 16B after the reorientation. In the scene 1600b, the target 1630 is located in the same position in the 3D space as the target 1630 in FIG. 16A, but because the user has reoriented his or her head, the target 1630 and the reticle 1620 appear to have orientations that are substantially similar to one another, or have orientations that are at least more similar to one another than those of the target 1630 and the reticle 1620 in scene 1600a. The wearable system can determine whether the head pose assumed by the user for aligning the reticle 1620 with the target 1630 in the manner depicted in FIG. 16B can sufficiently satisfy one or more of the thresholds described herein. In response to a determination that the one or more of the thresholds are met, the wearable system can automatically initiate the collection of eye gaze data for the purposes of calibration.

The virtual reticle may take on the form of one or more outlines of shapes or symbols, one or more solid shapes or symbols, one or more images or other graphics, in combination or the like. In some embodiments, the reticle may be a virtual object that is fixed within rig space, but also capable of being fixed within the user's 3D space. The reticle may be represented by a virtual object that the user can drag and drop (from a position in a rig space) to a specific position within the user's 3D space. The specific position within the user's 3D space to which the user can drag the representative virtual object may correspond to the position of the target. For example, once the virtual object in the rig space is sufficiently aligned with a target in the 3D space and the wearable system has collected the eye gaze data needed at this juncture, the representative virtual object may switch from being fixed within the rig space to being fixed within the user's 3D space. In this way, the user can effectively drag and drop the representative virtual object into the user's 3D space at the target position. This may enable eye gaze validation processes to be performed while the user is engaged in any of a variety of interactive experiences.

In some embodiments, the appearance of the reticle may be determined based on the target. For example, a user or a wearable system can identify a vase in the user's 3D environment as the target. The wearable system can automatically generate a reticle which resembles the contours of the vase and render the reticle at a position in the user's rig space. The user can move his or her head to align the virtual vase in the rig space with the target vase in the user's 3D environment.

Gamification of Eye Gaze Validation

The eye gaze validation process with the reticle and target may be incorporated as part of a game to provide an interactive and enhanced user experience. By making eye gaze calibration entertaining, the user is more likely to comply with the calibration process requirements and to complete the calibration procedure. At the beginning of the calibration procedure, the wearable display system may present a selection of calibration game options that the user can choose from.

Figure 17:
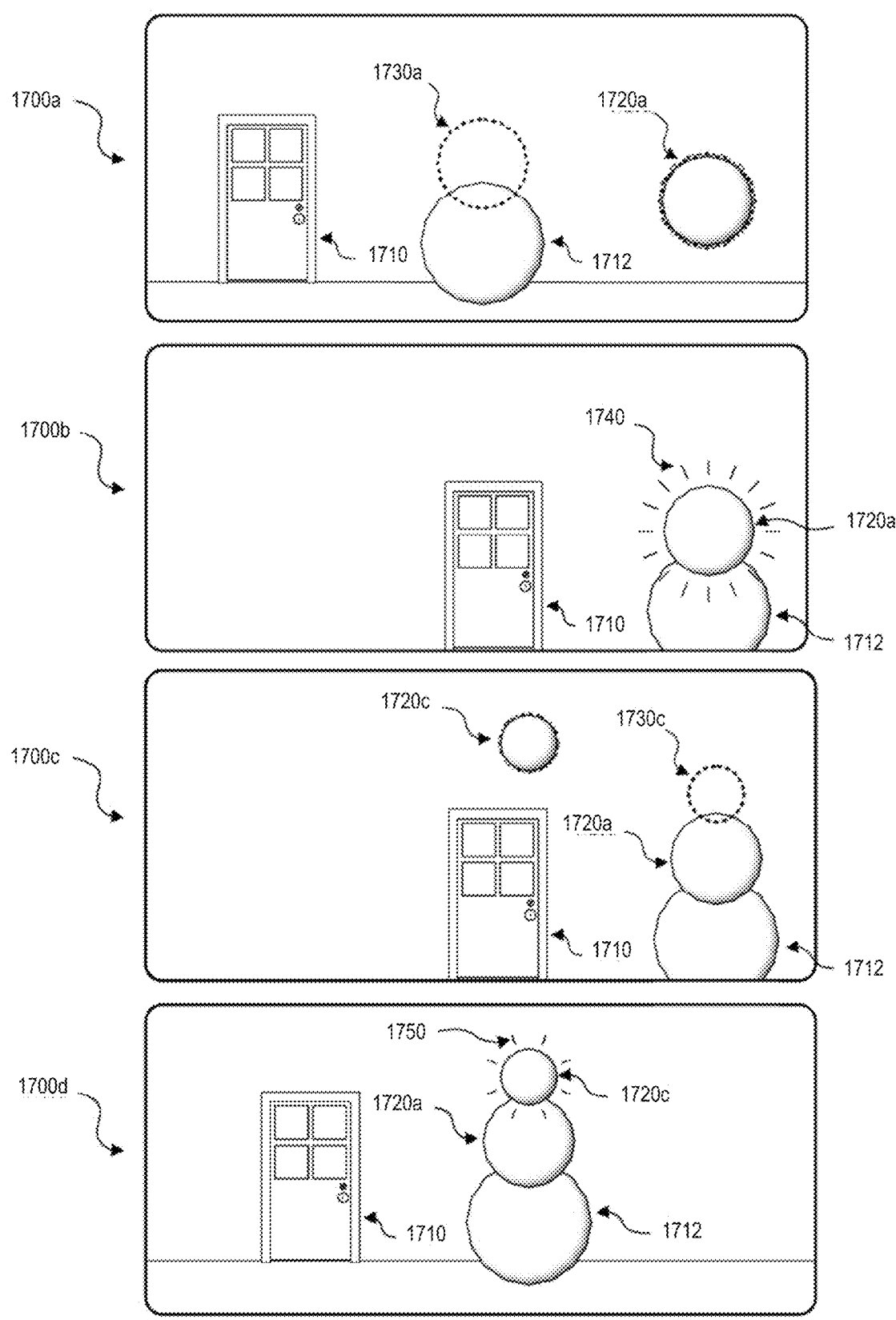
FIG. 17 illustrates an example of eye gaze validation in which a virtual object representative of a reticle fixed in rig space is dragged and dropped into a target position within a user's three-dimensional environment.

FIG. 17 illustrates an example of eye gaze validation in which a virtual object representative of a reticle fixed in rig space is dragged and dropped into a target position within a user's three-dimensional environment. In FIG. 17, four time-sequential scenes, 1700a, 1700b, 1700c, and 1700d are shown. The user can perceive physical objects such as a door 1710 via the display 220. The user can also perceive virtual reticles 1720a and 1720c, virtual targets 1730a and 1730c, and other virtual objects 1712 and 1740-1750 via the display 220. In the example of FIG. 17, the wearable system can provide a snowman building activity as an interactive experience through which eye gaze validation processes are performed.

With reference to scene 1700a, a large virtual snowball 1712 may be anchored at a fixed location in the user's environment and, in this example, may be intended to represent the base portion of a snowman. A virtual target 1730a (shown with dashed lines) may also be anchored at a fixed location in the user's environment, and may correspond to a target position within the user's environment with which the user is to align a reticle. In this example, the position of the virtual target 1730a corresponds to the position of a torso portion of the snowman.

In scene 1700a, the user can also perceive a mid-size virtual snowball 1720a, which may serve as a reticle that is fixed within the rig space. The mid-size virtual snowball 1720a may represent a torso portion of the snowman and, as suggested by the position of virtual target 1730a within the user's environment. The user can move his or her head, eyes, or both to align the mid-size virtual snowball 1720a with the virtual target 1730a. As illustrated in the scene 1700b, the mid-size virtual snowball 1720a can be placed on top of the large virtual snowball 1712 when the mid-size virtual snowball 1720a is aligned with the target 1730a.

In some embodiments, the virtual reticle may be moved from the rig space to the user's 3D space. For example, the mid-size virtual snowball 1720a may become anchored at the target position corresponding to the target 1730a in the user's environment. The anchoring can occur once the wearable system has successfully finished collecting eye gaze data for eye gaze calibration when the mid-size virtual snowball 1720a and the virtual target 1730a are aligned. Once the mid-size virtual snowball 1720a switches from being fixed within the rig space to being fixed within the user's 3D space, the mid-size virtual snowball 1720a may no longer serve as a reticle for the user.

As illustrated in scene 1700b, once the wearable system has successfully finished collecting the necessary eye gaze data and moved the mid-size virtual snowball 1720a from the rig space to the user's 3D space, the wearable system can present a visual focus indicator 1740 (e.g., virtual rays emanating from the snowball 1720a or other graphical highlighting) to convey to the user that the mid-size virtual snowball 1720a has been successfully dragged and dropped into the target position corresponding to the virtual target 1730a within the user's environment. Additionally or alternatively, the system may provide an audible or tactile indication that the virtual snowball 1720a has been successfully dragged and dropped into the target position.

With reference to scene 1700c, the large virtual snowball 1712 and the mid-size virtual snowball 1720a may both be anchored at the fixed locations in the user's environment. A virtual target 1730c may also be anchored at a fixed location in the user's environment directly above the mid-size virtual snowball 1720a. The virtual target 1730c may correspond to a target position in the user's environment with which the user is to align a small virtual snowball 1720c. The position of the virtual target 1730c can correspond to the head of the snowman.

The small virtual snowball 1720 can serve as a reticle in the example of scene 1700c. The small virtual snowball 1720c may be intended to represent a head portion of the snowman. As depicted in FIG. 17, the small virtual snowball 1720c and the mid-size virtual snowball 1720a can appear before the user at different positions in rig space. The user can move his or her head, eyes, or both to align the small virtual snowball 1720c with the virtual target 1730c to add the head to the snowman (e.g., by placing the small virtual snowball 1720c to be on top of the mid-size virtual snowball 1720a) as illustrated in scene 1700d.

In scene 1700c, once the wearable system has successfully finished collecting the necessary eye gaze data, the wearable system can present the visual focus indicator 1750

(and/or audible or tactile indicators) to convey to the user that the small virtual snowball 1720*c* has been successfully dragged and dropped into the target position within the user's environment that is associated with the virtual target 1730*c*. Although not shown in FIG. 17, the wearable system may further present to the user with additional virtual objects that are to be used as reticles and are intended to represent other portions of or accessories for the snowman. For example, the snowman could comprise more than the three snowballs shown in FIG. 17 or the wearable system can present the user with virtual twigs to be positioned on either side of the mid-size virtual snowball 1720*a* as arms of the snowman, a virtual carrot to be positioned on the face of the small virtual snowball 1720*c* as the snowman's nose, virtual pieces of coal to be positioned on the face of the small virtual snowball 1720*c* as eye and mouth features of the snowman, a virtual top hat to be positioned directly above the small virtual snowball 1720*c*, and a virtual scarf to be positioned between the mid-size virtual snowball 1720*a* and the small virtual snowball 1720*c*.

Figure 18:
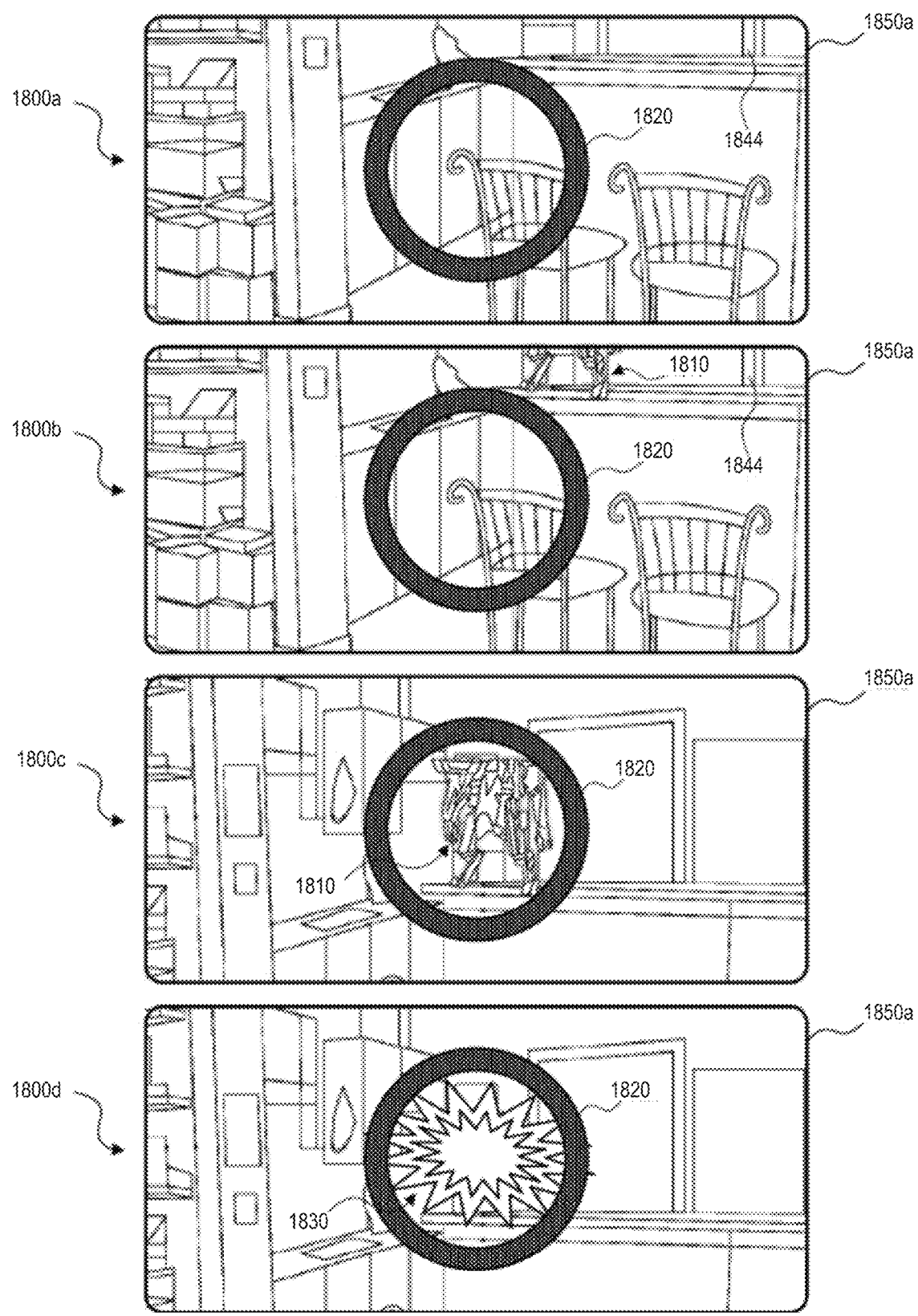
FIG. 18 illustrates an example of eye gaze validation as part of a robot attack game.

FIG. 18 illustrates an example of eye gaze validation as part of a robot attack game. In FIG. 18, four time-sequential scenes, 1800*a*, 1800*b*, 1800*c*, and 1800*d* are shown. The user may be in a kitchen in these 4 scenes. The user can perceive physical objects such as a window 1844 and a chair 1842 via the display 220. The user can also perceive a virtual reticle 1820 and a virtual robot 1810 via the display 220. The virtual robot 1810 may be anchored at a fixed location in the kitchen environment. With reference to the scene 1800*c*, the robot appears to stand on top of the kitchen counter.

The virtual robot may serve as an eye calibration target. The user can move his or her head and eyes to align the reticle with the virtual robot. With reference to the scenes 1800*a*, the user may initially perceive a portion of the window 1844 and the chair 1842. However, the user may notice that a portion of the virtual robot 1810 has entered into his or her FOV 1850*a* as illustrated in the scene 1800*b*. Once the user has noticed the robot 1810, the user can change his or her head pose (e.g., by tilting his or her head upward) to target the virtual robot as illustrated in the scene 1800*c*. Because the user has changed head pose, his or her FOV can accordingly change from the FOV 1850*a* to the FOV 1850*b*. In the scene 1800*c*, after the user has changed his or her head pose, the reticle 1820 is now surrounding the robot 1820, and the user can no longer perceive the chair 1842.

While the user is maintaining the alignment as shown in the scene 1800*c*, the wearable system can collect eye tracking data (e.g., via the inward-facing imaging system 462) for calibration. The wearable system can determine whether the reticle has aligned with the robot for a threshold amount of time. If the alignment between the reticle and the robot has been aligned over the threshold period of time, the display 220 can present a visual focus indicator (such as, e.g., a graphic 1830) which indicating that the robot has been destroyed (e.g., scene 1800*d*). Once the wearable system has finished collecting the eye tracking data, the wearable system can also present the graphic 1830 shown in the scene 1800*d*. In some examples, the wearable system can present the graphic 1830 via display 220 in response to detecting a condition other than a threshold period of time having been satisfied. In these examples, instead of or in addition to determining whether the reticle has aligned with the robot for a threshold amount, the wearable system can determine whether one or more specific types of user input have been received and can present the graphic 1830 in response thereto. For example, the wearable system can determine whether a trigger or other component of a totem in communication with the wearable system has been actuated, whether an utterance or gesture input corresponding to a specific command has been received, etc. In some implementations, the reticle 1820 may further include virtual crosshairs.

In certain embodiments, the display 220 can present a visual indication showing that the reticle 1820 has aligned with the robot 1810. For example, the display 220 can present a red reticle. Once the reticle has aligned with the robot 1810, the display 220 can update the color of the robot to red. When the threshold amount of time has reached, the color of the robot 1810 may turn green and the color of the reticle 1820 can also be changed to green. The user can then move the reticle 1820 to align with another target. In some examples, after presenting the robot 1810, the wearable system can determine that another robot is to be rendered. This determination may, for instance, correspond to the operation of block 1470 as described above with reference to FIG. 14A. In response to determining that eye data for another eye calibration target is to be collected, the wearable system may proceed to render the next robot at a different location so as to keep the user on their toes and thus enhance calibration accuracy. Similarly, this rendering task may correspond to the operation of block 1410 as described above with reference to FIG. 14A as being performed subsequent to block 1470 in some examples.

The appearance of the reticle may be predetermined based on eye tracking algorithms. For example, the wearable system can apply a default mapping matrix to estimate the user's eye gaze direction and display a reticle 1820 in the user's eye gaze direction. The default mapping matrix may be generated by applying a machine learning model generated based on data acquired from other users. The wearable system can further customize the default mapping matrix based on characteristics specific to user's eyes during the eye tracking calibration process, in which the wearable system can obtains the user's eye images after the user has aligned the reticle with the eye calibration target.

Although the examples in FIG. 18 are described in an AR context where the user can see the physical objects and the virtual objects via the display 220, similar techniques can also be applied in the VR/MR context.

As another example of gamification of eye gaze validation, a wearable system can play a missile command game while the wearable system is performing the eye gaze validation. In this example, virtual missiles can travel toward a user's position. These missiles may serve as target and may be shown as stuck pixels. The reticle may be used to aim at the missiles to shoot down the missiles. The positions of the reticle may be determined by an eye tracking algorithm as described with reference to FIG. 18. In some embodiments, missile command game may include a "fail" state which the user fails to destroy the missile fast enough. The user may have a face shield to protect the user from being hit by the missile. If the user can't destroy the missile fast enough, the wearable system can display virtual cracks via the display 220 to show that the missile has hit the face shield.

For example, during the eye gaze validation, the wearable system can show a missile being launched from the ground of the user's environment. The wearable system can simulate depth perceptions (e.g., showing depth of opening doors) based on meshed areas in a world map 920. The wearable system can present a face shield (e.g., showing a see-through shell in front of the user) and a reticle appearing at a location on the face shield. As described herein, the face shield and the reticle can be rendered with reference to the rig space. The user can move his or her head to align the reticle with the incoming missile. If the alignment is successful, the missile is shot down, the next missile is shot out toward the user (e.g., from a different direction) and so on.

Although the examples are described with reference to having one target in the user's FOV, in some implementations, there may be multiple targets (or multiple reticles) appearing at the same time in the user's FOV. Further, the wearable system can show a series of targets (or reticles) at different locations in the user's environment and prompt the user to align the reticles with the targets.

Although described within the context of camera-based eye tracking systems, it is to be understood that the techniques described herein may be applied in wearable systems leveraging other types of eye tracking systems, schemes, or both. For example, the techniques described herein may be applied in a wearable system that includes or at least collects data from a capacitive-based or electrode-based eye tracking system. Furthermore, although the examples are described with reference to an eye calibration target, similar techniques can also be applied to a target region. The target region may include one or more objects (e.g., physical or virtual objects), where at least some of the one or more objects may be an eye calibration target. For example, the user may move his head to align a reticle with two objects in the world space. The two objects may include a virtual object and a physical object. As another example, the user may need to align two reticles with two objects (in the target region) at the same time before the eye gaze data is collected. As yet another example, the wearable system may initiate eye gaze data collection when the reticle aligns with the perimeter of the target region (rather than a particular target object).

Example User Study

A user study was performed to compare the eye calibration data quality obtained from embodiments of the techniques described herein with data obtained using traditional methods. The study included eighteen users and was performed in a laboratory-based setting where no external distractions were present. The study found that the calibration techniques described herein performed the same as or better than a traditional eye calibration technique. Eleven of the eighteen users did better using the new calibration techniques than the traditional techniques. The system measured pupil position of each eye of the user along x, y, and z directions. The study found that the standard deviation of normalized pupil position improved significantly for seven of the eighteen users. No user performed significantly worse using the new interaction sequence. A summary of the study results is included as Appendix A to U.S. Provisional Patent Application No. 62/512,594, filed May 31, 2017, which is hereby incorporated by reference herein in its entirety. The results shown in the summary include a change in standard deviation of normalized measurements of the pupil positions along the x, y, z axes of the left and right pupils of the eighteen users and a statistical probability value (p-value). Measurements where the p-value is less than a significance value of 0.05 are highlighted.

Additional Aspects

In a first aspect, a wearable system for eye tracking calibration comprising an image capture device configured to capture eye images (of one or two eyes) from a user of the wearable display system; non-transitory memory configured to store the eye images; a display system through which the user can perceive an eye calibration target in an environment of the user and a virtual reticle; a pose sensor configured to track a head pose of the user; a hardware processor in communication with the non-transitory memory and the display system, the hardware processor programmed to: cause the eye calibration target to be perceivable via the display system; cause the virtual reticle to be rendered via the display system; identify the user's head pose based on data acquired from the pose sensor; calculate a position of the virtual reticle based on the user's head pose; determine whether the virtual reticle aligns with the eye calibration target based at least partly on the position of the virtual reticle and the eye calibration target; and in response to a determination that the virtual reticle aligns with the eye calibration target, instruct the image capture device to capture the eye images and initiate storage of the eye images into the non-transitory memory.

In a second aspect, the wearable system of aspect 1, wherein the image capture device comprises an eye camera configured to image the user's eye region.

In a third aspect, the wearable system of aspect 1 or aspect 2, wherein the pose sensor comprises an inertial measurement unit.

In a fourth aspect, the wearable system of any one of aspects 1 to 3, wherein the eye calibration target is an object in a world space and the virtual reticle is in a rig space.

In a fifth aspect, the wearable system of aspect 4, wherein the world space comprises a three-dimensional (3D) coordinate system with reference to the environment of the user and the rig space comprises a coordinate system with reference to the display system.

In a sixth aspect, the wearable system of aspect 5, wherein to determine whether the virtual reticle aligns with the eye calibration target, the hardware processor is programmed to: determine an offset between the rig space and the world space; calculate a first coordinate value of the virtual reticle in the rig space and a second coordinate value of the eye calibration target in the world space; and calculate an alignment based on the first coordinate value, the second coordinate value, and the offset.

In a seventh aspect, the wearable system of aspect 5 or aspect 6, wherein to calculate the alignment, the hardware processor is programmed to convert the first coordinate value in the rig space to a third coordinate value in the world space based on the offset and determine whether the third coordinate value and the second coordinate value are within a threshold range.

In an eighth aspect, the wearable system of any one of aspects 1 to 7, wherein the user's head pose comprises a position, an orientation, or a combination of the position and orientation of the user's head.

In a ninth aspect, the wearable system of any one of aspects 1 to 8, wherein to determine whether the virtual reticle aligns with the eye calibration target, the hardware processor is programmed to: perform a ray cast based on the position of the virtual reticle; determine whether a portion of a ray in the ray cast intersects with the eye calibration target. Optionally, the hardware processor can detect a collision between a ray in the ray cast and the eye calibration target.

In a 10th aspect, the wearable system of any one of aspects 1 to 9, wherein to determine whether the virtual reticle aligns with the eye calibration target, the hardware processor is programmed to: access a target head pose wherein the target head pose is a pose that the user assumes when the virtual reticle aligns with eye calibration target; and determine whether the user's head pose is at the target head pose.

In an 11th aspect, the wearable system of any one of aspects 1 to 10, wherein in response to the determination that the virtual reticle aligns with the eye calibration target, the hardware processor is further programmed to: provide a visual, audible, or tactile effect indicating that the virtual reticle is aligned with the eye calibration target.

In a 12th aspect, the wearable system of any one of aspects 1 to 11, wherein in response to a determination that the virtual reticle aligns with the eye calibration target, the hardware processor is further programmed to instruct the display system to present another virtual reticle.

In a 13th aspect, the wearable system of any one of aspects 1 to 12, wherein the hardware processor is further programmed to dynamically update an appearance of the virtual reticle based at least partly on contextual information comprising at least one of: a size of the eye calibration target, a color of the eye calibration target, or a required precision associated with the eye tracking calibration (performed by the wearable system).

In a 14th aspect, the wearable system of aspect 13, wherein the appearance of the reticle resembles an appearance of the eye calibration target.

In a 15th aspect, the wearable system of aspect 13 or aspect 14, wherein the hardware processor is programmed to reduce a size of the reticle in response to a high required precision or a small eye calibration target.

In a 16th aspect, a method for eye tracking calibration comprising, under control of a hardware processor: identifying an eye calibration target in a world space associated with an environment of a user; instructing a wearable device of the user to render a virtual reticle in a rig space associated with the wearable device of the user; obtaining head pose data of the user; determining a current head pose of the user based on the obtained head pose data; determining a relative position of the virtual reticle with respect to the eye calibration target based at least partly on the user's current head pose; determining whether the virtual reticle aligns with the eye calibration target based at least in part on the relative position of the virtual reticle with respect to the eye calibration target; and in response to a determination that the virtual reticle aligns with the eye calibration target, instructing an inward-facing imaging system of the wearable device to acquire eye calibration data.

In a 17th aspect, the method of aspect 16, wherein the head pose data is obtained from at least one of: an outward-facing imaging system of the wearable device, an inertial measurement unit of the wearable device, or a camera in the environment of the user.

In an 18th aspect, the method of aspect 16 or aspect 17, wherein the eye calibration data comprises images of one or both eyes of the user.

In a 19th aspect, the method of any one of aspects 16 to 18, wherein the eye calibration target is at a fixed location in the world space or wherein the virtual reticle is rendered at a fixed location in the rig space.

In a 20th aspect, the method of any one of aspects 16 to 19, further comprising in response to a determination that the virtual reticle aligns with the eye calibration target, instructing the wearable device to render the virtual reticle at a different position in the rig space.

In a 21st aspect, the method of any one of aspects 16 to 20, wherein the virtual reticle is rendered at or near a center of a field of view of the user or off-center from the field of view of the user, wherein the field of view comprises a portion of the user's environment that a user can perceive at a given time. For example, at or near the center of the field of view of the user can comprise an angular offset less than 10°, less than 5°, less than 10, etc.

In a 22nd aspect, the method of any one of aspects 16 to 21, wherein determining a current head pose of the user based on the obtained head pose data comprises calculating a position or an orientation of the user's head based on the head pose data.

In a 23rd aspect, the method of any one of aspects 16 to 22, further comprising: accessing a range of head poses and wherein determining whether the virtual reticle aligns with the eye calibration target comprises determining whether the current head pose is within the range of head poses.

In a 24th aspect, the method of any one of aspects 16 to 23, wherein the target is a physical object in the user's environment.

In a 25th aspect, the method of any one of aspects 16 to 24, wherein the target is a virtual object in a game application and the eye tracking calibration is performed as part of the game application.

In a 26th aspect, a method for eye tracking calibration comprising, under control of a hardware processor: identifying a target region in an environment of a user; identifying a virtual reticle at a position in a rig space associated with a wearable device of the user; obtaining head pose data of a user; determining a current head pose of the user based on the obtained head pose data; updating the position of the virtual reticle relative to the target region based at least partly on the user's current head pose; determining whether the virtual reticle aligns with the target region; and in response to a determination that the virtual reticle aligns with the target region, providing an indication that an alignment has been achieved.

In a 27th aspect, the method of aspect 26, wherein the target region comprises at least a virtual object, and wherein determining whether the virtual reticle aligns with the target region comprises determining whether the virtual reticle aligns with the virtual object.

In a 28th aspect, the method of aspect 26 or aspect 27, wherein the target region comprises at least a portion of a physical object, and wherein determining whether the virtual reticle aligns with the target region comprises determining whether the virtual reticle aligns with the portion of the physical object.

In a 29th aspect, the method of any one of aspects 26 to 28, wherein the eye calibration data is collected by a capacitive-based or an electrode-based eye tracking system.

In a 30th aspect, the method of any one of aspects 26 to 29, wherein in response to the determination that the virtual reticle aligns with the eye calibration target, the method further comprises: causing an eye camera of the wearable device to initiate collection of eye images.

In a 31st aspect, the method of any one of aspects 26 to 30, wherein determining whether the virtual reticle aligns with the target region comprises: casting at least one virtual ray based at least partly on the user's current head pose; and determining whether the at least one virtual ray intersects with the target region.

In a 32nd aspect, the method of aspect 31, wherein casting at least one virtual ray based at least partly on the user's current head pose comprises casting at least one virtual ray from a location on the user or the wearable device, and through the position of the virtual reticle.

In a 33rd aspect, the method of aspect 31 or aspect 32, wherein casting at least one virtual ray based at least partly on the user's current head pose comprises casting a virtual geometric cone through the location of the virtual reticle.

In a 34th aspect, the method of aspect 33, wherein a shape of the virtual reticle corresponds to a cross-sectional shape of the virtual geometric cone at the location of the virtual reticle.

CONCLUSION

Each of the processes, methods, and algorithms described herein and/or depicted in the attached figures may be embodied in, and fully or partially automated by, code modules executed by one or more physical computing systems, hardware computer processors, application-specific circuitry, and/or electronic hardware configured to execute specific and particular computer instructions. For example, computing systems can include general purpose computers (e.g., servers) programmed with specific computer instructions or special purpose computers, special purpose circuitry, and so forth. A code module may be compiled and linked into an executable program, installed in a dynamic link library, or may be written in an interpreted programming language. In some implementations, particular operations and methods may be performed by circuitry that is specific to a given function.

Further, certain implementations of the functionality of the present disclosure are sufficiently mathematically, computationally, or technically complex that application-specific hardware or one or more physical computing devices (utilizing appropriate specialized executable instructions) may be necessary to perform the functionality, for example, due to the volume or complexity of the calculations involved or to provide results substantially in real-time. For example, a video may include many frames, with each frame having millions of pixels, and specifically programmed computer hardware is necessary to process the video data to provide a desired image processing task or application in a commercially reasonable amount of time. As another example, embodiments of the eye tracking calibration techniques described herein may need to be performed in real-time, while a user is wearing a head-mounted display system.

Code modules or any type of data may be stored on any type of non-transitory computer-readable medium, such as physical computer storage including hard drives, solid state memory, random access memory (RAM), read only memory (ROM), optical disc, volatile or non-volatile storage, combinations of the same and/or the like. The methods and modules (or data) may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). The results of the disclosed processes or process steps may be stored, persistently or otherwise, in any type of non-transitory, tangible computer storage or may be communicated via a computer-readable transmission medium.

Any processes, blocks, states, steps, or functionalities in flow diagrams described herein and/or depicted in the attached figures should be understood as potentially representing code modules, segments, or portions of code which include one or more executable instructions for implementing specific functions (e.g., logical or arithmetical) or steps in the process. The various processes, blocks, states, steps, or functionalities can be combined, rearranged, added to, deleted from, modified, or otherwise changed from the illustrative examples provided herein. In some embodiments, additional or different computing systems or code modules may perform some or all of the functionalities described herein. The methods and processes described herein are also not limited to any particular sequence, and the blocks, steps, or states relating thereto can be performed in other sequences that are appropriate, for example, in serial, in parallel, or in some other manner. Tasks or events may be added to or removed from the disclosed example embodiments. Moreover, the separation of various system components in the implementations described herein is for illustrative purposes and should not be understood as requiring such separation in all implementations. It should be understood that the described program components, methods, and systems can generally be integrated together in a single computer product or packaged into multiple computer products. Many implementation variations are possible.

The processes, methods, and systems may be implemented in a network (or distributed) computing environment. Network environments include enterprise-wide computer networks, intranets, local area networks (LAN), wide area networks (WAN), personal area networks (PAN), cloud computing networks, crowd-sourced computing networks, the Internet, and the World Wide Web. The network may be a wired or a wireless network or any other type of communication network.

The systems and methods of the disclosure each have several innovative aspects, no single one of which is solely responsible or required for the desirable attributes disclosed herein. The various features and processes described above may be used independently of one another, or may be combined in various ways. All possible combinations and subcombinations are intended to fall within the scope of this disclosure. Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. No single feature or group of features is necessary or indispensable to each and every embodiment.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise.

As used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain embodiments require at least one of X, at least one of Y and at least one of Z to each be present.

Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one more example processes in the form of a flowchart. However, other operations that are not depicted can be incorporated in the example methods and processes that are schematically illustrated. For example, one or more additional operations can be performed before, after, simultaneously, or between any of the illustrated operations. Additionally, the operations may be rearranged or reordered in other implementations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A wearable system for eye tracking calibration comprising:
    an image capture device configured to capture eye images of one or two eyes of a user of the wearable system;
    non-transitory memory configured to store the eye images;
    a display system through which the user can perceive a virtual reticle and a virtual eye calibration target in an environment of the user;
    a pose sensor configured to track a head pose of the user;
    a hardware processor in communication with the non-transitory memory and the display system, the hardware processor programmed to:
        cause the virtual eye calibration target to be perceivable via the display system;
        cause the virtual reticle to be rendered via the display system;
        determine a current head pose of the user based on data acquired from the pose sensor;
        calculate a location of the virtual reticle based on the current head pose;
        cast a virtual geometric cone through the location of the virtual reticle;
        detect a collision of the virtual geometric cone and the virtual eye calibration target in response to at least a threshold portion of the virtual eye calibration target falling within a volume of the virtual geometric cone;
        determine whether the virtual reticle aligns with the virtual eye calibration target based at least partly on the detected collision; and
        in response to a determination that the virtual reticle aligns with the virtual eye calibration target, initiate storage of the eye images into the non-transitory memory.

2. The wearable system of claim 1, wherein the image capture device comprises an eye camera configured to image an eye region of the user.

3. The wearable system of claim 1, wherein the pose sensor comprises an inertial measurement unit.

4. The wearable system of claim 1, wherein the virtual eye calibration target is an object in a world space and the virtual reticle is in a rig space.

5. The wearable system of claim 4, wherein the world space comprises a three-dimensional (3D) coordinate system with reference to the environment of the user and the rig space comprises a coordinate system with reference to the display system.

6. The wearable system of claim 1, wherein the head pose comprises a position, an orientation, or a combination of the position and the orientation of the head of the user.

7. The wearable system of claim 1, wherein to determine whether the virtual reticle aligns with the virtual eye calibration target, the hardware processor is programmed to:
    access a target head pose wherein the target head pose is a pose that the user assumes when the virtual reticle aligns with the virtual eye calibration target; and
    determine whether the head pose is at the target head pose.

8. The wearable system of claim 1, wherein in response to the determination that the virtual reticle aligns with the virtual eye calibration target, the hardware processor is further programmed to: provide a visual, audible, or tactile effect indicating that the virtual reticle is aligned with the virtual eye calibration target.

9. The wearable system of claim 1, wherein in response to the determination that the virtual reticle aligns with the virtual eye calibration target, the hardware processor is further programmed to instruct the display system to present another virtual reticle.

10. The wearable system of claim 1, wherein the hardware processor is further programmed to dynamically update an appearance of the virtual reticle based at least partly on contextual information comprising at least one of: a size of the virtual eye calibration target, a color of the virtual eye calibration target, or a required precision associated with the eye tracking calibration.

11. The wearable system of claim 10, wherein the appearance of the virtual reticle resembles an appearance of the virtual eye calibration target.

12. The wearable system of claim 10, wherein the hardware processor is programmed to reduce an angle of the virtual geometric cone in response to a high required precision or a small virtual eye calibration target.

13. The wearable system of claim 10, wherein a shape of the virtual reticle corresponds to a cross-sectional shape of the virtual geometric cone at the location of the virtual reticle.

14. A method for eye tracking calibration comprising:
under control of a hardware processor:
identifying a virtual eye calibration target in a world space associated with an environment of a user;
instructing a wearable device of the user to render a representation of a virtual reticle in a rig space associated with the wearable device of the user;
obtaining head pose data of the user;
determining a current head pose of the user based on the obtained head pose data;
calculating a position of the virtual reticle based on the determined head pose;
casting a virtual geometric cone through the location of the virtual reticle;
detecting a collision of the virtual geometric cone and the virtual eye calibration target, the collision comprising a portion of the virtual eye calibration target falling within a volume of the virtual geometric cone;
determining whether the virtual reticle aligns with the virtual eye calibration target based at least in part on the detected collision; and
in response to a determination that the virtual reticle aligns with the virtual eye calibration target, instructing an inward-facing imaging system of the wearable device to acquire eye calibration data.

15. The method of claim 14, wherein the head pose data is obtained from at least one of: an outward-facing imaging system of the wearable device, an inertial measurement unit of the wearable device, or a camera in the environment of the user.

16. The method of claim 14, wherein the eye calibration data comprises images of one or both eyes of the user.

17. The method of claim 14, wherein the virtual eye calibration target is at a fixed location in the world space, or wherein the virtual reticle is rendered at a fixed location in the rig space.

18. The method of claim 14, wherein detecting a collision of the virtual geometric cone and the virtual eye calibration target comprises determining that the virtual eye calibration target falls completely within the volume of the virtual geometric cone.

19. The method of claim 14, wherein determining a current head pose of the user based on the obtained head pose data comprises calculating a position or an orientation of the user's head based on the head pose data.

20. The method of claim 14, further comprising: accessing a range of head poses and wherein determining whether the virtual reticle aligns with the virtual eye calibration target comprises determining whether the current head pose is within the range of head poses.

* * * * *